US010805247B1

(12) United States Patent
Cohen et al.

(10) Patent No.: US 10,805,247 B1
(45) Date of Patent: Oct. 13, 2020

(54) METHOD AND APPARATUS FOR REQUESTING PRIVATE REPLIES IN MESSAGING

(71) Applicant: Wrinkl, Inc., Sands Point, NY (US)

(72) Inventors: Marc A. Cohen, Blue Bell, PA (US); Jeffrey A. Cohen, Blue Bell, PA (US)

(73) Assignee: Wrinkl, Inc., Sands Point, NY (US)

( * ) Notice: Subject to any disclaimer, the term of this patent is extended or adjusted under 35 U.S.C. 154(b) by 0 days.

(21) Appl. No.: 16/931,283

(22) Filed: Jul. 16, 2020

Related U.S. Application Data

(63) Continuation-in-part of application No. 16/712,952, filed on Dec. 12, 2019, now Pat. No. 10,728,192,
(Continued)

(51) Int. Cl.
*G06F 15/16* (2006.01)
*H04L 12/58* (2006.01)
*H04L 29/06* (2006.01)

(52) U.S. Cl.
CPC ............ *H04L 51/046* (2013.01); *H04L 51/12* (2013.01); *H04L 51/16* (2013.01); *H04L 51/18* (2013.01);
(Continued)

(58) Field of Classification Search
CPC ......... H04L 51/10; H04L 51/12; H04L 51/14; H04L 51/16; H04L 51/18; H04L 51/36;
(Continued)

(56) References Cited

U.S. PATENT DOCUMENTS 8,832,569 B2   9/2014   Chen et al.
9,218,603 B2   12/2015  Kumar
(Continued)

OTHER PUBLICATIONS blog.standuply.com [online], "Top 50 Features of Slack to Boost Your Productivity," Sep. 2016, [retrieved on Dec. 11, 2019], retrieved from: URL<https://blog.standuply.com/50-additional-features-of-slack-to-boost-your-productivity-959ee56f7893>, 5 pages.
(Continued)

*Primary Examiner* — Yves Dalencourt
(74) *Attorney, Agent, or Firm* — Fish & Richardson, P.C.

(57) ABSTRACT

A method and apparatus relates to the operation of a plurality of messaging devices that includes a first device operated by a first group user and remaining devices operated by remaining group users, wherein the first group user and the remaining group users are a plurality of group users communicating with each other in a messaging channel. A private reply requested text message is received in a message channel. The private reply requested text message is entered into a first device from a first group user. The private reply requested text message is transmitted to remaining group users so that the private reply requested text message appears in the messaging channel on the first device and on the remaining devices. Each of the remaining group users may reply to the private reply requested text message in the messaging channel with a respective reply. Each respective reply to the private reply requested text message is displayed on the first device, but fewer than each respective reply is displayed on at least one of the remaining devices.

30 Claims, 36 Drawing Sheets

Related U.S. Application Data which is a continuation of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198, application No. 16/931,283, which is a continuation-in-part of application No. 16/746,412, filed on Jan. 17, 2020, which is a continuation-in-part of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/609,663, filed on May 31, 2017, now Pat. No. 10,009,300, which is a continuation of application No. 15/293,620, filed on Oct. 14, 2016, now Pat. No. 9,712,466, application No. 16/931,283, which is a continuation-in-part of application No. 16/746,412, filed on Jan. 17, 2020, which is a continuation-in-part of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, and a continuation-in-part of application No. 15/431,077, filed on Feb. 13, 2017, now Pat. No. 9,860,198, application No. 16/931,283, which is a continuation-in-part of application No. 16/746,412, filed on Jan. 17, 2020, which is a continuation-in-part of application No. 16/376,427, filed on Apr. 5, 2019, now Pat. No. 10,547,575, application No. 16/931,283, which is a continuation-in-part of application No. 16/746,412, filed on Jan. 17, 2020, which is a continuation-in-part of application No. 16/712,952, filed on Dec. 12, 2019, now Pat. No. 10,728,192, which is a continuation of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198.

(60) Provisional application No. 62/446,067, filed on Jan. 13, 2017, provisional application No. 63/045,513, filed on Jun. 29, 2020, provisional application No. 62/783,410, filed on Dec. 21, 2018, provisional application No. 62/666,137, filed on May 3, 2018, provisional application No. 62/518,905, filed on Jun. 13, 2017, provisional application No. 62/358,719, filed on Jul. 6, 2016, provisional application No. 62/253,229, filed on Nov. 10, 2015.

(52) U.S. Cl.
CPC .......... H04L 51/36 (2013.01); H04L 65/1069 (2013.01); H04L 65/1093 (2013.01); H04L 65/4015 (2013.01)

(58) Field of Classification Search
CPC .............. H04L 51/046; H04L 65/1069; H04L 65/1093; H04L 65/4015
See application file for complete search history.

(56) References Cited

U.S. PATENT DOCUMENTS

| | | |
|---|---|---|
| 9,262,455 B2 | 2/2016 | Palay |
| 9,426,102 B1 | 8/2016 | Wong et al. |
| 9,860,198 B1 | 1/2018 | Cohen |
| 9,971,500 B2 | 5/2018 | Yang et al. |
| 9,996,248 B2 | 6/2018 | Park et al. |
| 10,009,300 B2 * | 6/2018 | Cohen ............... H04L 51/36 |
| 2002/0095465 A1 | 7/2002 | Banks et al. |
| 2005/0198584 A1 | 9/2005 | Matthews et al. |
| 2006/0031361 A1 | 2/2006 | Bailey et al. |
| 2007/0185961 A1 | 8/2007 | Perlow et al. |
| 2009/0094288 A1 | 4/2009 | Berry et al. |
| 2009/0119371 A1 | 5/2009 | Chang et al. |
| 2010/0299599 A1 | 11/2010 | Shin et al. |
| 2011/0289406 A1 | 11/2011 | Wessingbo |
| 2012/0198360 A1 | 8/2012 | Wanderski et al. |
| 2014/0096033 A1 | 4/2014 | Blair |
| 2014/0143684 A1 | 5/2014 | Oh |
| 2014/0195621 A1 | 7/2014 | Rao |
| 2014/0219433 A1 | 8/2014 | Pai et al. |
| 2016/0179773 A1 | 6/2016 | Shen |
| 2016/0294742 A1 | 10/2016 | Weaver et al. |
| 2018/0159812 A1 | 6/2018 | Sarafa et al. |
| 2020/0120051 A1 | 4/2020 | Cohen et al. |

OTHER PUBLICATIONS

Bustle.com [online], "How to Retweet With a Comment, aka Use the Life-Changing Feature Twitter Just Added," Apr. 7, 2015, [retrieved on Dec. 11, 2019], retrieved from: URL<https://www.bustle.com/articles/74648-how-to-retweet-with-a-comment-aka-use-the-life-changing-feature-twitter-just-added>, 4 pages.
Corban Tech [online], "Narwhal: The Best Reddit Client | Apps (App Walkthrough," Dec. 16, 2016, [retrieved on Dec. 11, 2019], retrieved from: URL<https://www.youtube.com/watch?v=78wgtwPlhKE>, 1 page (Video Submission).
engadget.com [online], "WhatsApp can quote messages you want to respond to," Jun. 2016, [retrieved on Dec. 11, 2019], retrieved from: URL<https://www.engadget.com/2016/06/12/whatsapp-quote-messages/>, 3 pages.
express.co.uk [online], "WhatsApp quietly introduced a brand-new way to reply to your messages," Jun. 13, 2016, [retrieved on Dec. 16, 2019] retrieved from: URL<https://www.express.co.uk/life-style/science-technology/679325/WhatsApp-How-To-Quote-Message-In-Reply-iOS-Android-Chat>, 4 page.
HubSpot.com [online], "How to Retweet the Right Way (With a Comment) on Twitter," Apr. 15, 2015, [retrieved on Dec. 11, 2019], retrieved from: URL<https://blog.hubspot.com/blog/tabid/6307/bid/27675/how-to-retweet-the-right-way-in-4-easy-steps.aspx>, 16 pages.
Mashable.com [online], "Twitter Updates TweetDeck, Allows Users to Edit and Retweet," Mar. 22, 2012, [retrieved on Dec. 11, 2019], retrieved from: URL<https://mashable.com/2012/03/22/tweetdeck-rt-updates/>, 3 pages.
outlook.uservoice.com [online], "Outlook for Android: Swipe Options, swipe left for reply, swipe right for forward. please add these options," Sep. 30, 2015, [retrieved on Dec. 11, 2019], retrieved from: URL<https://outlook.uservoice.com/forums/293346-outlook-for-android/suggestions/9992319-swipe-options-swipe-left-for-reply-swipe-right-f>, 5 pages.
PCT International Preliminary Report on Patentability in International Appln. No. PCT/US2018/13462, dated Jul. 16, 2019, 6 pages.
PCT International Search Report and Written Opinion in International Appln. No. PCT/US2018/13462, dated Jan. 12, 2018, 7 pages.
Plexus Worldwide [online], "How to Use the New Retweet Function on Twitter | Social Media Solutions," Apr. 7, 2015, [retrieved on Dec. 11, 2019], retrieved from: URL<https://www.youtube.com/watch?v=Ji9mAP8vwiQ>, 1 page (Video Submission).
slack.com [online], "Share messages in Slack: From channels to search—learn how Slack works from top to bottom!," [retrieved on Dec. 16, 2019] retrieved from: URL<https://slack.com/help/articles/203274767-Share-messages-in-Slack>, 1 page.

(56) References Cited

OTHER PUBLICATIONS slack.com [online], "Using Slack," 2019, [retrieved on Dec. 11, 2019], retrieved from: URL<https://slack.com/help/articles/203274767>, 5 pages.

slackhq.com [online], "Sharing messages in Slack," May 2016, [retrieved on Dec. 11, 2019], retrieved from: URL<https://slackhq.com/sharing-messages-in-slack>, 5 pages.

T5 by Robin Good [online], "Free open-source distributed alternative to Twitter: Mastodon," Oct. 10, 2016 [retrieved on Dec. 11, 2019], retrieved from: URL<tools.robingood.com/site/contents/content/765621/2016-10-06/free-open-source-distributed-alternative-to-twitter-mastodon>, 2 pages (Video Submission).

Tech & Design [online], "How to Retweet anything iPhone iPad iPod Mac," Jul. 18, 2015, [retrieved on Dec. 11, 2019], retrieved from: URL<https://www.youtube.com/watch?v=6D_MkQO0zjY>, 1 page (Video Submission).

\* cited by examiner

Seen from the point of view of Rachel. Rachel is the sender of the message and is requesting that the recipients reply to her message privately.

76C, 76D, 76E as seen from the point of view of Mary. Mary is a recipient of Rachel's message.

Seen from the point of view of Mary.
Mary is a recipient of Rachel's message.

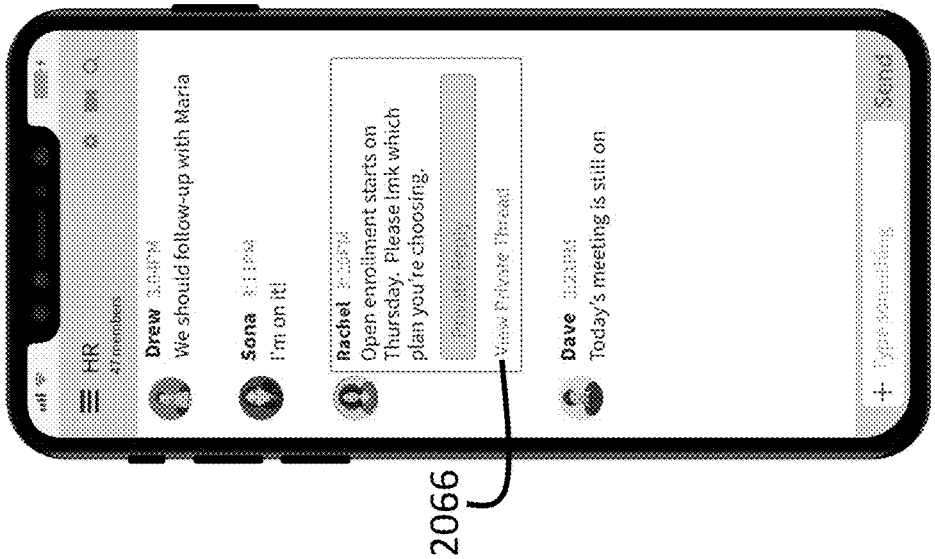
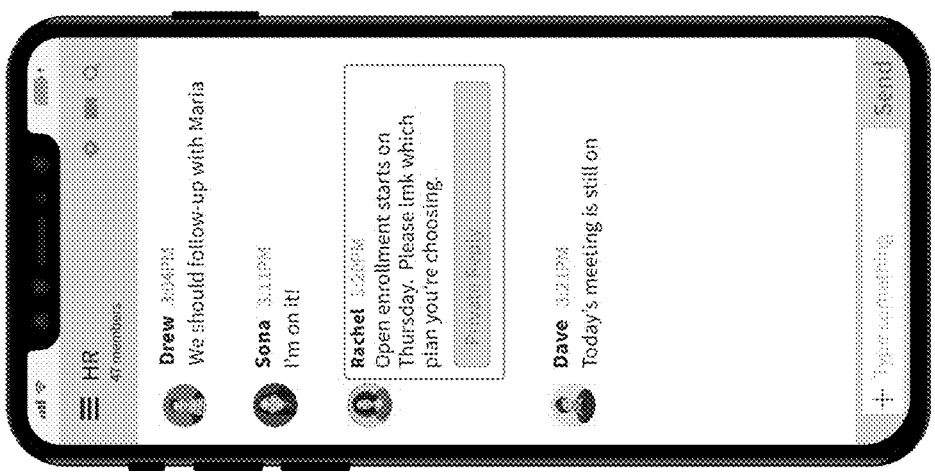
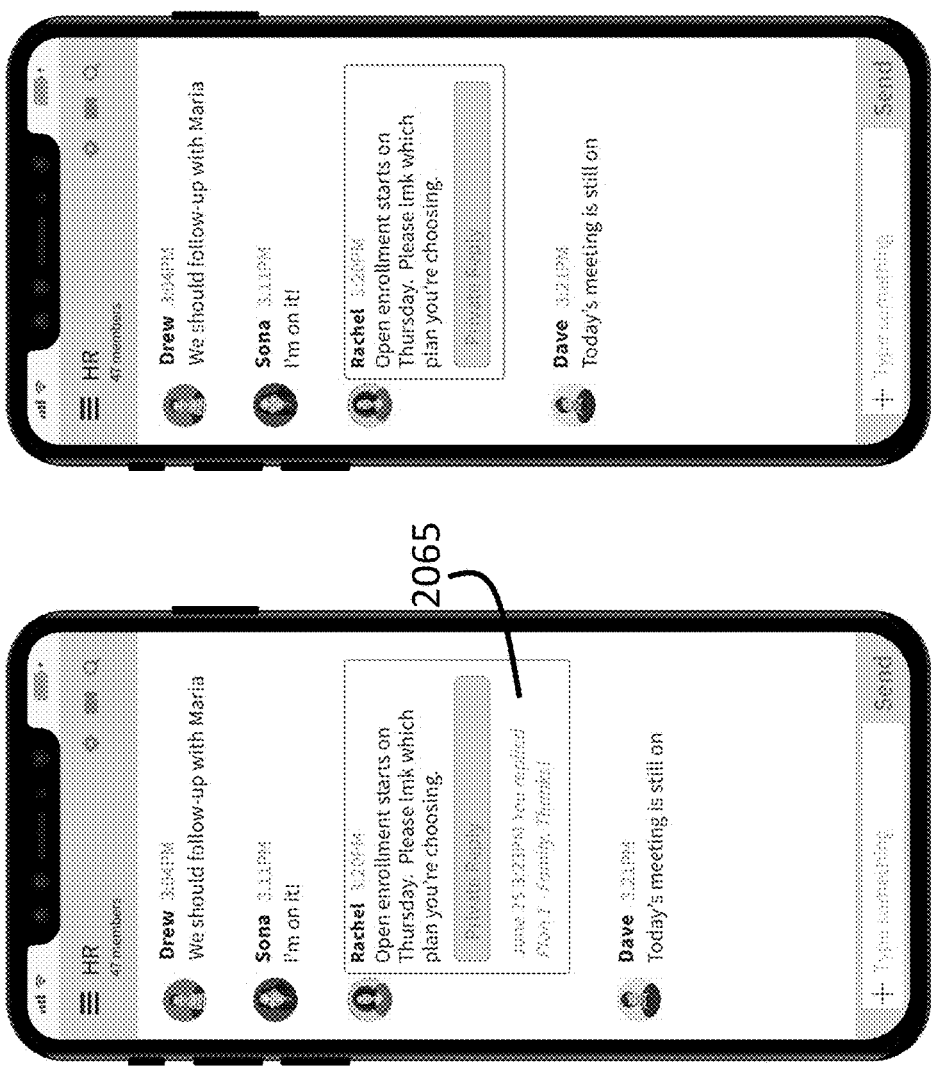
Figures 79B, 79C and 79D as seen from the point of view of Mary. Mary is a recipient of Rachel's message.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Rachel.

Rachel is the sender of the message and is requesting that the recipients reply to her message privately.

Seen from the point of view of Mary. Mary is a recipient of Rachel's message.

Seen from the point of view of Paul, a member of the Sales channel

Alternative Embodiment: Seen from the point of view of Paul, a member of the Sales channel. In this embodiment Paul can specify one or more recipients of his Request Private Reply message.

Alternative Embodiment:
Seen from the point of view of Paul, a member of the Sales channel. In this embodiment Paul can specify one or more recipients of his Request Private Reply message.

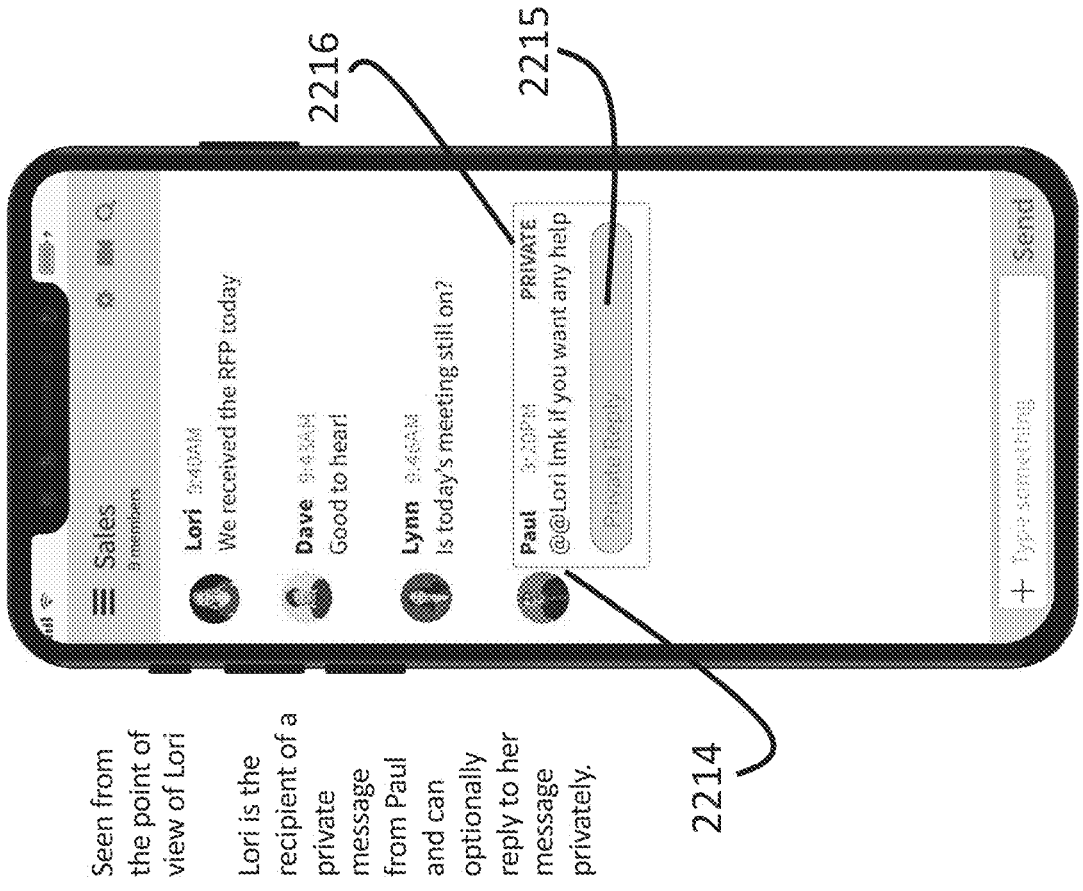
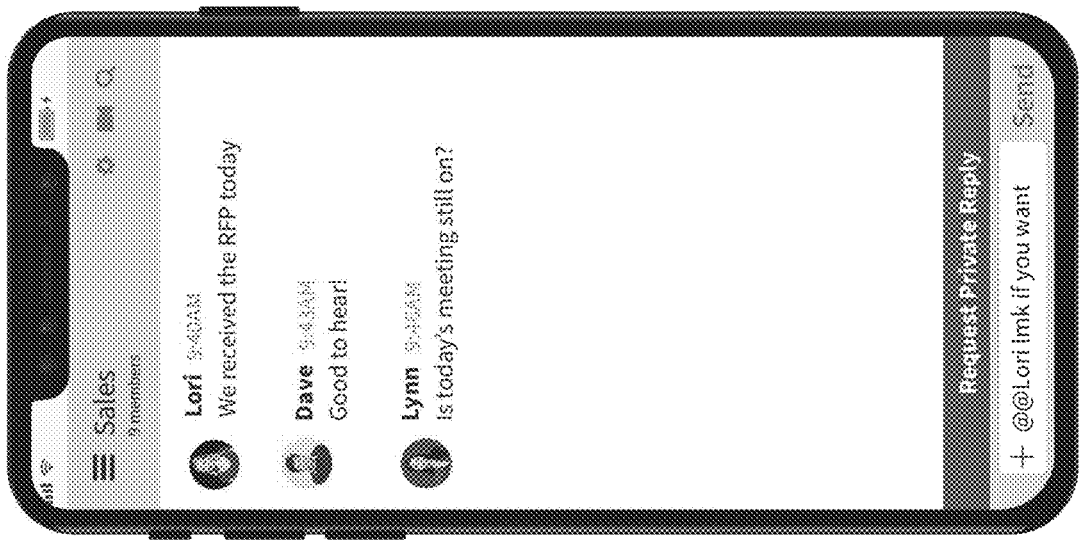
Figure 24A / Figure 24B

Seen from the point of view of Paul

Paul is the creator of a private message to Lori and is requesting that Lori reply to his message privately.

METHOD AND APPARATUS FOR REQUESTING PRIVATE REPLIES IN MESSAGING

CROSS REFERENCE TO RELATED APPLICATIONS

This application is a Continuation-In-Part of U.S. patent application Ser. No. 16/712,952 filed Dec. 12, 2019, now U.S. Pat. No. 10,728,192, which is a Continuation of U.S. patent application Ser. No. 16/376,427, filed Apr. 5, 2019, now U.S. Pat. No. 10,547,575, which is a Continuation-In-Part of U.S. patent application Ser. No. 16/014,578, filed Jun. 21, 2018, which is a Continuation-In-Part of U.S. patent application Ser. No. 15/858,696, filed Dec. 29, 2017, now as U.S. Pat. No. 10,025,475, issued Jul. 17, 2018, which is a Continuation-In-Part of Ser. No. 15/431,077, filed Feb. 13, 2017, now as U.S. Pat. No. 9,860,198, issued Jan. 2, 2018, which claims the benefit of priority under 35 U.S.C. 119(e) to U.S. Provisional Patent Application No. 62/446,067, filed Jan. 13, 2017.

This application is also a Continuation-In-Part of U.S. patent application Ser. No. 16/746,412 filed Jan. 17, 2020, which is a Continuation-In-Part of U.S. patent application Ser. No. 16/712,952 filed Dec. 12, 2019, which is a Continuation of U.S. patent application Ser. No. 16/376,427, filed Apr. 5, 2019, now U.S. Pat. No. 10,547,575, which is a Continuation-In-Part of U.S. patent application Ser. No. 16/014,578, filed Jun. 21, 2018, which is a Continuation-In-Part of U.S. patent application Ser. No. 15/858,696, filed. Dec. 29, 2017, now as U.S. Pat. No. 10,025,475, issued Jul. 17, 2018, which is a Continuation-In-Part of Ser. No. 15/431,077, filed Feb. 13, 2017, now as U.S. Pat. No. 9,860,198, issued Jan. 2, 2018, which claims the benefit of priority under 35 U.S.C. 119(e) to U.S. Provisional Patent Application No. 62/446,067, filed Jan. 13, 2017.

This application is also a Continuation-In-Part of U.S. patent application Ser. No. 16/746,412 filed Jan. 17, 2020, which is a Continuation-In-Part of U.S. patent application Ser. No. 16/376,427 filed Apr. 5, 2019, now U.S. Pat. No. 10,547,575, which is a Continuation-In-Part of U.S. patent application Ser. No. 16/014,578 filed Jun. 21, 2018, which is a Continuation-In-Part of U.S. patent application Ser. No. 15/609,663, filed May 31, 2017, now U.S. Pat. No. 10,009,300, which is a Continuation of U.S. patent application Ser. No. 15/293,620, filed Oct. 14, 2016, now U.S. Pat. No. 9,712,466, which claims the benefit of priority under 35 U.S.C. § 119(e) to U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a Continuation-In-Part of U.S. patent application Ser. No. 16/746,412 filed Jan. 17, 2020, which is a Continuation-In-Part of U.S. patent application Ser. No. 16/376,427 filed Apr. 5, 2019 which is a Continuation-In-Part of U.S. patent application Ser. No. 16/014,578 filed Jun. 21, 2018, which is a Continuation-In-Part of U.S. patent application Ser. No. 15/858,696 filed on Dec. 29, 2017, now U.S. Pat. No. 10,025,475, which a) is a Continuation-In-Part of U.S. patent application Ser. No. 15/431,077 filed Feb. 13, 2017, now U.S. Pat. No. 9,860,198, which claims the benefit of priority under 35 U.S.C. § 119(e) to U.S. Provisional Patent Application 62/446,067 filed Jan. 13, 2017, and b) claims the benefit of priority under 35 U.S.C. 119(e) to U.S. Provisional Patent Application 62/518,905 filed on Jun. 13, 2017, the disclosures of all of which are incorporated by reference herein in their entireties.

This application also is a Continuation-M-Part of U.S. patent application Ser. No. 16/746,412 filed Jan. 17, 2020, which is a Continuation-In-Part of U.S. Ser. No. 16/376,427 filed Apr. 5, 2019, now U.S. Pat. No. 10,547,575, which claims the benefit of priority under 35 U.S.C. 119(e) to U.S. Provisional Patent Application 62/666,137, filed May 3, 2018, and U.S. Provisional Patent Application 62/783,410, filed Dec. 21, 2018, the disclosures of all of which are incorporated by reference herein in their entireties.

This application also claims the benefit of priority under 35 U.S.C. 119(e) to U.S. Provisional Patent Application 63/045,513, filed Jun. 29, 2020, the disclosure of which is incorporated by reference herein in its entirety.

FIELD OF THE INVENTION

The present invention relates to computer messaging and more particularly to management thereof. In particular, an apparatus and method are disclosed for improving computer operational efficiency through message management.

BACKGROUND OF THE INVENTION

Electronic communication, including messaging, provides a very efficient manner of information exchange. In such forms of electronic communication, messages are exchanged between multiple parties in order to convey information. In one known form of messaging, two users operate respective client devices and effectively engage in conversation by transmitting messages between each other. Such communication may be in the form of a single continuous stream of back and forth messaging. Also, in some situations, more than two users (operating, for example, more than two respective client devices) may be communicating in a single continuous stream. While a single stream of messages may be transmitted in an ongoing sequence, it is also possible to have multiple channels, each with their own respective stream of messages.

Users may conduct communication with each other in different environments. In one example, two users Direct Message each other and communicate effectively only with each other. In other words, the two users exchange messages with each other in a message channel, and no one else is intended to see that exchange of messages. Such messaging is private to the two users in such a channel. Alternatively, more than two users can communicate with each other in a group channel. Such messaging is sometimes referred to as "group chat" or "group messaging." in such a situation, when users communicate with each other, those users are communicating as part of a group, and everyone in the group typically sees all messages exchanged in the group channel.

Two users may privately communicate with each other in a private channel, and those same two users may communicate with each other, and others, as part of a group chat in a group channel. In such a situation, users may switch back and forth between private channels and group channels, depending upon whether communication is desired on a private basis or on a group basis.

SUMMARY OF THE INVENTION

A method and apparatus relates to the operation of a plurality of messaging devices that includes a first device operated by a first group user and remaining devices operated by remaining group users, wherein the first group user and the remaining group users are a plurality of group users communicating with each other in a messaging channel. A private reply requested text message is received in a message channel. The private reply requested text message is entered into a first device from a first group user. The private reply requested text message is transmitted to remaining group users so that the private reply requested text message appears in the messaging channel on the first device and on the remaining devices. Each of the remaining group users may reply to the private reply requested text message in the messaging channel with a respective reply. Each respective reply to the private reply requested text message is displayed on the first device, but fewer than each respective reply is displayed on at least one of the remaining devices.

BRIEF DESCRIPTION OF THE DRAWINGS

The disclosure is illustrated by way of example, and not by way of limitation, and will become apparent upon consideration of the following detailed description, taken in conjunction with the accompanying drawings, in which like reference characters refer to like parts throughout, and in which:

FIGS. 13A-13D are screenshots of one or more exemplary embodiments of the present invention.

FIGS. 24A-24C are screenshots of one or more exemplary embodiments of the present invention.

DETAILED DESCRIPTION

Figure 1:
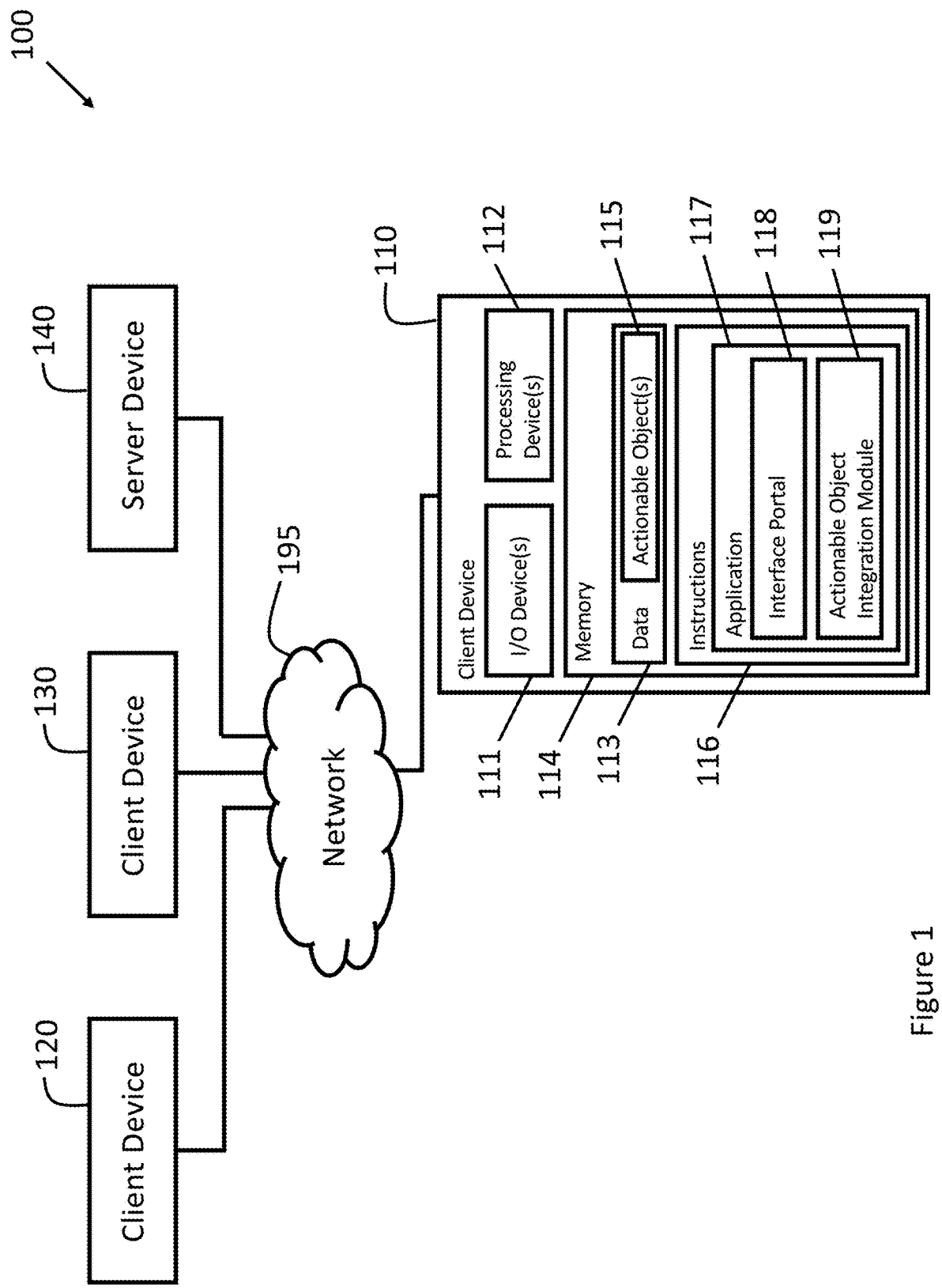
FIG. 1 is a block diagram illustrating a system in which implementations of the disclosure may operate.

Implementations of the disclosure provide techniques for allowing users to participate in a group chat (e.g. in a group messaging channel). One or more users can request that one or more users reply to a message in a private (or possibly semi-private manner). Users may then respond to such a request in a private or semi-private manner. This may be advantageous in improving chat messaging technology by reducing the steps that users may need to perform to switch from a group channel to a private channel (or vice versa). This may also be advantageous in improving chat messaging technology by reducing clutter in a group channel. This may also be advantageous in improving organization of a chat messaging system. Keeping public and private messages that are related to Sales, for example, in the "Sales" channel, as opposed to those messages being distributed among various group channels and direct message channels, results in a more predictable and organized approach to locating Sales related messages in the future. This may also be advantageous in improving chat messaging by allowing users to control whether (or request that) responses to messages are transmitted publicly (in a group) or privately (between designated individuals). By providing control and/or requests, improved security may be obtained (i.e. the person replying is more likely to reply privately, as opposed to reluctantly or accidently providing private, confidential or sensitive information in a reply in a public/group environment.

To communicate typically, users may communicate in a variety of places (channels). The present invention provides a technical advantage by automating the switching of replies from a public/group environment to a private (DM) or semi-private environment. The switching between public/group channels and private channels also helps to reduce clutter, i.e., a reduction in the number of messages that are displayed, that may be of little or no use or significance to others in the public/group channels. In this manner, an improvement is obtained when users read messages in group channels, as messages unnecessary for the (entire) group to see are omitted from the public/group channel, and thus information relevant to the group can be read more quickly and efficiently. Among other benefits, the reduction of channel clutter and the ability to respond privately in group channels can change the nature of users' perception of and experience with group chat.

Additional advantages may be obtained by aggregating private messages on a display. The use of aggregation in a display allows messages each privately sent in response to a common query (the message requesting the private replies) to be viewed together. This allows more efficient operation, for example, of the communication device sending the query, as the aggregation allows the querying user to see multiple responses without having to operate his/her device to see responses in separate channels.

Although implementations of the disclosure may be particularly beneficial in certain types of communication platforms (e.g., chat room communications), other types of communication platforms can be utilized in conjunction with the disclosure. For example, some of these communication platforms may include platforms for text messages, short message services (SMS), rich communications services (RCS), e-mails and other types of similar on-line communication platforms for facilitating information exchanges between client devices of a plurality of participants.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system for performing the operations herein. This system may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some implementations, the computer program product, or software may include a non-transitory machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

In one implementation, the computer program product may be installed and/or a service may be selected from a cloud-computing environment in order to obtain the benefits of the techniques described herein. In an implementation, the computer program product may be downloaded onto a client device. For example, a participant may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser.

While the present explanation may repeatedly refer to "text" messages, it is understood that text messages may be text, an alternative to text, and/or a combination of text and alternatives. Numerous types of data may be transmitted via text messages, and are contemplated as being transmitted when "text" messaging is referred to herein. The data may correspond to characters, audio, video, images, GIFS, emojis, stickers, etc.

FIG. 1 is a block diagram illustrating a system 100 in which implementations of the disclosure may operate. In some implementations, the system 100 may facilitate the transfer of electronic communications between computing devices of two or more users or participants over a communication network. The system 100 can include one or more servers (e.g. server device 140), which provide access or a communication link between a plurality of client devices (e.g., client devices 110, 120 and 130) in order to facilitate communication between two or more client devices.

As shown in FIG. 1, the system 100 may include a plurality of client computing devices, such as client devices 110, 120 and 130, coupled to network 195, and one or more server computing devices, such as server device 140, capable of communicating with the client computing devices 110, 120 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 140 may be at one node of network 195 and capable of directly and indirectly communicating with other nodes of the network 195. For example, the server device 140 may include a web server that may be capable of communicating with client devices 110, 120 and 130 via network 195 such that it uses the network 195 to transmit and display information to a participant on a display associated with client devices. In some implementations, the server device 140 may also include a plurality of computers that exchange information with different nodes of a network for the purpose of receiving, processing and transmitting data to the client devices 110, 120 and 130.

Referring to FIG. 1, the computing devices of system 100, such as client device 110, may include one or more I/O (input/output) devices 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data or quantum data. Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O device 111.

Instructions 116 of the client device 110 may be a set of instructions to be executed directly (such as machine code) or indirectly (such as scripts) by the processor 112. In that regard, the terms "instructions," "steps" and "programs" may be used interchangeably herein. The instructions 116 may be stored in object code format for direct processing by the processors 112, or in another computer language including scripts or collections of independent source code modules that are interpreted on demand or compiled in advance.

Data 113 may be retrieved, stored or modified by processors 112 in accordance with the instructions 116. For instance, although the present disclosure is not limited by a particular data structure, the data 113 may be stored in computer registers, in a relational database as a table having a plurality of different fields and records, XML documents, or flat files. The data 113 may also be formatted in a computer-readable format such as, but not limited to, binary values, ASCII or Unicode. By further way of example only, the data 113 may comprise information sufficient to identify the relevant information, such as numbers, descriptive text, proprietary codes, pointers, references to data stored in memory or information that is used by a function to calculate the relevant data. For example, the data 113 may include actionable objects 115 that may identify user perceivable action that can be included in a chat session.

Each of the actionable objects 115 may comprise an adjustable data structure (e.g., a memory array) comprising a plurality of fields that characterize a type category to associate with a chat message. By incorporating the actionable objects 115 into the creation of the chat messages, the system 100 is able to ascribe a value "type" to each message. In one implementation, when one or more actionable objects 115 are added or inserted into a chat message of the chat session, the actionable object executes a series of steps to be performed by a corresponding user perceivable action. The series of steps can be pre-programmed, or variable, based on the context of the type category for that action. As explained below, a request for private reply message is an example of an actionable object.

In some implementations, each client device may include an application 117 to facilitate different types of electronic communications between each client device and one or more other client devices via network 195, including providing interactive interface portals 118 for facilitating various operating functions of the disclosure. In one implementation, the application 117 may be installed and/or a service may be selected in order to obtain the benefits of the techniques described herein. In an implementation, the application 117 may be downloaded onto the client device 110. For example, a participant may elect to download the application from a service associated with an online server. The client device 110 may transmit a request for the application 117 over network 195 and, in response, receive the application 117 from the service.

The application 117 may be installed locally on the client device 110. Alternatively, the application 117 can be stored at the service and may be accessed through the client device 110, for example, via a mobile web browser. By using the application 117, the client device 110 may integrate into a chat session user perceivable actionable objects, such as actionable objects 115, which can be executed by the client device 110 to enhance communications between participants of that session. In an alternative implementation, the application 117 may be a firmware embedded in communication device.

As shown in FIG. 1, the instructions 116 may include an interface portal 118 for displaying network data and to allow a participant associated with the client device 110 to interactively navigate over the display of data. The interface portal 118 provides for the display of network content, such as chat messages of a chat session or any other type of network data, to an I/O device 111 (e.g., a touch screen display) of the client device 110 by sending and receiving data across the network 195. The network data may be received in response to a transmitted chat message that includes one or more actionable objects 115.

To facilitate integrating actionable objects into a chat session, the instructions 116 of the client device 110 may include actionable object integration module 119. The actionable object integration module 119 may generate and transmit user perceivable actionable objects in a chat session that can be executed by the client devices of system 100. The functionality of the module 119 can exist in a fewer or greater number of modules than what is shown, with such modules residing at one or more computing devices, which may be geographically dispersed. The systems may be operable in conjunction with components of the client device 110 from which it may receive chat message related data and other relevant information regarding the device 110.

Figure 2:
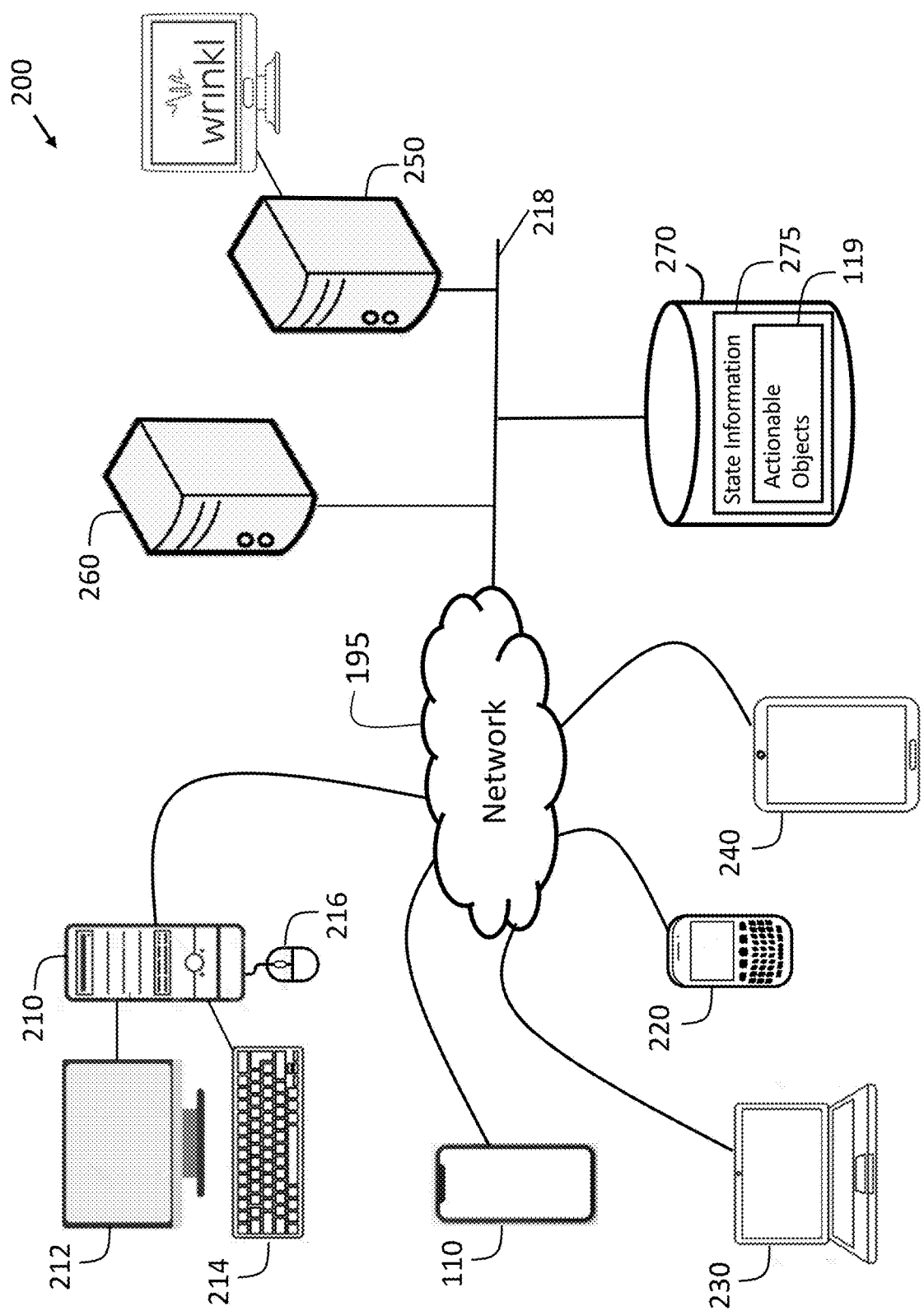
FIG. 2 is a pictorial diagram of a system including a plurality of client devices in accordance with aspects of the disclosure.

FIG. 2 is a pictorial diagram of a system 200 including a plurality of computing devices in accordance with aspects of the disclosure. In some implementations of system 200 two or more computing devices (e.g., participant/client devices) may engage in an electronic communication session (e.g., chat session) with each other. In some implementations, a first participant/client device may engage in a chat session with a second participant/client device via a network 195. As shown, FIG. 2 illustrates network 195 having a plurality of computing devices, such as client device 110, and other types of computing devices, a base station 210, a personal data assistant (PDA) 220, a laptop/netbook 230 and a tablet 240 as well as computing server devices 250 and 260 (e.g., computing devices that can be located at a number of different receiving stations). The various devices may be interconnected via a network or direct connection 218 and/or may be coupled via a communications network 195 (e.g., a LAN, WAN, the Internet, etc. that may be wired or wireless). In some implementations, the computing devices may communicate with each other before accessing the communication network 195.

Each device may include, for example, user input devices such as a keyboard 214 and mouse 216 and/or various other types of input devices such as pen-inputs, joysticks, buttons, touch screens, etc., as well as a display, which could include, for instance, a OLED, LED, LCD, TV, projector, touchscreen, etc. Each device may be a personal computer, application server, etc. By way of example only, computing device 110 may be a mobile phone while computing device 260 may be a server. Databases, such as database 270, may be accessible to one or more of the computing devices or other devices of system 200. The database 270 may comprise data, such as state information 275, associated a chat session implemented on the client devices as well as store chat messages transmitted via system 200.

In one implementation, a resource associated with the system 200 may be used to maintain a consistency of the state information 275 and in such cases when there is a system failure. This is so that the chat session can continue uninterrupted without losing chat participant details. For example, a state manager (not shown) may maintain and transfer the state information 275 to state backup storage (not shown) for later retrieval. State backup storage may be accessible by any of the computing devices of system 200 via network connection 218 so that the chat session between the participants may be rerouted while the state information 275 is maintained, if a computing device of system 200 fails.

In some implementations, the state information 275 may correspond to a chat session between participants associated with the client devices of system 200. In some implementations, the state information 275 may be stored in database 270 by the state manager running on the server device 260 and/or the client devices or some combination thereof. In one implementation, the state information 275 may include, for example, information regarding the identity of participants of the chat session, the number of chat participants, actionable objects 119 that are applied to the chat session, a unique identifier associated with each of the action objects 119 and/or the chat message or session, and an order in which chat messages are received as well as other relevant information. When an actionable object 119 is applied in a particular chat session, in one exemplary embodiment, the state information 275 for that session may be updated in accordance with the user perceivable action associated with the actionable object 119. This updating of the state information 275 in accordance with the actionable object 119 applied therein is further discussed below with respect to various interactive interfaces of the disclosure.

Embodiments of the disclosure provide actionable functionality to the contents of chat messages to distill and extract central elements of a single, one-to-one or group chat conversation. A participant of the chat sessions may be provided with a variety of different interactive interfaces to facilitate the transfer of an electronic communications between participants in a chat session. In some implementations, the interfaces allow the participants to integrate actionable objects, such as actionable objects 119 into the chat session to enhance the electronic communications between the participants. The interfaces may be flexibly configured to include various types of buttons, cursors, and tools as well as formatted content on a display on a client device. In one implementation, an application, such as application 117 of FIG. 1, on the client device of the participant may present the participant with a graphical user interface (GUI) that allows the participant to direct messages comprising the actionable objects 119 to other selected participants of the chat session.

Figure 3:
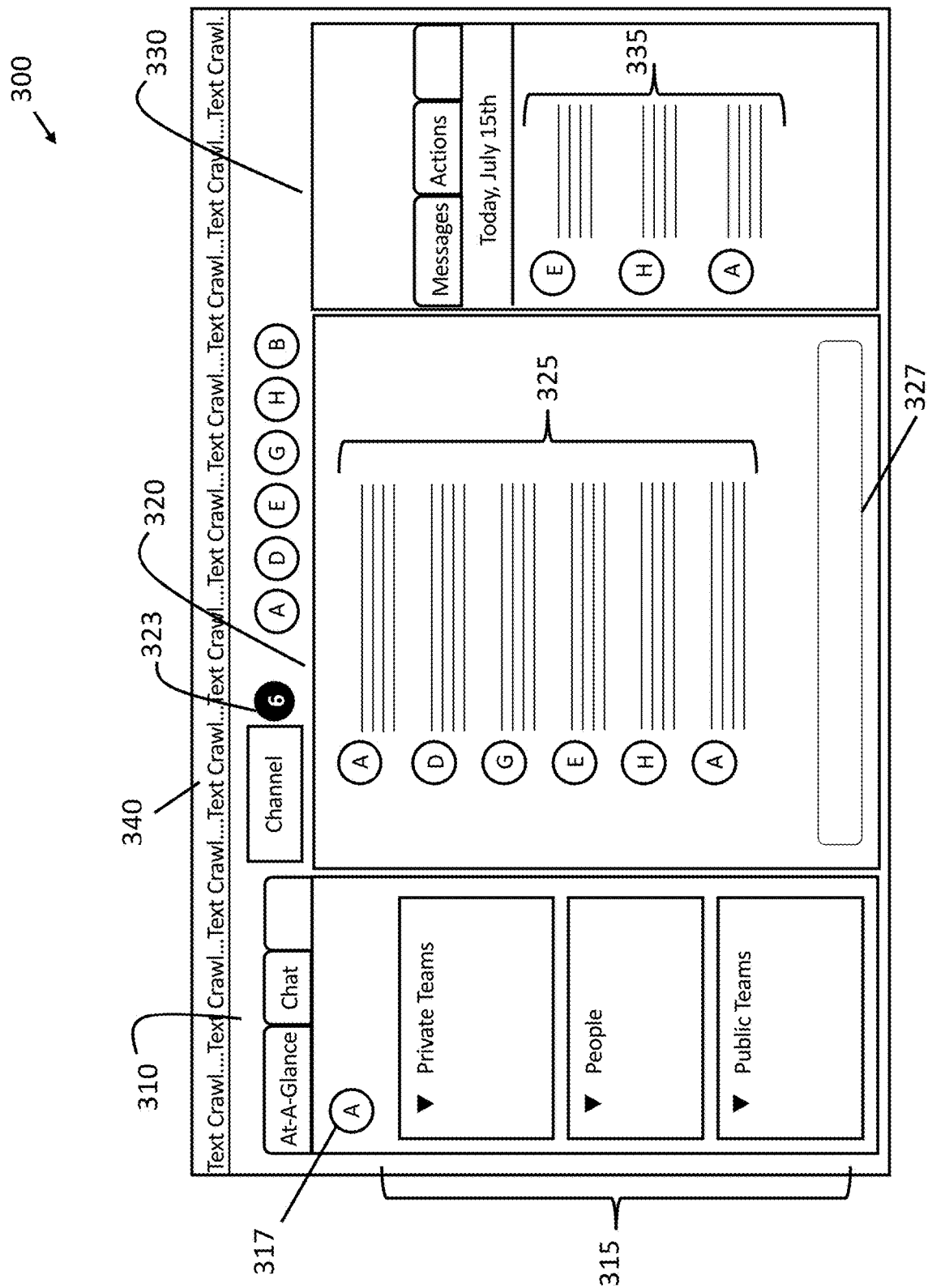
FIG. 3 is an example of a landing interface portal of a client device in accordance with aspects of the disclosure.

With regards to FIG. 3, an example of a landing interface portal 300 of a client device is shown. In some implementations, the landing interface portal 300 may correspond to the interface portal 118 in system 100 of FIG. 1. The landing interface portal 300 provides an example interface in which a chat messaging session can be engaged by a number of participants that are represented by the participant icons A, D, E, G, H and B on the portal 300. In some implementations, the interface portal 300 may include several panels that include a channel/dialog panel 310, a message window panel 320 and a side panel 330. The channel/dialog panel 310 displays the different chat session groups 315 that a particular participant 317 is a member of. The message window panel 320 displays the chat messages 325 exchanged by the participants. In this example, the messages are associated with a selected channel, although in other embodiments multiple channels with associated messages may be displayed simultaneously. In some implementations, the message window panel 320 also includes a count of the current participants 323 and a text entry region 327 that allows the participants to insert and reformat the text (i.e., bold, italics, color), add a link (hypertext link) or file, or insert an actionable object or bundle communications into a chat session. The side panel 330 can be adjusted to dynamically display elements regarding various messages or groups of messages (e.g., associated messages such as threads) 335 and other information possibly associated with the actionable objects as disclosed herein.

In some implementations, each message that is entered into the text entry region 327 is displayed in the message window panel 320. In some implementations, the messages 325 can be flagged or marked (for example, by color) to isolate the message for later use. An advantage of marking individual messages is that it provides participants with a way to indicate, highlight or associate messages, for current use or future recall for themselves or others.

As group messaging grows in popularity so too do complaints of message triviality and unnecessary channel clutter. Group channel participants are feeling inundated, distracted and interrupted. Cluttered and noisy channels are a hindrance to efficiency and productivity.

Simple questions posed in a message such as "Who's coming to the meeting?" can launch an avalanche of "I am" responses, with each response serving as an interruption and added channel clutter. Often times only the poster of a question needs, wants or should see the replies of other channel users. Often there is no need for everyone in the channel to see anyone else's or everyone else's replies, and in these cases, private replies may be preferable.

There are times when a message channel participant has a comment or question for the plurality of users in a channel but wishes for the responses to the question or comment to be private, that is, visible, respectively, only to the requestor and the particular respondent. For example, there needs to be a way for the Director of HR to send a message in a group channel that says something like "Open enrollment starts next week. Please let me know if you intend to join and if so which plan". While the request is intended for all in the channel, it may be desirable that the replies be private to the requestor due to the private nature of the information contained in the replies. It may also be desirable that replies be kept private to the requester to avoid cluttering the channel with replies, even where the information contained in the replies is not private in nature.

Furthermore, it is often useful for the replies to be aggregated for the requestor to view together. It may also be useful for the reply messages to appear in the history of the message stream in the context, chronology and/or order that they are received. In some cases, additionally, the original message along with the associated replies can also or solely be aggregated and viewed together.

There are times when a message channel participant has a comment or question for a subset of users in a channel and wishes for the responses to the question or comment to be private, that is, visible only to the requestor and each particular respondent respectively, or visible only to the requester and all of the specified subset of users. For example, there may need to be a way for the VP of Sales to send a message in a group channel to just the regional sales leaders, that says something like "How close are you to hitting your Q3 regional sales goals?". While the request private replies message is intended to be hidden from most of the channel users, and is intended for just the regional sales leaders in the channel, it may also be desirable that the respective private replies be visible to all of the specified subset of users (i.e., the VP of Sales and the regional sales leaders). This approach allows the VP of Sales as well as the regional sales leaders to retain overall conversational context (i.e., the VP of Sales' question to the regional sales leaders may have been sparked by discussion in the common sales channel). By remaining in the common sales channel, and having her request private replies message posted and visible relative to the common channel messages, the VP of Sales secures a system of record of message flow and associated messages. Additionally, the specified subset of users is able to share messages privately among the subset of group users without cluttering or disclosing private information in the common channel, and the original message along with the associated replies can also or solely be aggregated and viewed together.

For each message sent in a group channel, there is the sender's view of his/her the message channel and each recipient's view of the channel. In some cases, these views are identical, or nearly identical and in other cases the views are different.

In the current art, it may be difficult to send a message requiring-private replies in a group channel that works well for both the sender and the recipient(s). For example, at present, if a sender sends a message to a group asking everyone for their home phone number, the channel will be deluged with responses visible to everyone in the channel. This is suboptimal for everyone and uncomfortable for those who do not wish to share their phone number with everyone in the channel. On the other hand, a sender may send a message to the group channel asking that everyone reply using a direct message channel (i.e., a private DM channel) to send their home phone number. This solution is suboptimal in that it requires each responding user to switch channels and, worse, it requires that the sender (i.e., the person requesting the phone numbers) to toggle between as many channels as there are responding people in the group channel in order to view the responses. Worse still, the ability to see the responses in relation to the flow of the group channel conversation is lost.

In an exemplary embodiment of the present invention, messaging devices are permitted to operate in a manner that enables the requesting and/or sending of private messages. For example, a plurality of devices are used for communicating with each other in a group messaging channel (and one or more of those devices may be used for private messaging with other devices of the plurality—as well as possibly outside of the plurality). For purposes of explanation, the devices may be referred to as a first device (that is operated by first group user) and remaining devices (that are operated by remaining group users). The users may be human beings or automated entities (e.g., bots). The first group user and the remaining groups users together may be referred to as a plurality of group users, and the plurality of group users communicate with each other, for example in a messaging channel.

The explanation below includes the use of several of the phrases set forth above. The use of those phrases within or outside of parentheticals, and the explanation below, are merely exemplary to illustrate operation of one or more exemplary embodiments of the present invention. Some names or phrases are used merely as labels to help simplify explanation of one or more exemplary embodiments, and should not be construed as limitations on the scope of the invention or the claims.

In normal operation, a user (Rachel) is a first group user that sends group messages to a group (remaining group users) in a group messaging channel. Rachel may or may not receive her own message as well. Rachel enters a group message (first group text message) into her device (first device). The message is transmitted to the remaining group users so that the message appears on remaining devices operated by the remaining group users, respectively. One or more of the remaining group users can send a message to Rachel (or back to Rachel), with the result that the message sent is displayed on Rachel's device and the devices of the remaining group users. Such communication is thus public, with all members of the message channel seeing each other's messages that are transmitted in the channel.

Figure 5:
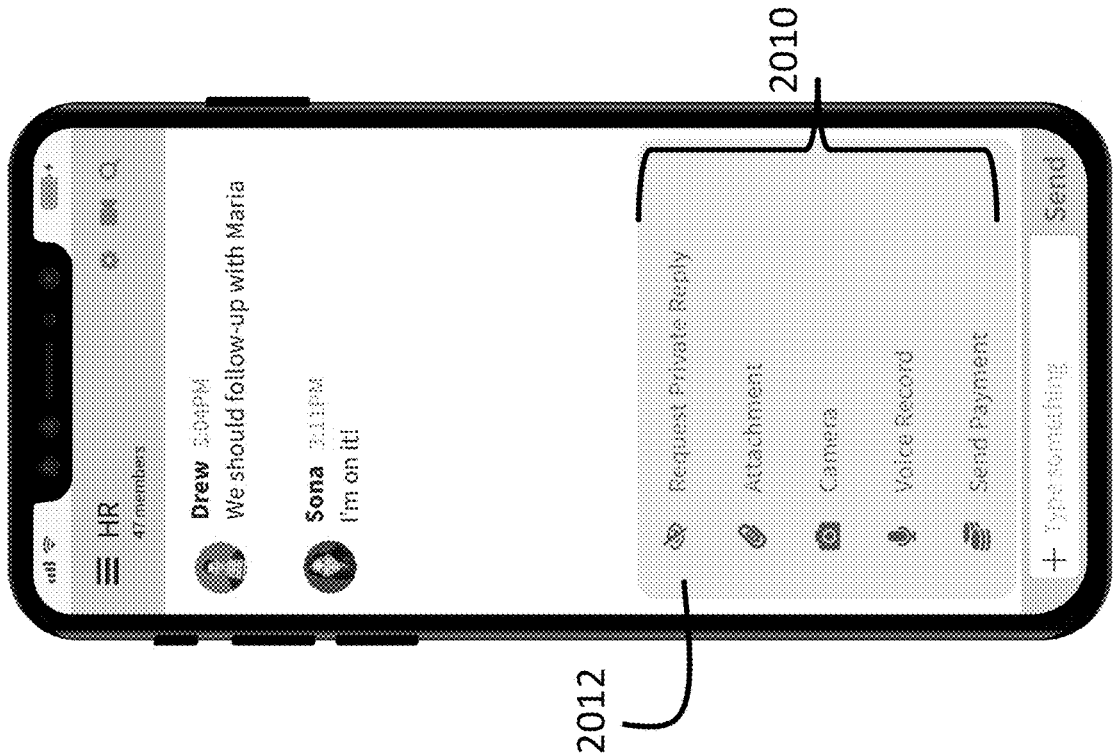
FIGS. 4-9 are screenshots of one or more exemplary embodiments of the present invention.
Figure 4:
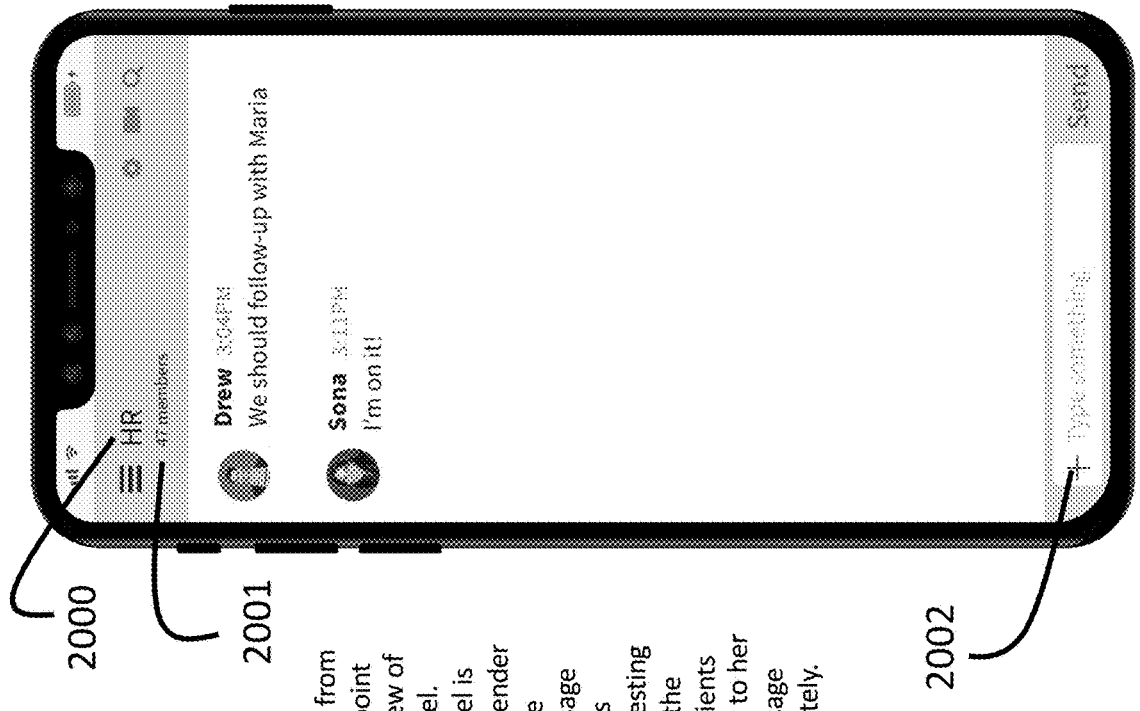

FIG. 4 shows an embodiment of a messaging system from the point of view of Rachel (first group user). Rachel is viewing a group channel (messaging channel) named "HR" (2000) which channel has 47 members (2001). In this embodiment, tapping on the "+" icon (2002) causes a text entry bar associated menu to be displayed (FIG. 5 #2010). The menu allows Rachel to, for example, augment or endow the message she is preparing to send. In this manner, the message can be constructed to invite (or possibly require) a private response outside of the view of other group messaging channel participants.

In the following explanation, the phrase "Request Private Reply" is described. The phrases "Request For Private Reply" and "Private Reply Requested" may interchangeably be used. Also, either phrase may be used in singular form ("Reply") or plural form ("Replies") interchangeably.

FIG. 5 shows an embodiment of a messaging system from the point of view of Rachel. In this example, Rachel has already tapped on the "+" icon (2002) in order to view the selection menu (2010). In this example Rachel wishes to send a message (private reply requested text message) to the group, with the qualification that replies to her group message be private. To do so, Rachel taps the menu in an area associated with the "Request Private Reply" text and "eye" icon (2012).

Figure 6:
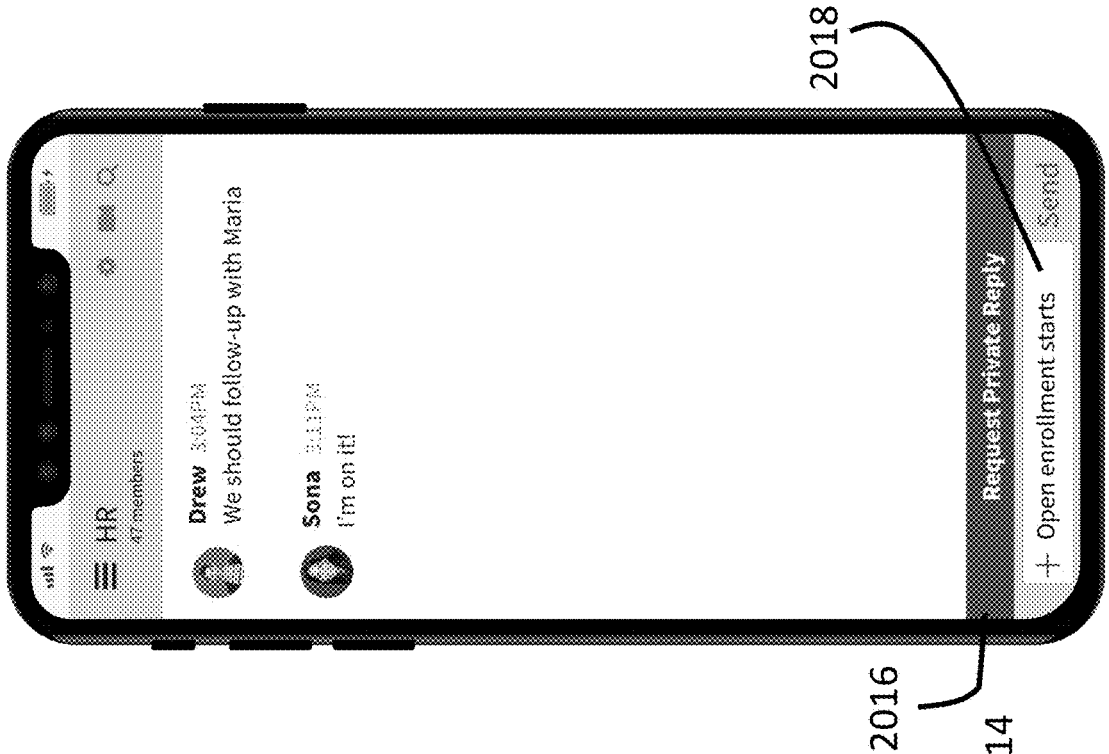

FIG. 6 shows an embodiment of a messaging system from the point of view of Rachel. In this embodiment, responsive to Rachel's selection of "Request Private Reply" an indication of her selection is displayed (2016) to provide her with an assurance and confirmation of her selection. In some embodiments an indication may be omitted or may be different than shown in the example. Any message entered into the text entry area (2014), once sent, will be posted into and/or associated with the channel in accordance with her desire to Request Private Replies. In some embodiments Rachel's message would be received by all members of the group. In some embodiments Rachel could specify which channel members would receive the "private reply requested" post. In other embodiments, Rachel could specify which channel member would be excluded from receiving the "private reply requested" post. In other words, in some embodiments certain channel members can be excluded from seeing her post and/or only specified members will be authorized to respond privately. In some embodiments the channel users to include are inferred. This may be based, for example, on the use of artificial intelligence (AI) and/or keywords, characters, group names, etc. that are used in the message. In other embodiments, inferred channel users are automatically identified by software. Such identification may be based on prestored information in a database, for example. As a further example, a database may include names (or other identifiers) of users that would receive a post and/or names (or other identifiers) of users to be excluded from receiving the post. In some embodiments channel members to include will be specified by the sender or programmatically determined. In some embodiments channel users to exclude will be inferred or programmatically determined in similar manner to the inferences described above. In some embodiments channel members to be excluded will be specified by the sender. In some embodiments channel members to be excluded will be specified by, for example, individual users and/or a system administrator (e.g., "do not disturb" or "do not accept messages requesting a private reply").

Figure 7:
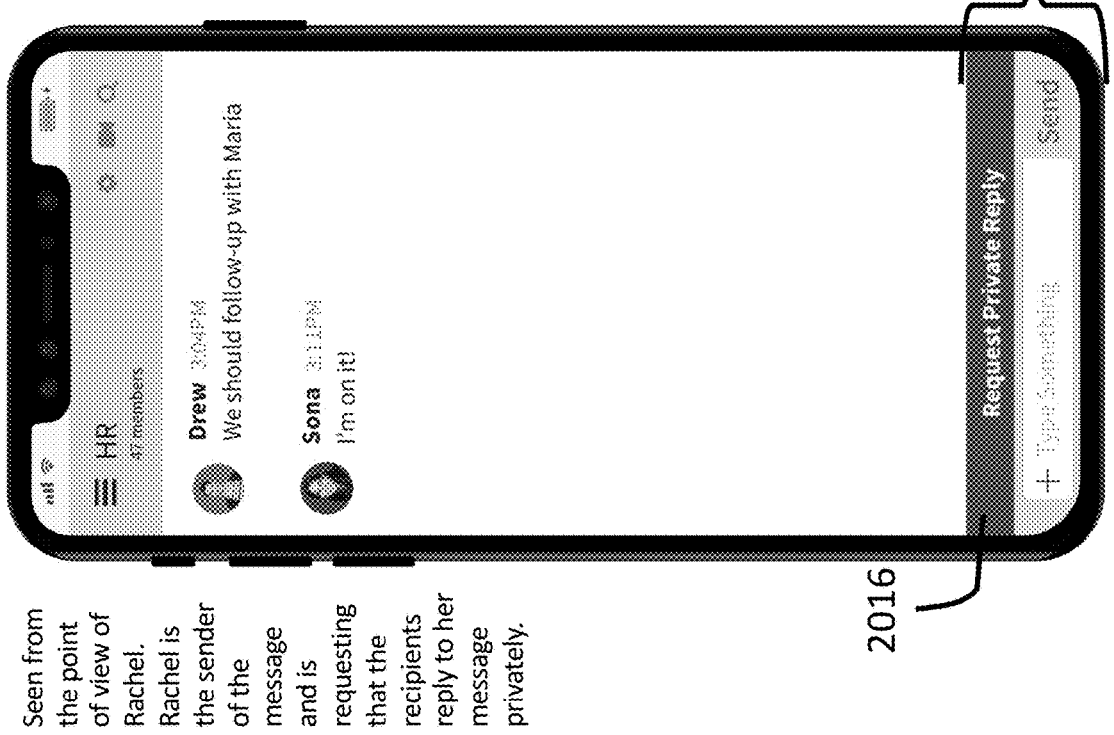

FIG. 7 shows an embodiment of a messaging system from the point of view of Rachel. In this Figure, Rachel has started to enter a message (private reply requested text message) into the text entry bar (2018). In some embodiments, other forms of or methods of input, such as voice, video or handwriting can be used in lieu of or in addition to text input.

Figure 8:
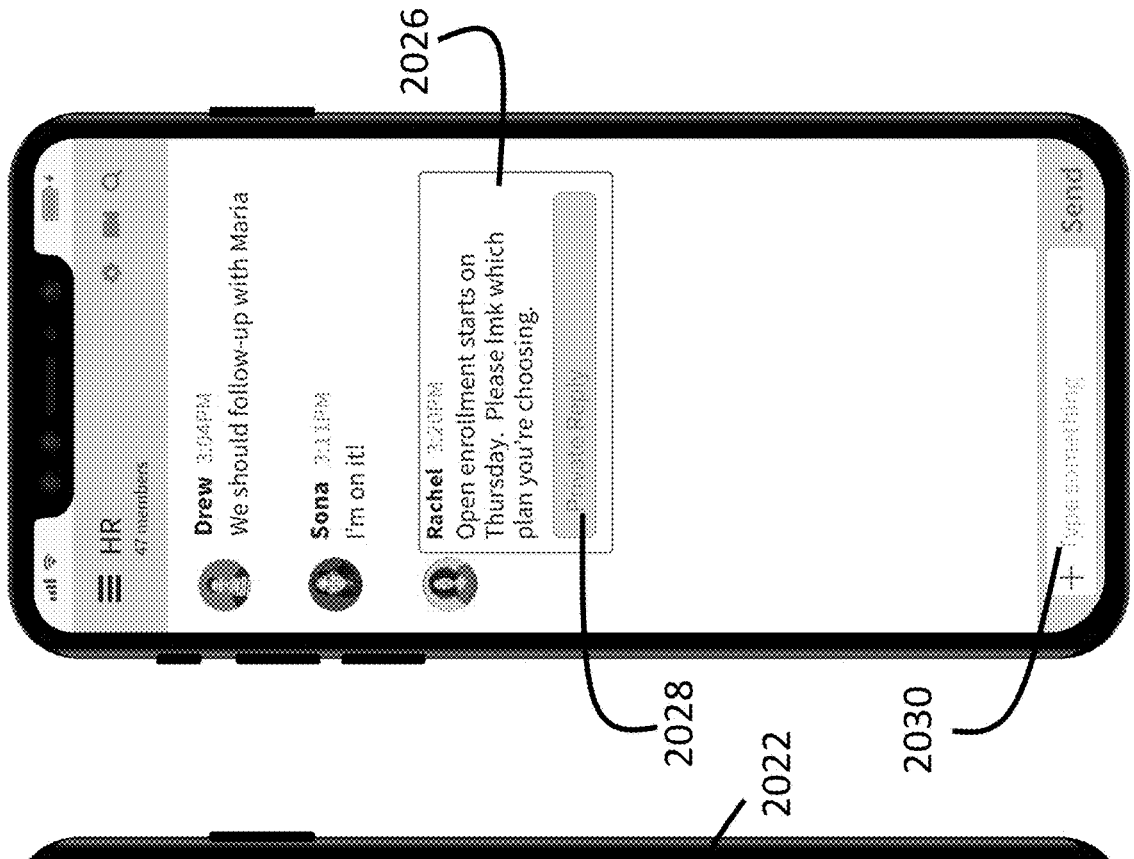

FIG. 8 shows an embodiment of a messaging system from the point of view of Rachel. In this Figure, Rachel has completed the entry of her "private reply requested" message into the text entry bar (2020). By tapping on the Send button (2022) Rachel's message is posted to the channel. In some embodiments the user will click or tap on an icon, text or other visible object to cause the message to be posted to the channel. In some embodiments other methods could be employed such as voice activated, automatic sending after a predetermined amount of time, after a key or character is entered or encountered, as a result of a gesture or other interaction with the device such as shaking the device, immersing the device in a liquid, or exposing the device to a temperature that exceeds a threshold allowance.

Figure 9:
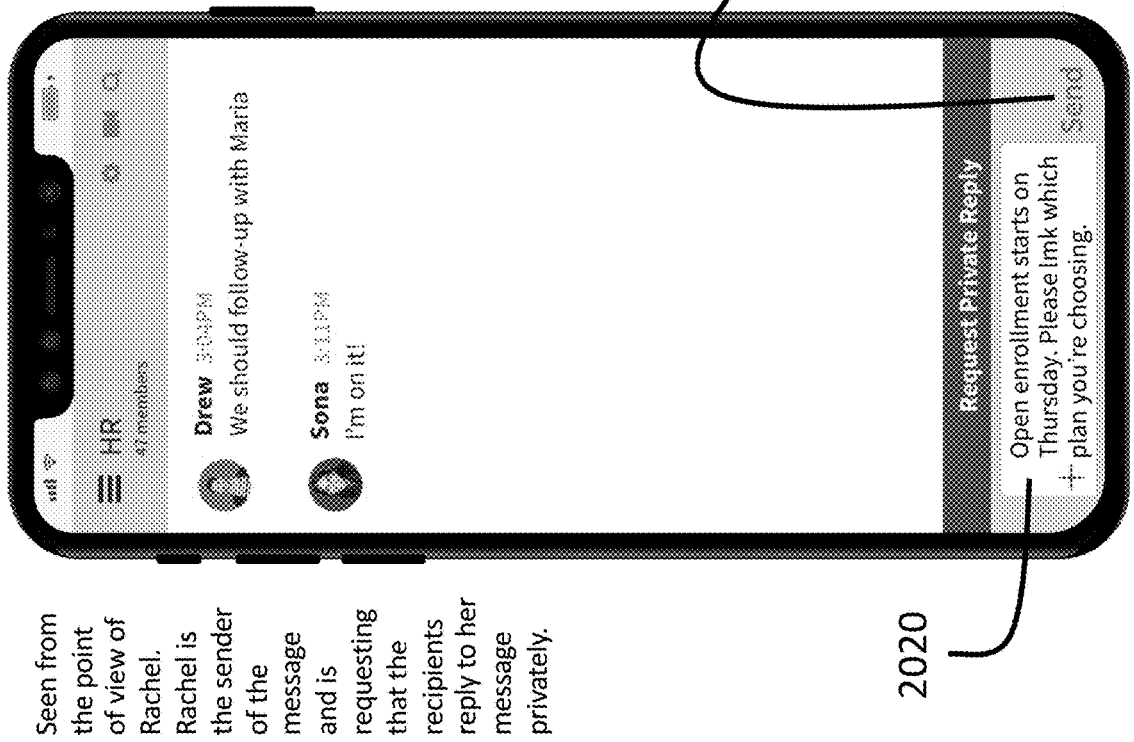

FIG. 9 shows an embodiment of a messaging system from the point of view of Rachel. In this embodiment Rachel's message has been posted to the channel. In this manner, the private reply requested text message appears in the messaging channel and on the devices of some or all users (remaining group users) that are communicating via the channel. Display of the private reply requested text message on Rachel's device may also occur. In this embodiment, the "private reply requested" message is visibly distinguishable (2026) from standard message posts (that are not requesting private replies). In some embodiments the degree or extent of visual or other differentiation may be greater than or less than what is shown in this example. In some embodiments there may be no distinguishing characteristics. In some embodiments distinguishing characteristics are caused to become apparent after a further action such as a toggle switch is activated, or the device is physically manipulated. In this embodiment, in order to make the "private reply requested" message visibly distinguishable, a colored rectangle encloses a portion of the elements associated with the message. In this example a text entry bar (2028) is associated with the "Private Reply Requested" message in a manner to suggest and to encourage recipients of the message to enter their private reply into this "Private Reply text entry box" (2028). In some embodiments other approaches can be employed such as replacing or accompanying the standard (2030) or private reply text entry box with an icon or button that when pressed will cause a further interface to appear or to become accessible. In this embodiment the standard text entry box (2030) remains available for text entry of standard messages, however in some embodiments, an interaction with the Private Reply text entry box (2028) will deactivate or eliminate the standard text entry box (2030). In some embodiments the text entry box (2030) and Private Reply text entry box (2028) are the same. In some examples they are different. In some embodiments more than one Private Reply text entry box may be visible at the same time, as for example, in a case where several messages requesting private replies are posted one after another in a channel.

While a private reply requested message has been disclosed, this is merely exemplary of the type of message that may be sent from one user ("first group user") to another user ("remaining group user"). For example, the private reply requested text message may be one of a plurality of control messages (i.e., messages containing an actionable object) that are received by the remaining group users. Each control message may control interaction between each of the control messages and the remaining group users (i.e. what a remaining group user is permitted or enabled to with or due to a control message, or is prohibited or prevented from doing with or due to a control message) in respectively different manners depending upon the respective type of the control messages. Examples of type of control include: private reply, make message a recipient "to do", post to crawl, allow recipient/s to edit first group user's posted message, prevent the display of further messages in the recipient's message channel until an interaction with or condition of the control type message (such as entry of a password) has been satisfied.

Figure 10A:
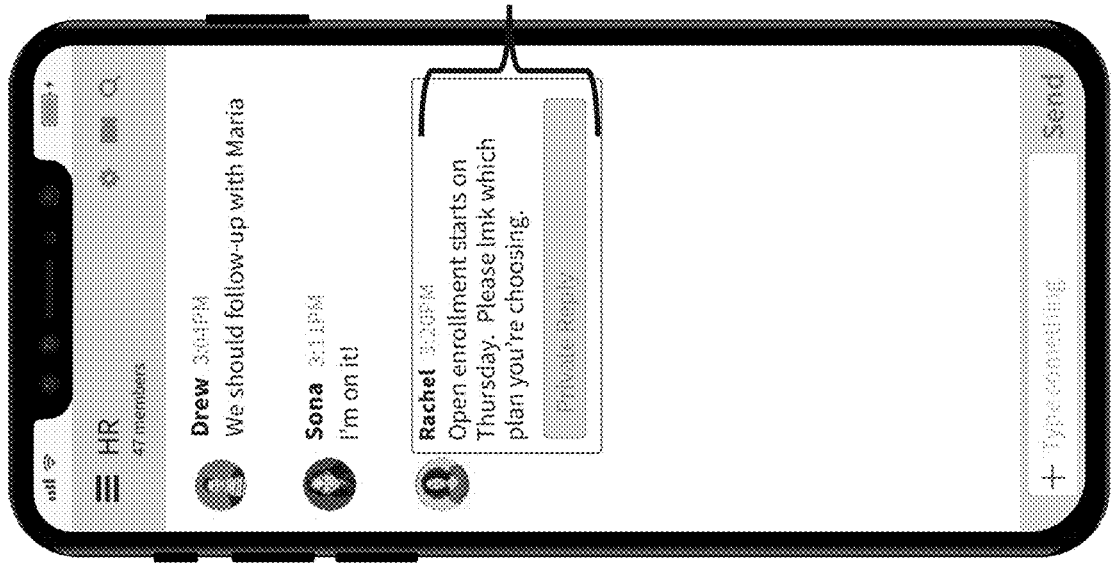
FIGS. 10A-10E are screenshots of one or more exemplary embodiments of the present invention.

FIG. 10A shows an embodiment of a messaging system as seen from the point of view of Rachel. Rachel is the sender of the message (2032) and is requesting that the recipients reply to her message privately. Rachel may be sending her request to all of the members of the group messaging channel, or to some of the members of the group messaging channel. The receiving members may respond privately in the group messaging channel so that only Rachel and the member sending the reply sees the reply. In another embodiment, the response is only seen by Rachel and all the members that are sending a reply (e.g. members sending replies can see each other's replies, members that don't send a reply don't see messages from members that do send a reply). In another embodiment Rachel can send the request private replies message to all or some of the members of the group messaging channel, but direct the system to make the private replies be sent to (made visible to) and possibly aggregated for a further specified group user/s or third party/ies. For example, Rachel may send a message making the following request to all or a subset of channel recipients, "Please let me know if you are available to help at the charity event tonight." Rachel may have the private replies directed to (made visible to) a specified other user, such as solely her assistant, or in addition to Rachel herself. In another embodiment, for each of the remaining group users, and their respective remaining devices (the people/devices that Rachel sends her private reply requested message to) that replies to Rachel's private reply requested text message in the messaging channel with a respective private reply, each respective private reply to Rachel's private reply requested text message is displayed on Rachel's device while displaying fewer than all of the respective private replies on at least one of the remaining devices.

In FIG. 10A, Rachel posted a message to the group channel named "HR". In her message, Rachel requests that each channel member respond to her question privately. In some embodiments the request could exclude certain channel participants. In some embodiments the message can be sent to both channel recipients and via email to others.

In some embodiments a private reply text entry box is visibly associated with the message allowing recipients to enter a private reply into a text entry bar area (2034). In some embodiments some other form of response interface can be presented to recipients. In some embodiments an icon can be clicked, tapped or otherwise selected causing display of a text or other form of response interface to be presented. In some embodiments, other forms of selection such as a swipe or double tap gesture can be implemented to cause the private response interface to be activated. In some embodiments, selection is immediate and in other embodiments selection occurs upon interaction with one or more menus.

Figure 10B:
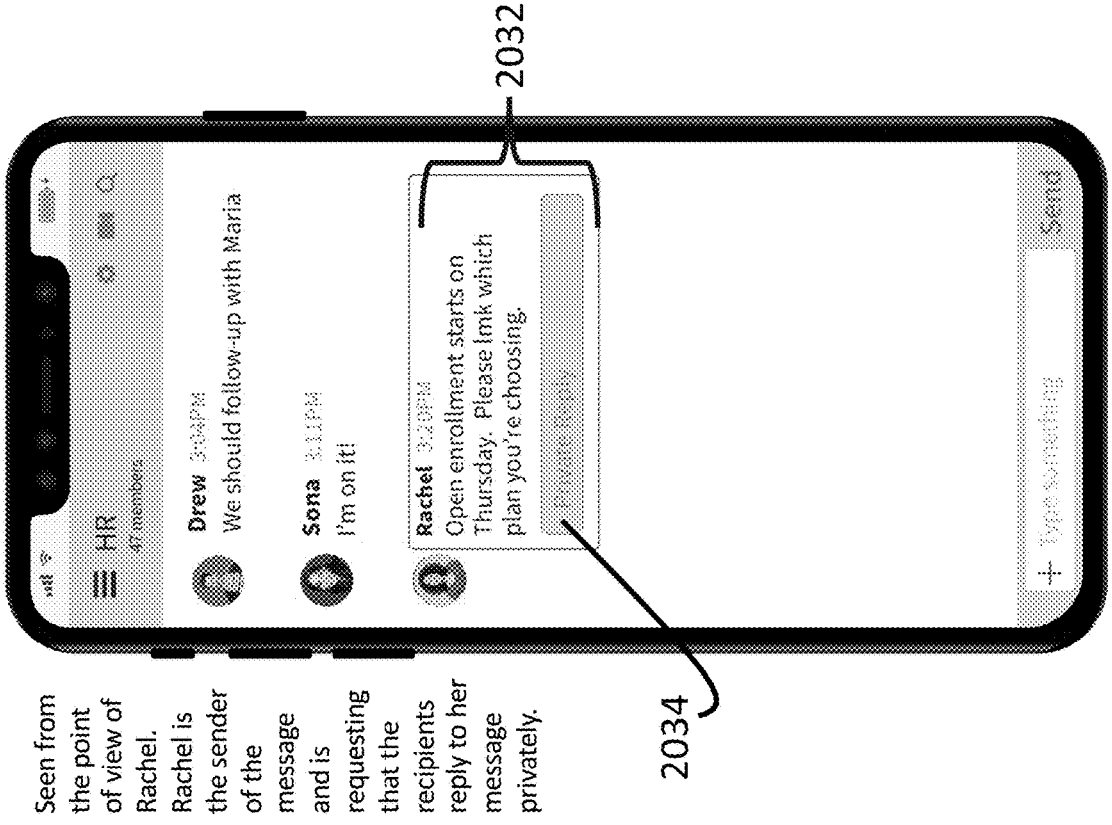

FIG. 10B shows an embodiment of a messaging system as seen from the point of view of Mary. Mary is a recipient of Rachel's "Private Reply Requested" message (2036) which message was posted in the HR channel. In this embodiment Rachel's message (FIG. 10A #2032) and (FIG. 10B #2036) appear identical to the sender (Rachel) and to a recipient (Mary), however in some embodiments, elements of the message could be different. For example, indicators associated with a message that a user sends (from that user's perspective) as opposed to a message that a user receives (from that user's perspective) could be displayed differently to different users depending on perspective.

Figure 10E:
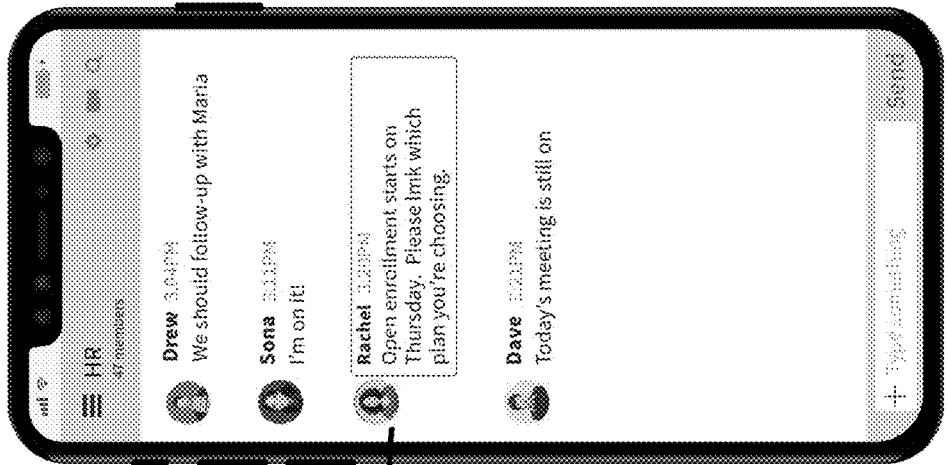
Figure 10D:
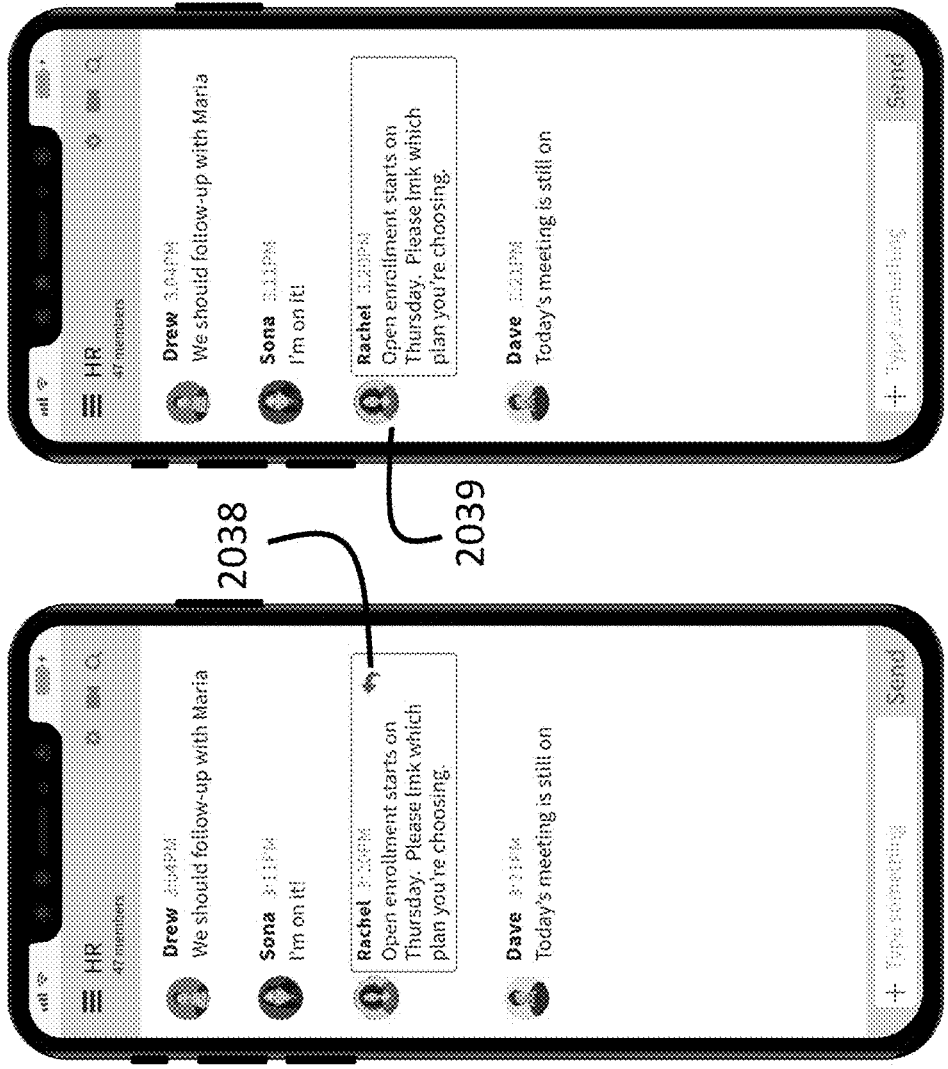
Figure 10C:
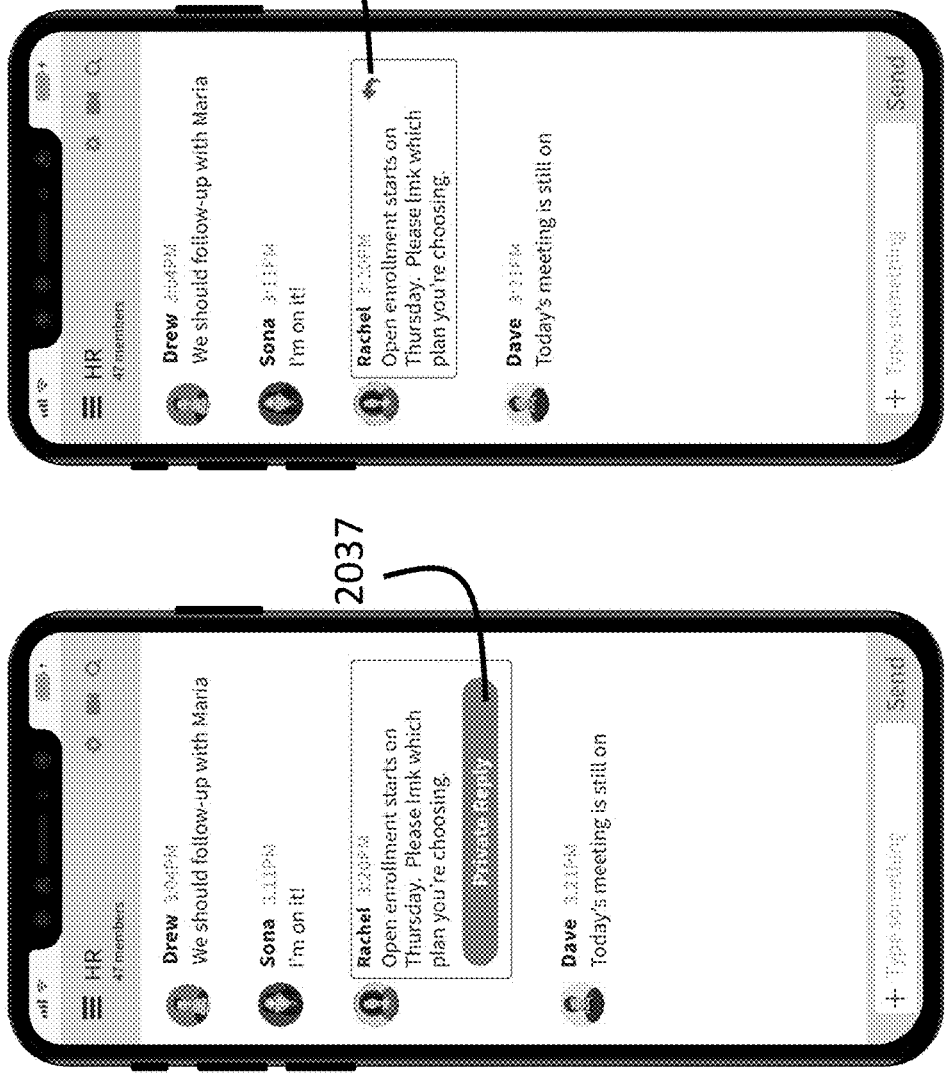

There can be many ways that a message that includes a Private Reply Request can be presented to channel users. FIGS. 10C, 10D and 10E show three such exemplary embodiments. All three of these examples show a display of a message channel from the point of view of Mary, a member of the HR channel and recipient of Rachel's "Private Reply Requested" message.

FIG. 10C In this embodiment Rachel's message includes a visible button (2037) that when tapped or otherwise selected, will initiate a private reply sequence.

FIG. 10D In this embodiment Rachel's message includes an icon (2038) that when tapped or otherwise selected, will initiate a private reply sequence.

FIG. 10E In this embodiment Rachel's message (2039) includes no visible indication of how to initiate a private reply but by swiping, tapping, shaking, speaking or otherwise interacting with an area associated with the message a private reply sequence is initiated nonetheless.

Thus, the private reply requested text message may appear differently in a messaging channel than other group text messages to indicate that the private reply requested text message seeks (or requires) a private reply from each of the remaining group users (i.e. a reply that is not visible to each other or that is not visible to users that don't reply or that is not visible to some users based on user selected or programmatic rules, criteria, algorithms, etc.). In other words, each reply is visible to the person that requested the private reply, but each reply is not visible to other remaining group users that did not receive a request for a private reply. In an exemplary embodiment, a reply is visible to the person who is replying with the reply. In an alternative embodiment, all users that receive a request for reply, and who reply, see each other's replies, but users who did not receive a request for reply do not see replies. In another embodiment, a subset of users is specified to receive a request for private reply text message, but their respective replies are visible to everyone, others, or a specified subset of users in the channel.

Figure 11B:
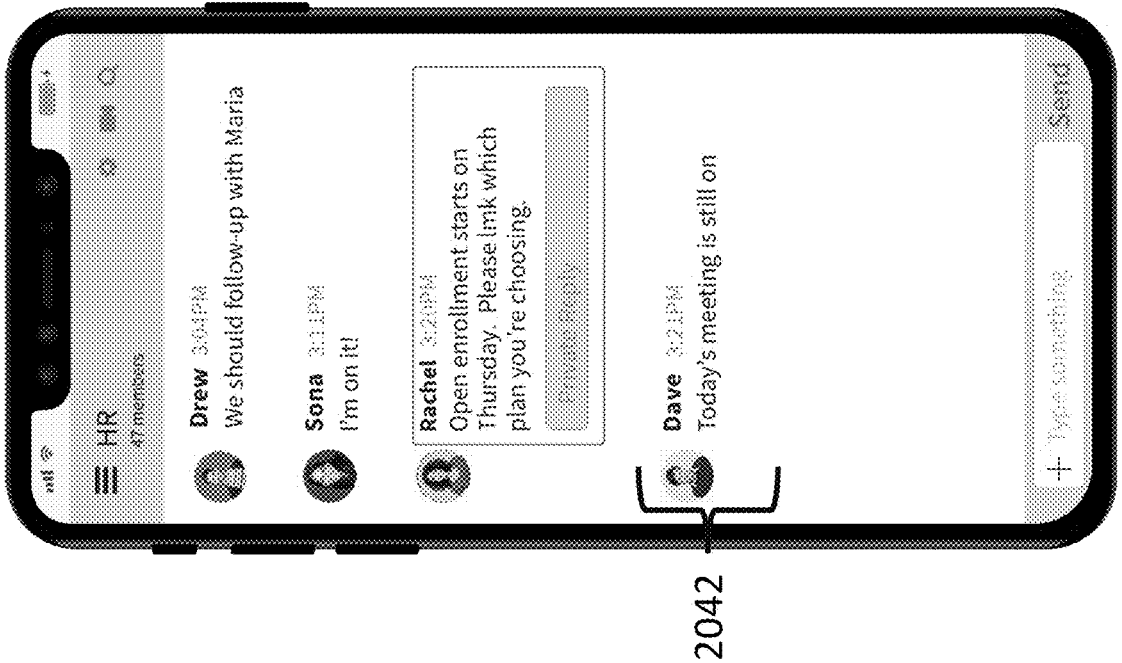
FIGS. 11A and 11B are screenshots of one or more exemplary embodiments of the present invention.
Figure 11A:
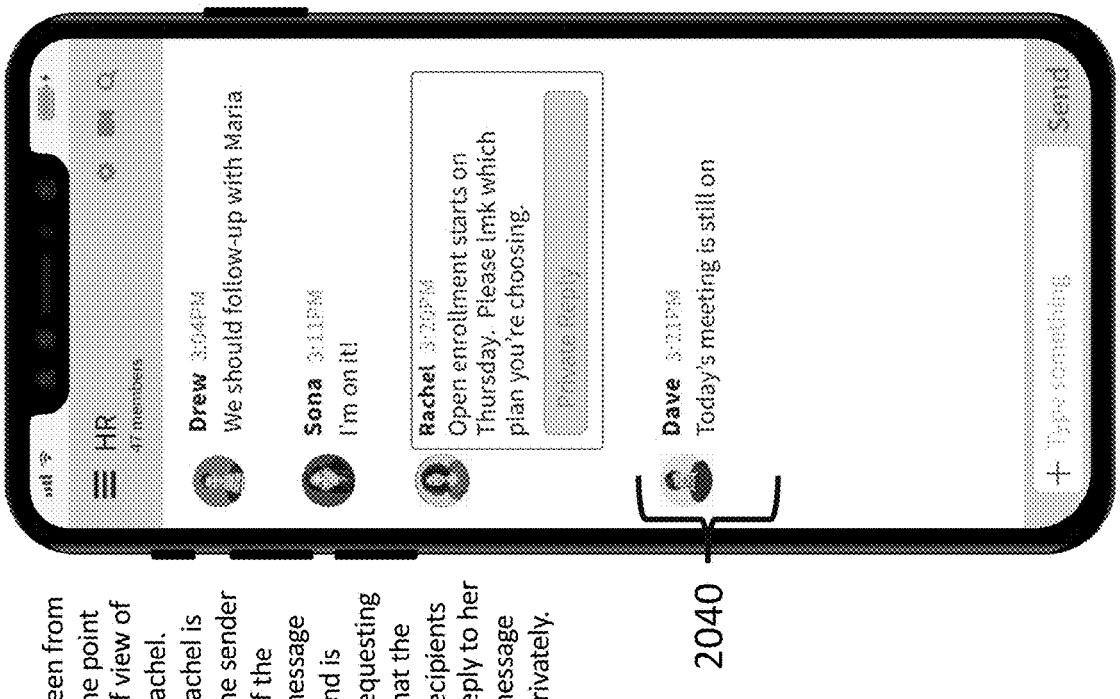

FIGS. 11A #2040 and 11B #2042 show an embodiment of a messaging system as seen from the point of view of Rachel. This Figure shows that time has elapsed, and messages continue to be posted to the HR channel. In this example, user Dave has posted a message to the channel.

Figure 12A:
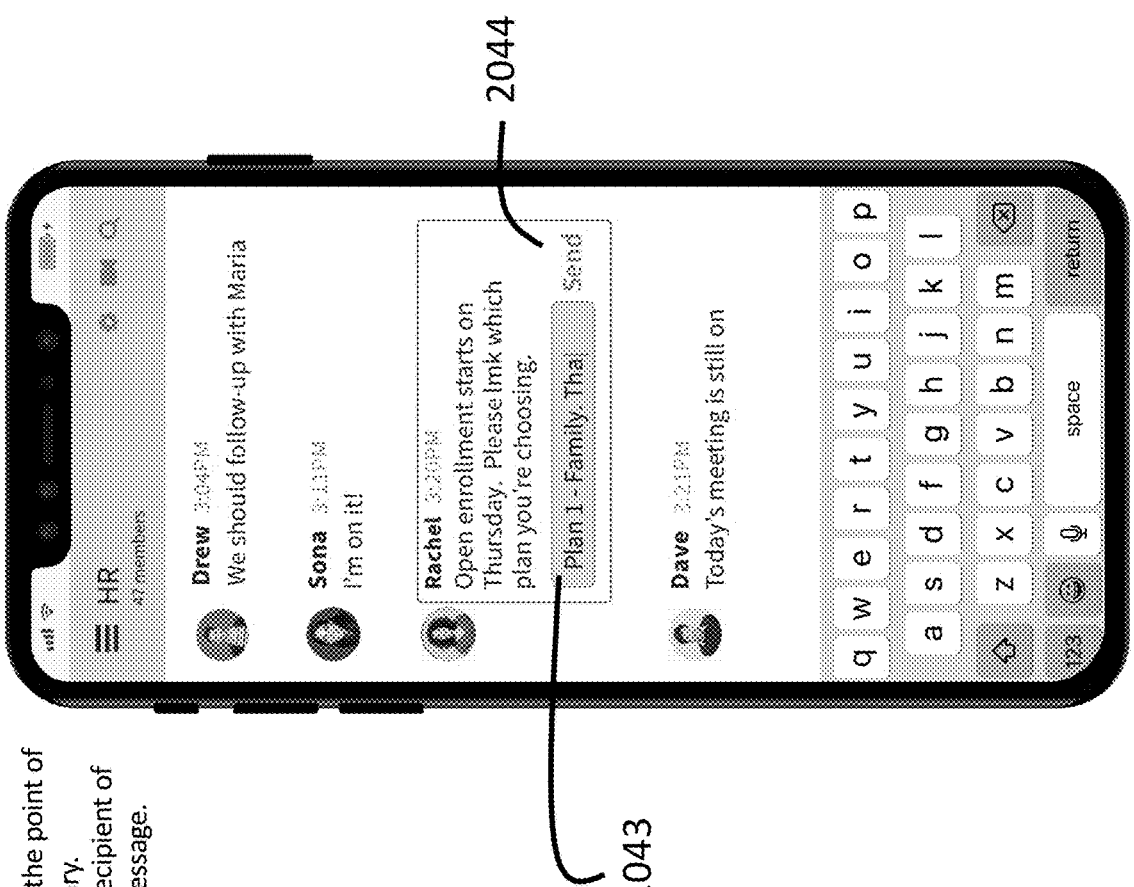
FIGS. 12A-12F are screenshots of one or more exemplary embodiments of the present invention.

FIG. 12A shows an embodiment of a messaging system as seen from the point of view of Mary. In this example, Mary has started to type a private response (2043) to Rachel's question. In this embodiment, the option to Send (2044) the reply is made visible as a result of the respondent initiating (i.e., activating the text entry area) a response. In some embodiments other methods of sending the reply are always available, remain available, or are made to be available such as displaying an icon indicating "tap here to send" or other methods such as by pressing the return button on a keyboard to post the reply message. In some embodiments the standard text entry bar can be activated to serve as the private reply text entry bar, with or without indication to the user of such activation (for example, a change of the color of the standard text entry bar upon activation for private reply).

Once a user has indicated their desire to send a private reply to a "request private reply" message, there can be many ways to facilitate and display the private reply interface. FIG. 12B, FIGS. 12C and 12D, and FIGS. 12E and 12F show three such alternative approaches. All three of these examples show a display of a message channel from the point of view of Mary, a member of the HR channel and recipient of Rachel's "Private Reply Request" message.

Figure 12B:
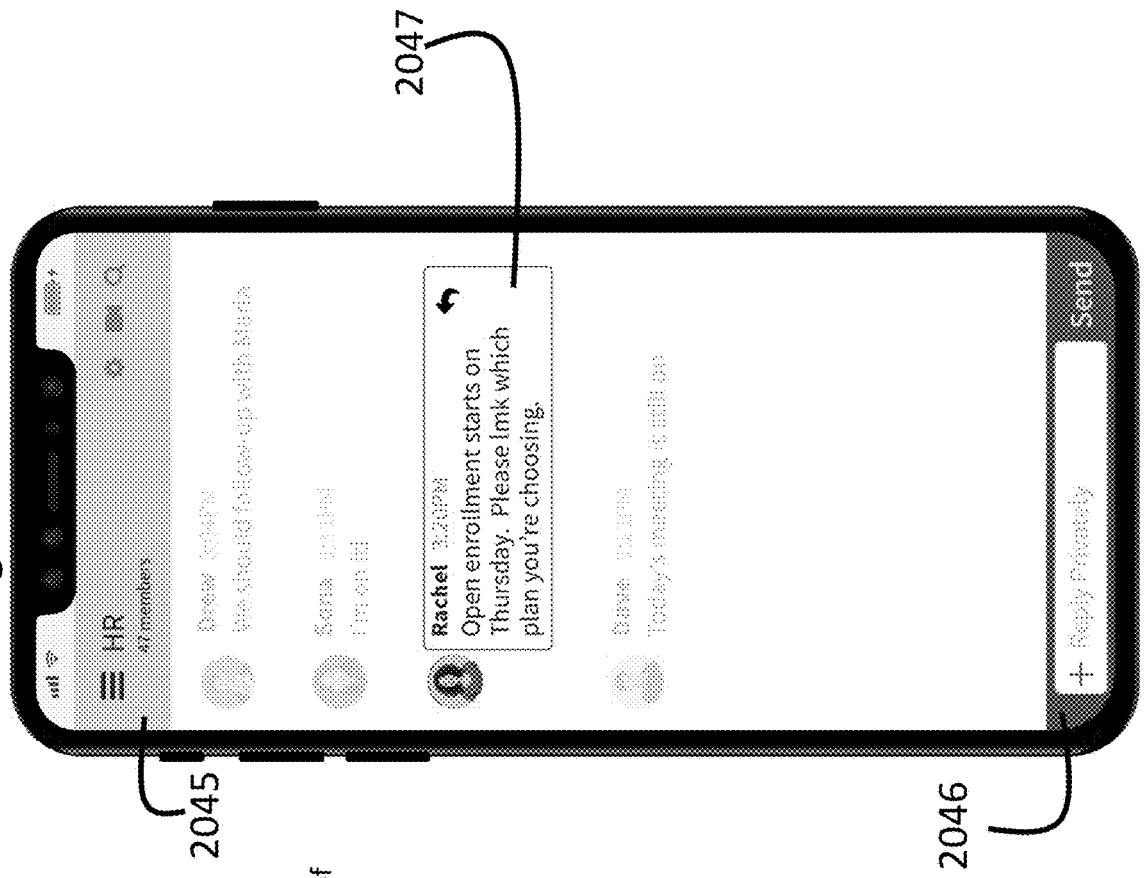

FIG. 12B In this embodiment, all HR channel (2045) messages other than Rachel's message are dimmed. This has the effect of highlighting Rachel's message (2047). In addition, the text entry bar is altered in some way. In this example the standard background color of the text entry area is modified (2046). Furthermore, in this example the text inside the text entry bar that usually reads "Type something" is modified and replaced with the words "Reply Privately". These modifications to the appearance and functionality of the channel serve to indicate to the user that the message they will enter is different in some way from a standard message that they might enter. In this example, the combination of interface modifications serve to inform and reinforce to the user that the message they are about to post will be treated as a private reply to Rachel's message.

Figure 12C:
Figure 12D:
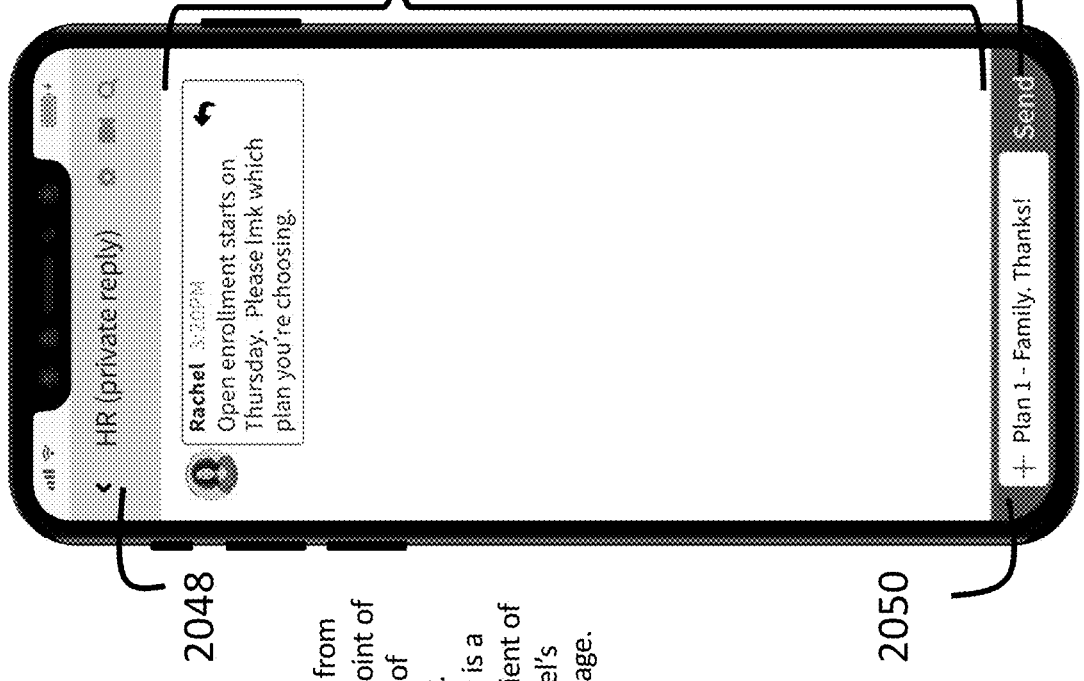

FIG. 12C and FIG. 12D In this embodiment, the display of the HR channel is modified or replaced to isolate and show just Rachel's Private Reply Requested message (FIG. 12C #2049). In addition, the channel indicator in this example is changed from "HR Channel" to "HR (private reply)" (FIG. 12C #2048) to indicate to the user that they are viewing just a subset of the messages from the HR channel; in this example, just the message thread associated with Rachel's spawning "Private Reply Requested" message. In addition, the standard text entry bar is altered in some way. In this example, the standard background color is modified (FIG. 12C #2050). Furthermore, in this example the text inside the text entry bar that usually reads "Type something" is modified and replaced the words "Reply Privately". These modifications to the appearance and functionality of the channel serve to indicate to the user that the message they will enter is different in some way from a standard message that they might enter. In this example user Mary typed "Plan 1—Family. Thanks!" before tapping "Send" to post her private reply to the private thread. In some embodiments other means of posting a message are possible. In this example, once Mary taps "Send" (2022) to post her private reply, Mary's message appears below Rachel's message (FIG. 12D #2051). In this example, Rachel's spawning "private reply requested" message was automatically placed and pinned to the top of the display of the "HR (private reply)" display of the thread. In some embodiments Rachel's message could appear elsewhere or not at all. In some embodiments Rachel's message could appear initially or not, or could be caused to be displayed (e.g., toggle switch). In this example, Mary can choose to add an additional private message to the private thread by entering it in the text entry bar associated with the private thread (FIG. 12D #2052).

In some embodiments there will also be an indication that Mary responded to Rachel's Private Reply Requested message in the spawning channel (in this example, in the HR Channel). The indication could, for example, be associated with Rachel's spawning message and/or there could be an indication (possibly visible only to a respective responder, Mary in this example) placed in the message stream at the point in the message stream (e.g., point in time) that Mary posted her private reply.

Figure 12E:
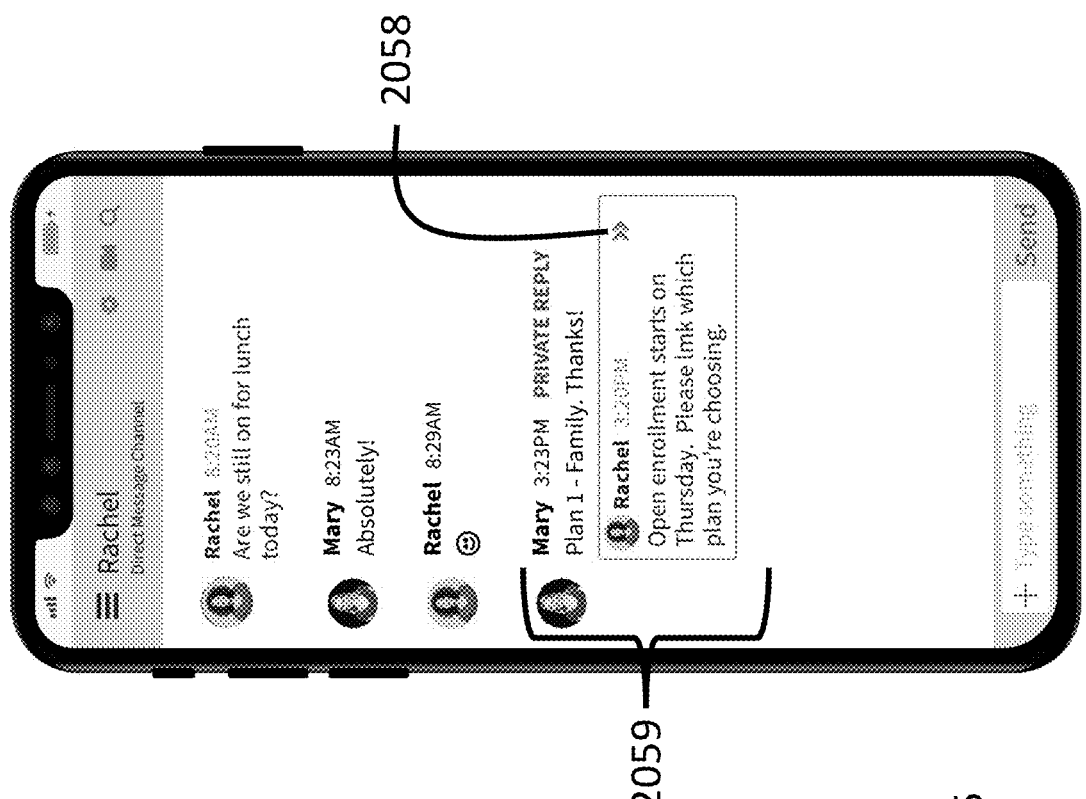
Figure 12F:
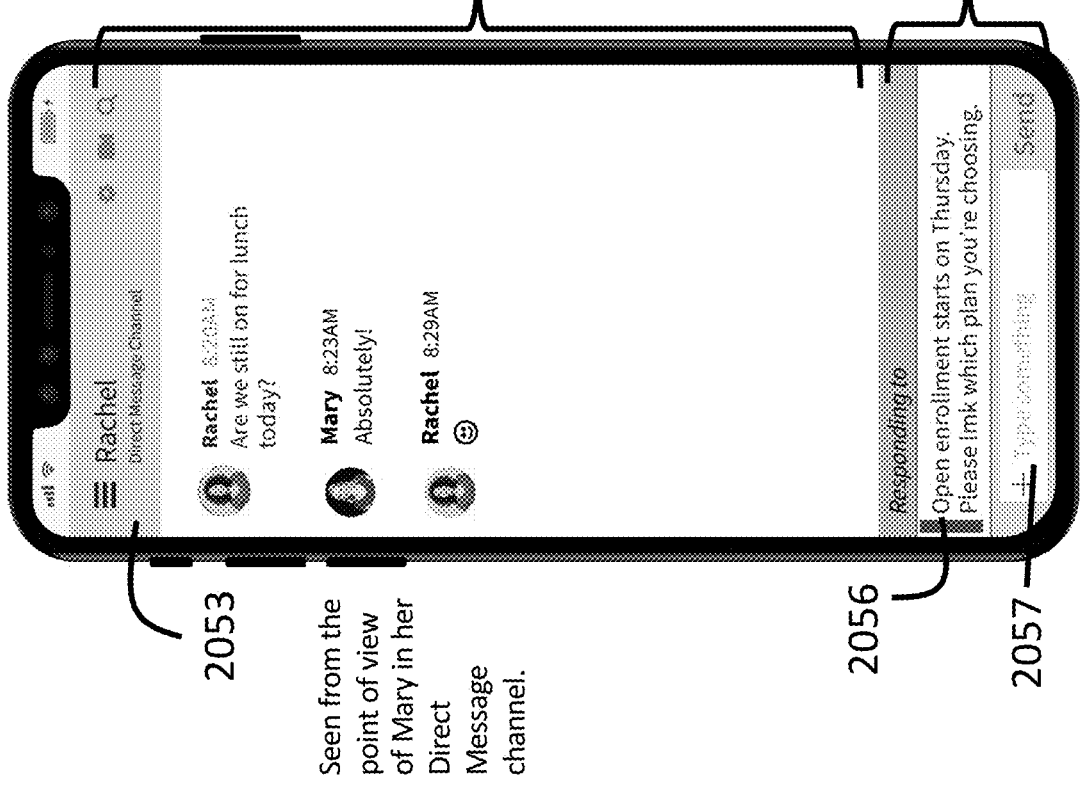

FIG. 12E and FIG. 12F In this embodiment, once the user has indicated their desire to create a private reply to Rachel's message, a direct message channel (a "DM channel") between user Rachel and user Mary (FIG. 12E #2054) is displayed. In some embodiments, such as in this example, the channel switches from the HR channel to a DM channel. In some embodiments the HR Channel remains visible, and a DM Channel window, for example, is added (e.g., one or more pop-out windows). In this example, the user's selection of a means to initiate a private reply, for example by tapping on the "reply" icon as shown in FIG. 10D #2038, causes the DM channel to be displayed along with a modified text entry area (FIG. 12E #2055) including a representation of the message being responded to (FIG. 12E #2056). In this example, user Mary will enter her private reply message "Plan 1—Family. Thanks!" here (FIG. 12E #2057) and post the message to the DM Channel. FIG. 12F shows the DM channel after Mary's message has been posted (FIG. 12F #2059). Note the DM channel in this example also contains messages between Mary and Rachel that are not in the HR channel and that are unrelated to the HR channel or Mary's DM message to Rachel. In this example, the DM channel is not a thread, per se, but a discrete messaging channel. In this example, Mary's post to the DM channel includes a copy (all or part) of Rachel's message from the HR channel. Mary's reply to Rachel's message from the HR Channel is posted in the DM channel along with Rachel's spawning "private reply requested" message from the HR Channel. In this example several indications are provided in the DM channel to distinguish Mary's reply together with Rachel's spawning message from the other messages in the channel. For example, Mary's reply message and Rachel's spawning message are visually associated and marked "PRIVATE REPLY". Thus, a private reply requested text message and each respective reply may be visually and/or logically linked when displayed, for example on Rachel's (the "first") device and/or when displayed for example on Mary's (a "remaining") device. In this example, the message format is distinct in order to provide an indication to the parties to the DM channel that Mary's message is a reply to a "private reply requested" message from another channel. In this example the parties to the DM channel are also provided with a means (FIG. 12F #2058) to "jump" to the message (and/or channel) that spawned the reply message (#2059). In this example tapping on the ">>" icon will cause the display to be updated to a display of Rachel's spawning message in the HR Channel.

Thus, for at least one of the remaining group users that reply to Rachel's private reply requested text message, the respective reply is entered into a respective Direct Message channel between the first group user (Rachel) and the person replying to Rachel (the person who is one of the remaining group users). Each person replying to Rachel may do so in respective DM channels between Rachel and the person replying to Rachel. For clarity, if message exchange occurs in a Direct Message channel between Rachel and the person replying to Rachel's request for a private reply, messaging may have already occurred in that Direct Message channel between Rachel and the person replying to her request for a private reply, and before the person replying to Rachel actually replies.

In some embodiments there will also be an indication that Mary responded to Rachel's "private reply requested" message in the spawning channel (in this example, in the HR Channel). The indication could be, for example, associated with Rachel's spawning message and/or there could be an indication (possibly visible only to a respective responder, Mary in this example) placed in the message stream at the point in the message stream (e.g., point in time) that Mary posted her private reply.

Figure 13A:
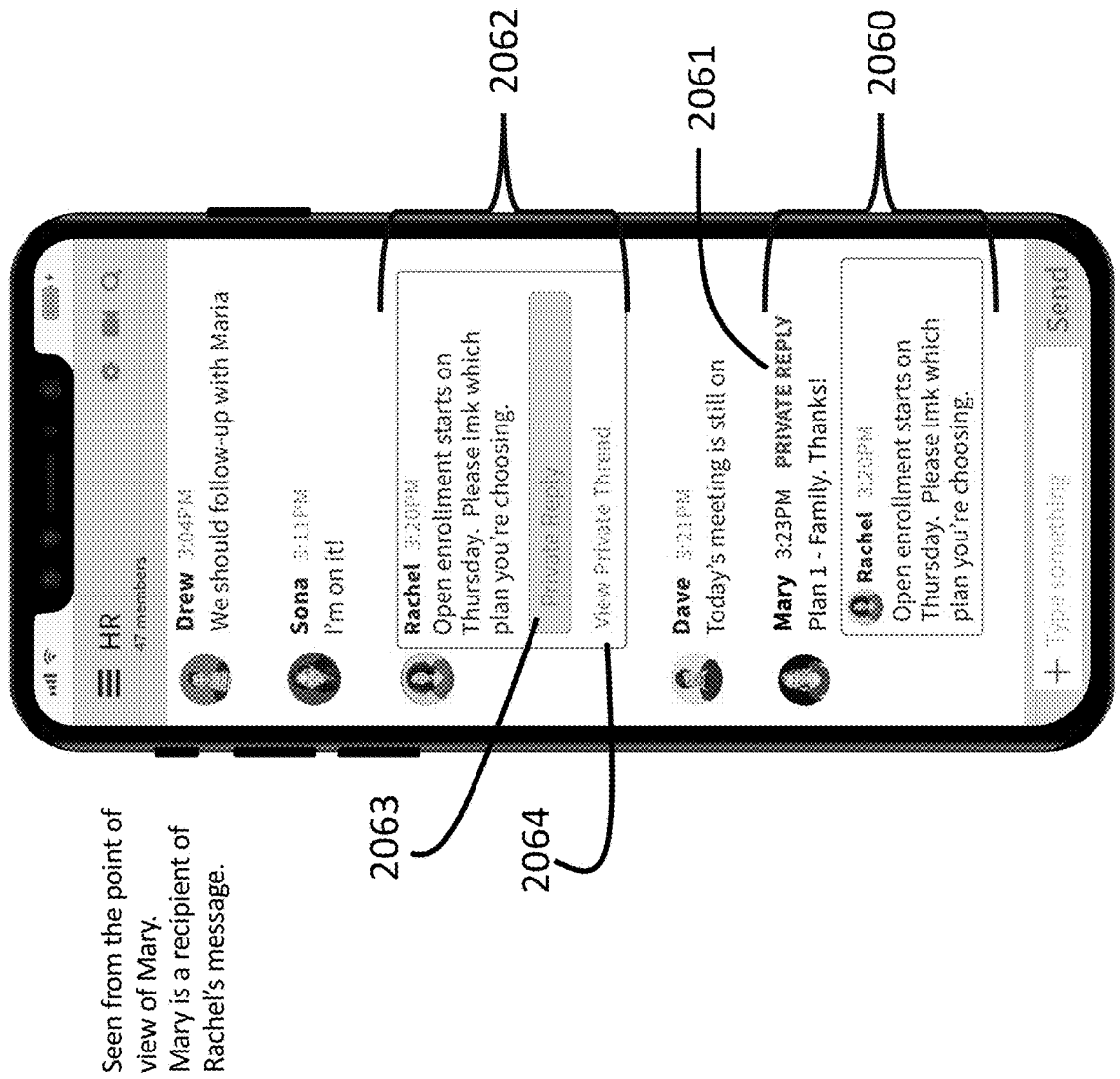

FIG. 13A shows an embodiment of a messaging system as seen from the point of view of Mary. In this example Mary's reply is posted to the channel in a visually distinctive manner (2062) and in the chronological order in which it was posted to the channel. In addition, Mary's display of Rachel's 3:20 PM message (2062) is updated to indicate that Mary has posted a private response (2064). In this example Mary can tap on "View Private Thread" (2064) to cause a change of display that, in this example, will display Rachel's original (spawning) message along with Mary's response. In some embodiments tapping (or otherwise indicating selection) a specific object or area and/or tapping anywhere in the message area will cause the display of one or more of the messages associated with the private message thread. In some embodiments one or more private replies to the same spawning message are permitted. In this embodiment clicking, tapping or otherwise selecting the "View Private Thread" button will cause the display of the private messages associated with Rachel's spawning message to appear aggregated and all together. In some embodiments intervening unrelated messages are eliminated from display, blurred or presented in such a way as to not distract from the private message thread. In some embodiments the related private messages are presented in a way to highlight their association as a thread of related messages. In some embodiments private responses can be deleted, edited and/or replaced. In some embodiments private response will be automatically deleted or modified based on a condition or conditions being met such as elapsed time, keywords, or upon suspension or deletion of a user account.

FIG. 13B shows an embodiment of a messaging system as seen from the point of view of Mary. This FIG. 13B shows an alternative embodiment to FIG. 13A. Unlike the embodiment depicted in FIG. 13A, in this embodiment neither Mary's private reply (nor any indication of her private reply) is posted as an independent message in the message stream. In this embodiment only Rachel's original message in the HR message channel is updated to reflect Mary's response (2065).

FIG. 13C shows an embodiment of a messaging system as seen from the point of view of Mary. This FIG. 13C shows an alternative embodiment to FIG. 13A. Unlike the embodiment depicted in FIG. 13A, in this embodiment neither Mary's private reply (nor any indication of her private reply) is posted as an independent message in the message stream.

FIG. 13D shows an embodiment of a messaging system as seen from the point of view of Mary. This FIG. 13D shows an alternative embodiment to FIG. 13A. Unlike the embodiment depicted in FIG. 13A, in this embodiment neither Mary's private reply (nor any indication of her private reply) is posted as an independent message in the message stream. In this embodiment only Rachel's original message in the HR message channel is updated to reflect Mary's response (2066). In this example Mary can tap on "View Private Thread" (2054) to cause a change of display that in this example will display Rachel's original (spawning) message along with Mary's response and any subsequent private interactions associated with the private thread.

Figure 14B:
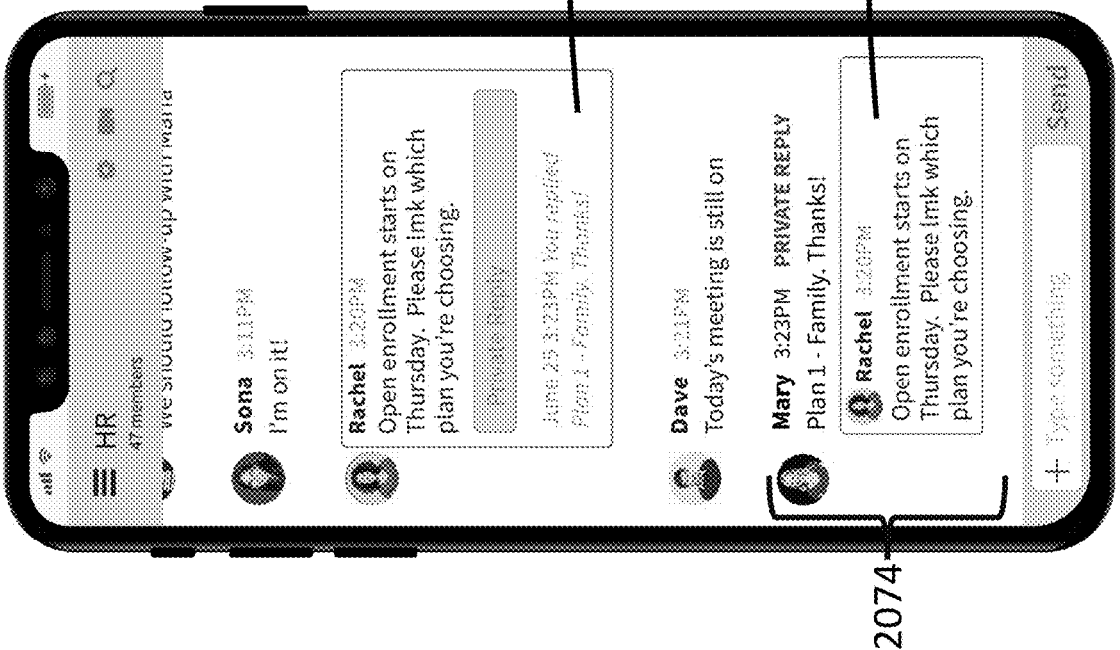
FIGS. 14A and 14B are screenshots of one or more exemplary embodiments of the present invention.
Figure 14A:
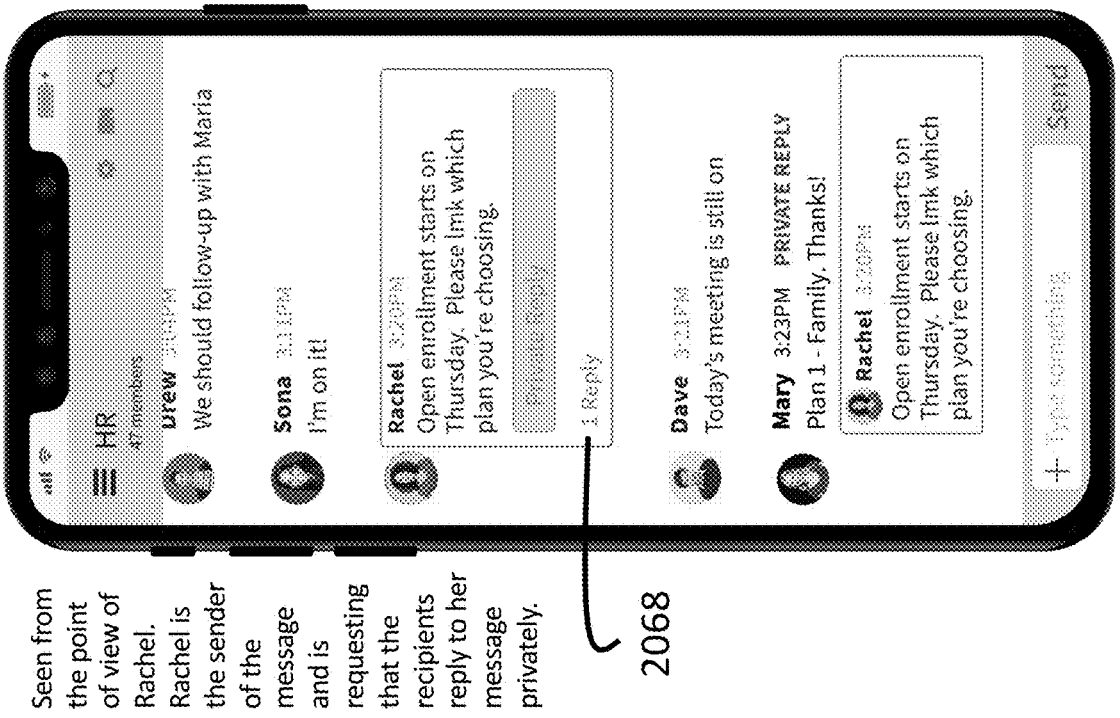

FIG. 14A shows an embodiment of a messaging system as seen from the point of view of Rachel. In this embodiment, Rachel is able to see that she has received one reply to her Private Replies Requested message. In some embodiments other methods of indication can be used, for example, an icon, a numeric counter display, or a portion or all of one or more private replies may be displayed. In some embodiments no indication is visible or sensorially discernable but can be caused to be presented by some means such as by tapping or otherwise interacting with the request private reply message, a private reply, or some other area or object displayed. In some embodiments the display of one or more of the private replies may appear or disappear over time or based on some other rule, rules, condition or conditions.

FIG. 14B shows an embodiment of a messaging system as seen from the point of view of Mary. In this embodiment, Mary is able to see at least a portion of her private reply associated with Rachel's 3:20 PM spawning "private reply requested" message (2070). In addition, Mary is able to view her 3:23 PM response in context in the channel message stream (2072). In this embodiment, Mary's private reply (2074) is made to be visually distinguishable, in order to highlight, for her, the fact that it is a private reply. In some embodiments the parties associated with private replies may wish to partially or fully hide the display of content of their respective reply (or replies), whether transmitted or received from/on their device. In some embodiments a mechanism, such as a, toggle or icon can be provided and can be selected by the user to hide the existence of, or content of, one or more private messages.

Figure 15B:
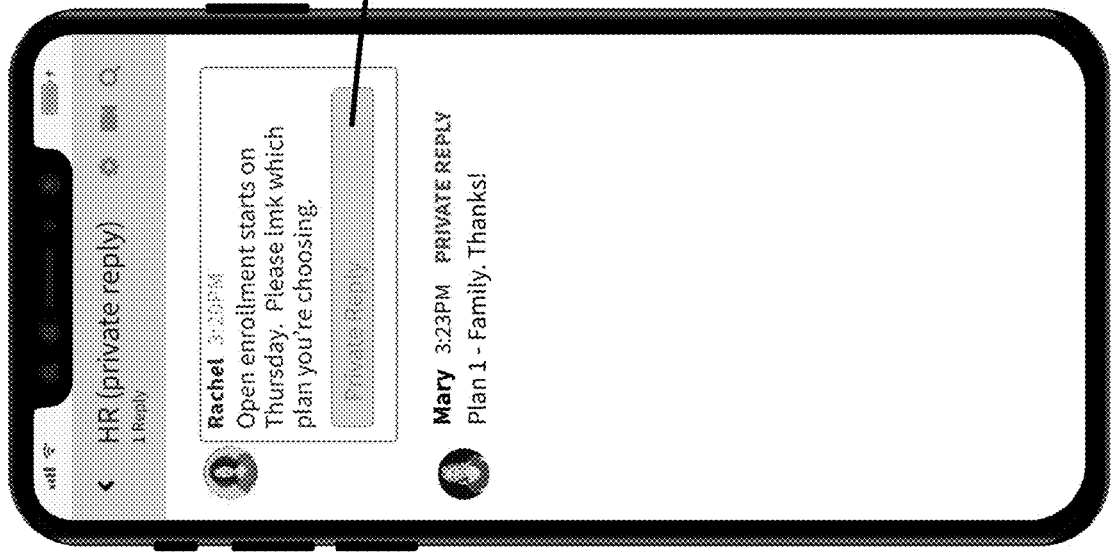
FIGS. 15A and 15B are screenshots of one or more exemplary embodiments of the present invention.
Figure 15A:
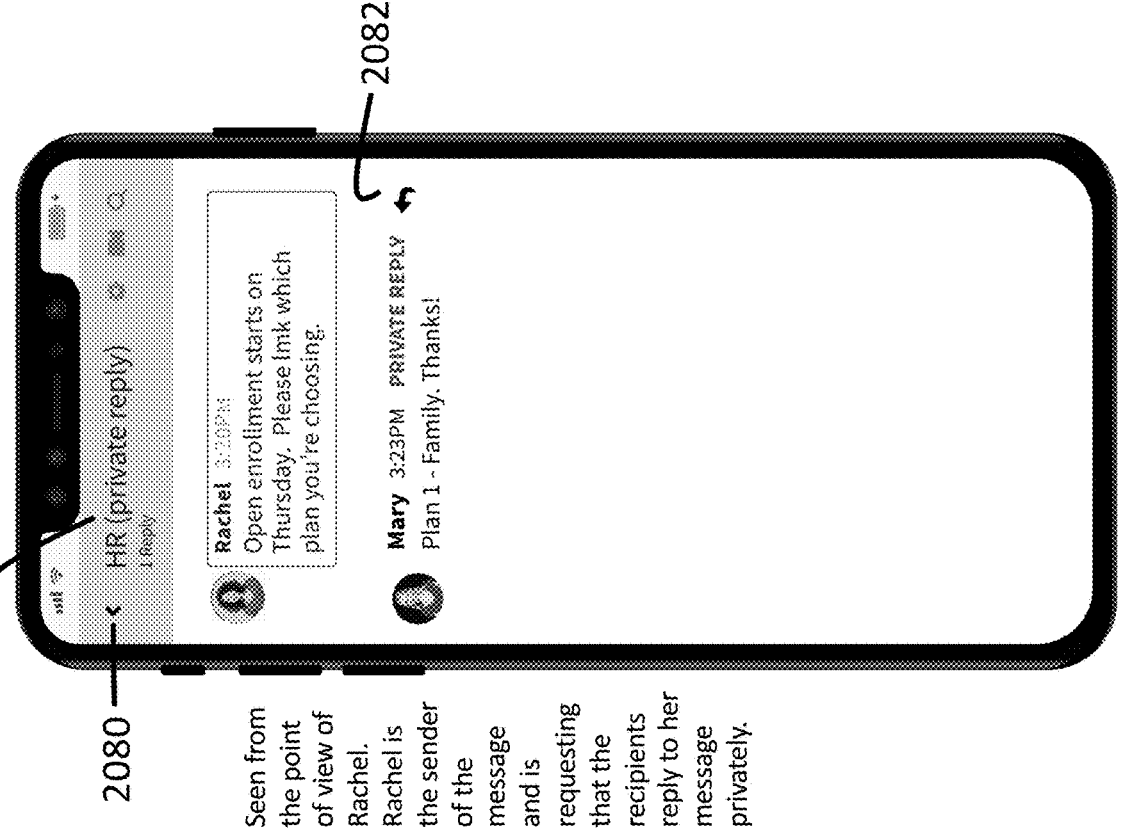

FIG. 15A shows an embodiment of a messaging system as seen from the point of view of Rachel. In this embodiment, Rachel has caused the display of the private thread by tapping or otherwise indicating selection of an area associated with the message, in this example by tapping on "1 Reply" (FIG. 14A #2068). In some embodiments swiping, speaking, shaking or tapping or interacting with an area associated with the spawning message or one or more associated private messages will cause a further or altered or modified display of the private message thread.

FIG. 15A also shows an embodiment that displays a modified header. The channel name "HR" has been modified (2078) to reflect the fact that the user is viewing a subset of information from the HR channel consisting of, in this example, the spawning message and its associated private reply(ies). In this example, Rachel, who is the author of the spawning message sees all of the private replies to her message. In this example, only the spawning private request private reply message and the private replies to it are displayed, which is an advantage over her having to navigate through unrelated messages in the channel to identify the private replies to her message. Aggregating the private replies in this way saves Rachel time and makes it easier for her to view and compare responses.

In this embodiment Rachel can post a further private reply to one or more of the private replies she received (2082). In other words, she can continue a dialog with responders and the associated further private messages will be associated with one another. In some embodiments further messaging (nesting) within the thread is not allowed.

In this example, selecting the "<" icon (2080) reverts the display to the base HR channel view.

FIG. 15B shows an embodiment of a messaging system as seen from the point of view of Mary. In this embodiment, Mary has caused the display of the private thread by tapping or otherwise indicating selection of an area associated with the message, in this example by tapping on an area associated with a private message associated with the private message thread (FIG. 14B #2070 or #2074).

In this embodiment, Mary can post further private replies to the private thread by entering her message in the Private Reply text entry bar associated with the private thread spawning message (2086). In some embodiments the text entry mechanism appears elsewhere on the display. In some embodiments the text entry mechanism is not initially presented but can be caused to be displayed and/or otherwise activated. In some embodiments a private thread is read only, in other words further private messaging associated with the thread cannot be enter from this display of the thread or at all.

Figure 16:
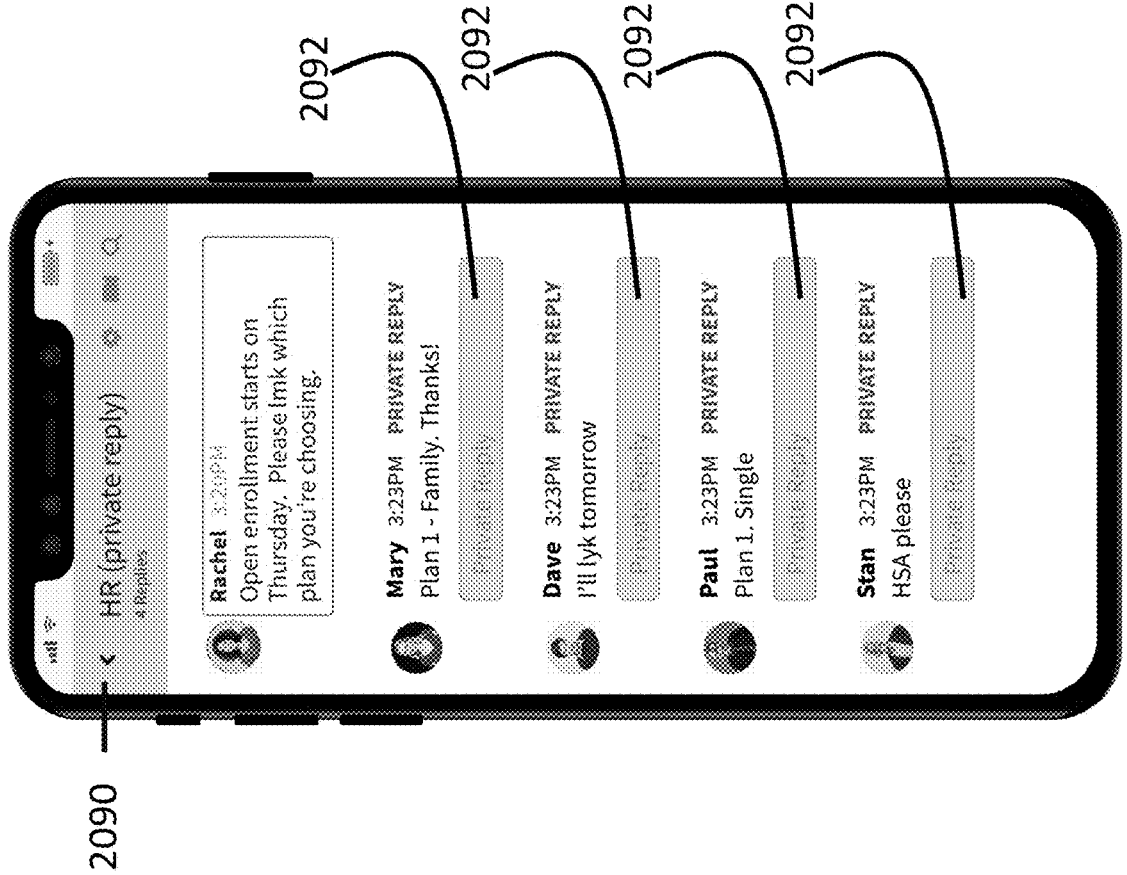
FIG. 16 is a screenshot of one or more exemplary embodiments of the present invention.

FIG. 16 shows an embodiment of a messaging system as seen from the point of view of Rachel. In this embodiment, Rachel sees an aggregated group of private replies to her spawning private replies requested text message. In this embodiment, Rachel can send a further private message in response to any of the private responses she received. In some embodiments further private messaging is not permitted. In this embodiment an indication in the form of a text entry box (2092) is displayed and associated with specific private replies. Entering text into these text entry areas will post a further private message to the thread and associate the further message to the thread and/to specific private reply. In some embodiments other methods can be applied to indicate and launch a further private message creation and posting function.

In this example, selecting the "<" icon (2090) updates the display to the base HR channel view.

Figure 17A:
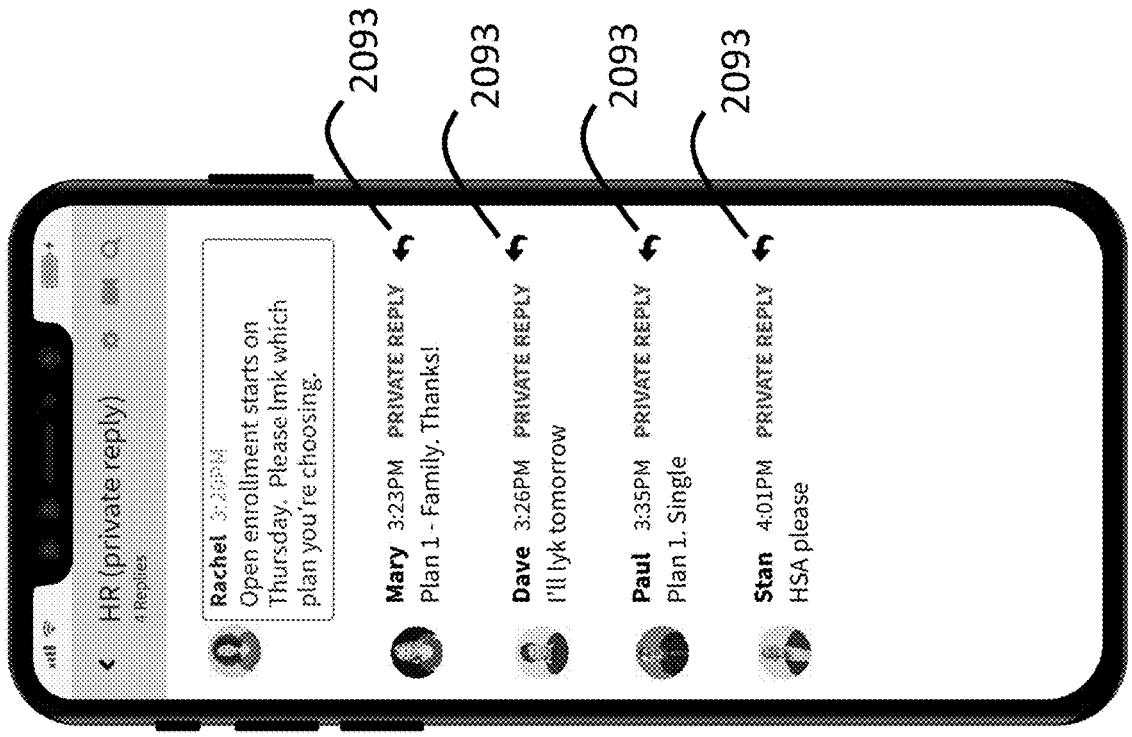
FIGS. 17A and 17B are screenshots of one or more exemplary embodiments of the present invention.

FIG. 17A shows an embodiment of a messaging system as seen from the point of view of Rachel. In this embodiment, Rachel sees an aggregated group of private replies to her spawning private reply requested message. In this embodiment, Rachel can send a further private message in response to any of the private replies she received. In some embodiments further private messaging is not permitted. In this embodiment an indication in the form of reply icon (2093) is displayed and associated with specific private replies. Tapping one or more of the reply icons will cause a private reply interface to be presented; for example, FIG. 18A.

Figure 17B:
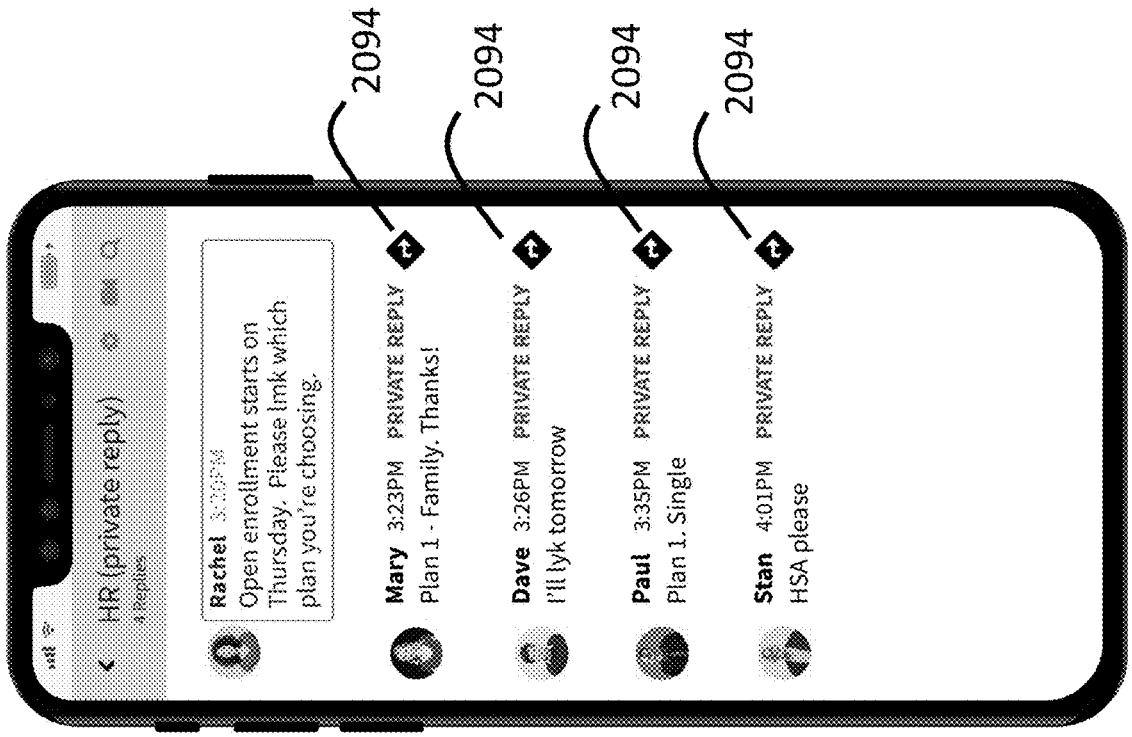

FIG. 17B shows an alternative embodiment of a messaging system as seen from the point of view of Rachel. In this embodiment, Rachel sees an aggregated group of private replies to her private replies requested spawning message. In this embodiment, Rachel wishes to reference one of the private replies in the group channel. She wishes to add a comment of her own and associate it with the private message and post them together in the group channel visible to the plurality of users. To reference one or more private messages, Rachel indicates her selection/s of [a] private message/s she wishes to make public in the group channel. In this example, Rachel indicates her selection by tapping on one or more of the "reference this message" icons (2094). Her selection, in this embodiment causes the selected message to appear in a visually distinguishable manner (FIG. 18B #2105) and adds a display of a visual indication intended to confirm for Rachel that the selected message will be referenced (FIG. 18B #2104). In addition, in this embodiment, a text entry bar prompting Rachel to "Add Comment" (FIG. 18B #2103) is displayed, and is where Rachel can add/enter (e.g., type, record) a message of her own that will be associated with the private message being referenced and subsequently posted publicly in the HR group channel. In some embodiments private messages can be referenced. In some embodiments private messages cannot be referenced.

Figure 18A:
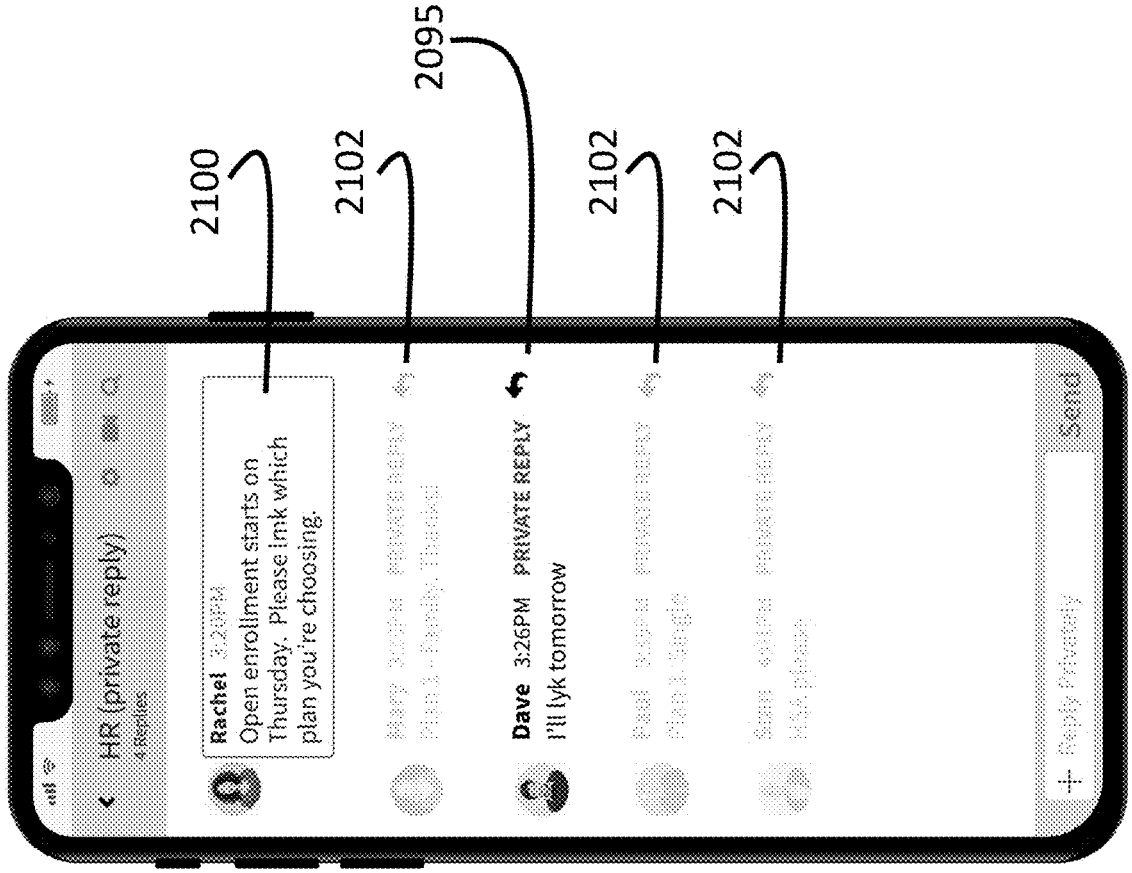
FIGS. 18A-18D are screenshots of one or more exemplary embodiments of the present invention.

FIG. 18A shows an embodiment of a messaging system as seen from the point of view of Rachel. In this example Rachel has elected to post a further private message in response to a private reply message she received from Dave. In this example, tapping on the reply icon (2095) caused the other messages to fade making it clear to Rachel that her further private reply will be associated with the message in focus. In some embodiments, the user can select and reply to more than one private response. This could be useful in cases where a common question is asked and the user (Rachel in this example) wishes to type the response once and have it sent to more than one person at the same time. So for example if 6 people respond to Rachel's spawning message with a similar message asking "can I have more time to decide on a health plan?" she can tap on one or more of the reply icons, and reply privately to each individual but only have to enter her message once.

Thus, for example, when a user (each of the remaining group users) replies to a private reply requested text message, the messaging between the user sending the private reply requested text message and the person responding to the private reply requested text message can occur in a private thread.

FIG. 18B The display depicted in this embodiment is based on the alternative embodiment depicted in FIG. 17B and indicates Rachel's selection of a private reply message she wishes to reference (2105).

Figure 18C:
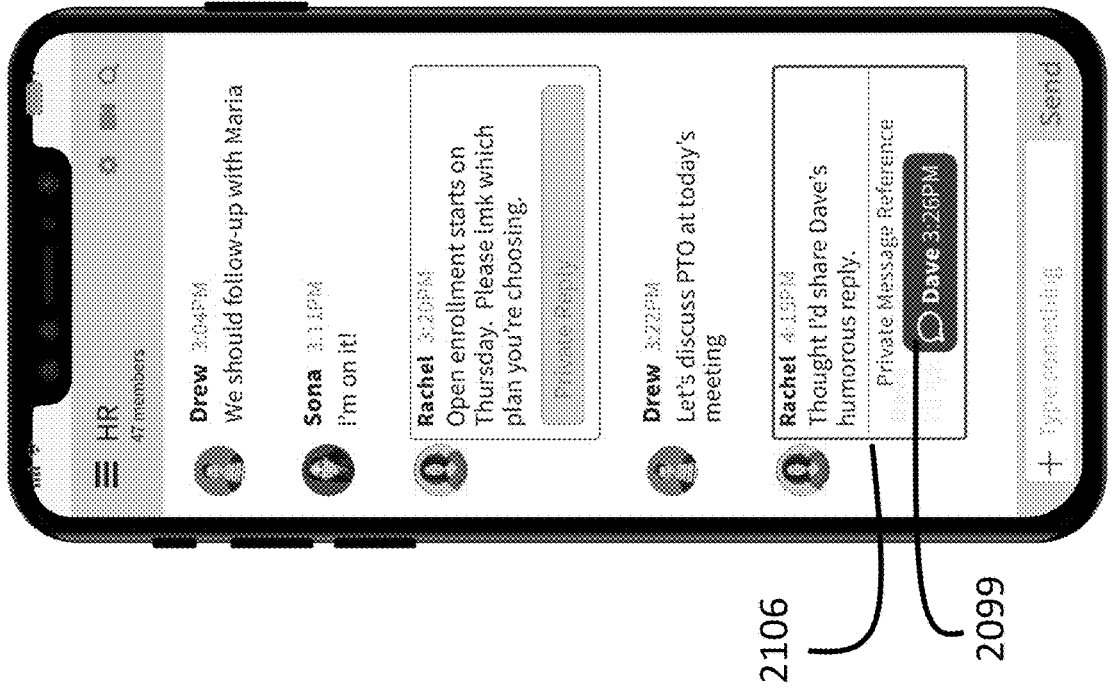
Figure 18B:
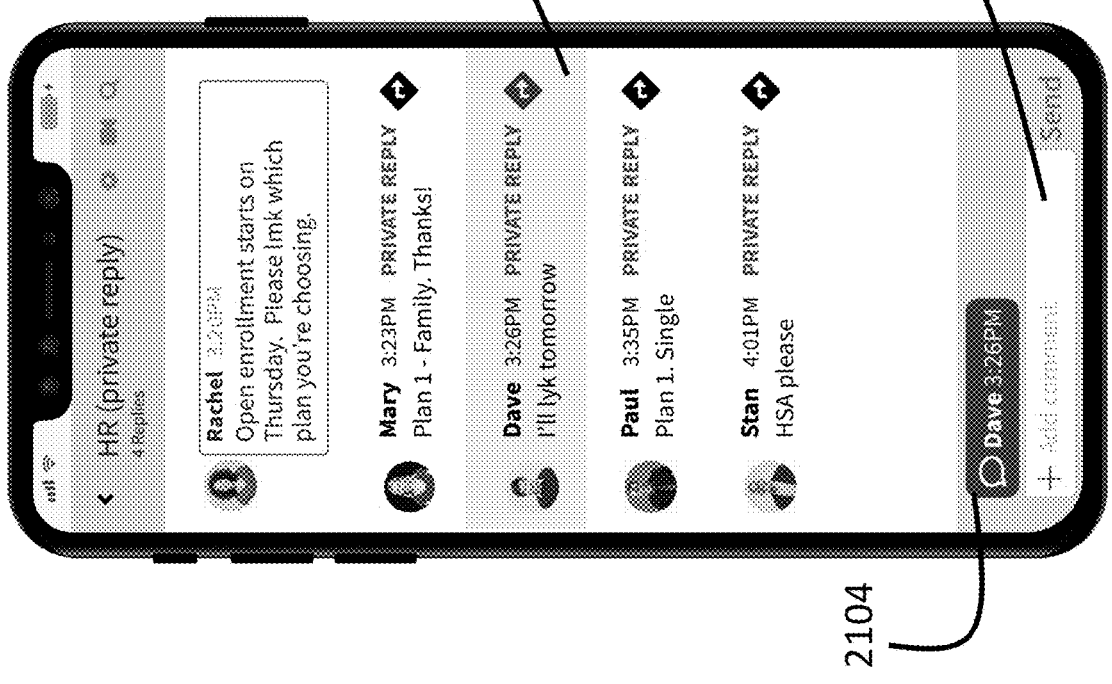
Figure 18D:
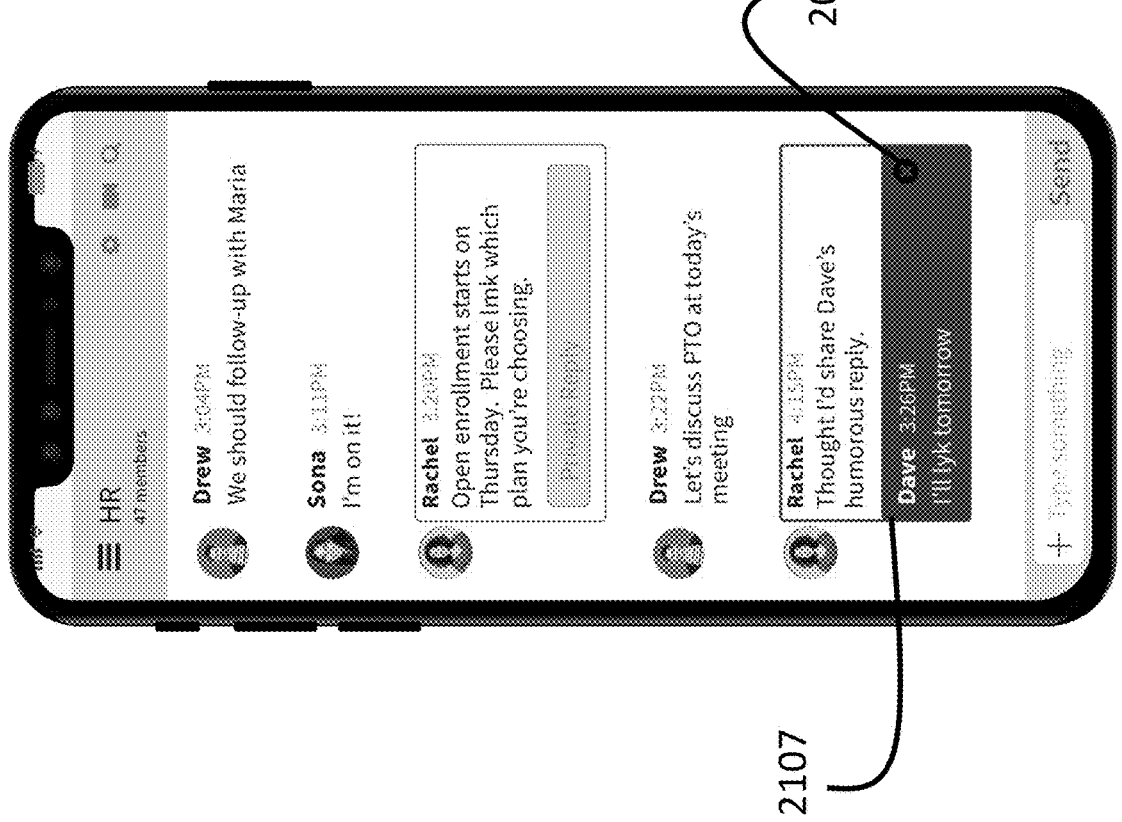

FIG. 18C shows an alternative embodiment of a messaging system as seen from the point of view of HR channel members. The point of this Figure is to indicate that a private message (FIG. 18B #2105, in this example) has been referenced and made "public," which in this case that means, that as a result of being referenced by a recipient of the private reply (Rachel in this case) the private message was posted to the HR channel and made visible to all of the group channel members. There can be variations between the member's individual displays of their respective views of the group channel message stream. In this embodiment the referenced private message appears in the group channel, is visible to all group channel members and is displayed in a visually distinguished manner (2106) that calls attention to the fact that it is a reference message. In this example, the posted message (2106) includes Rachel's comment along with a display object (2099) that when interacted with (in this example, tapped) causes the content of the associated private reply message to be displayed (FIG. 18D #2107). In this embodiment the display of the referenced private reply message can be hidden by tapping on the "x" icon (FIG. 18D #2098).

Thus, in the above example, Rachel has selected a private reply message and an indication is displayed that the private reply message has been selected. The indication may be associated with a text entry area for receiving a further message associated with the selection of the private reply message. The selected private reply message may then be further posted and displayed in the group messaging channel (where it is no longer private). The selected private reply message may be displayed in the messaging channel, together with the further message (if a further message was entered into the text entry area). Interaction may then be allowed with the message and associated referenced private reply message in the messaging channel by someone who has access to the messaging channel.

FIG. 18D shows an alternative embodiment of a messaging system as seen from the point of view of HR channel members. In this example, the posted message (2107) includes Rachel's comment along with a display of all or a portion of the content associated with the private reply that is being referenced. In this embodiment the display of the referenced private reply message can be hidden by tapping on the "x" icon (FIG. 18D #2098).

Figure 19:
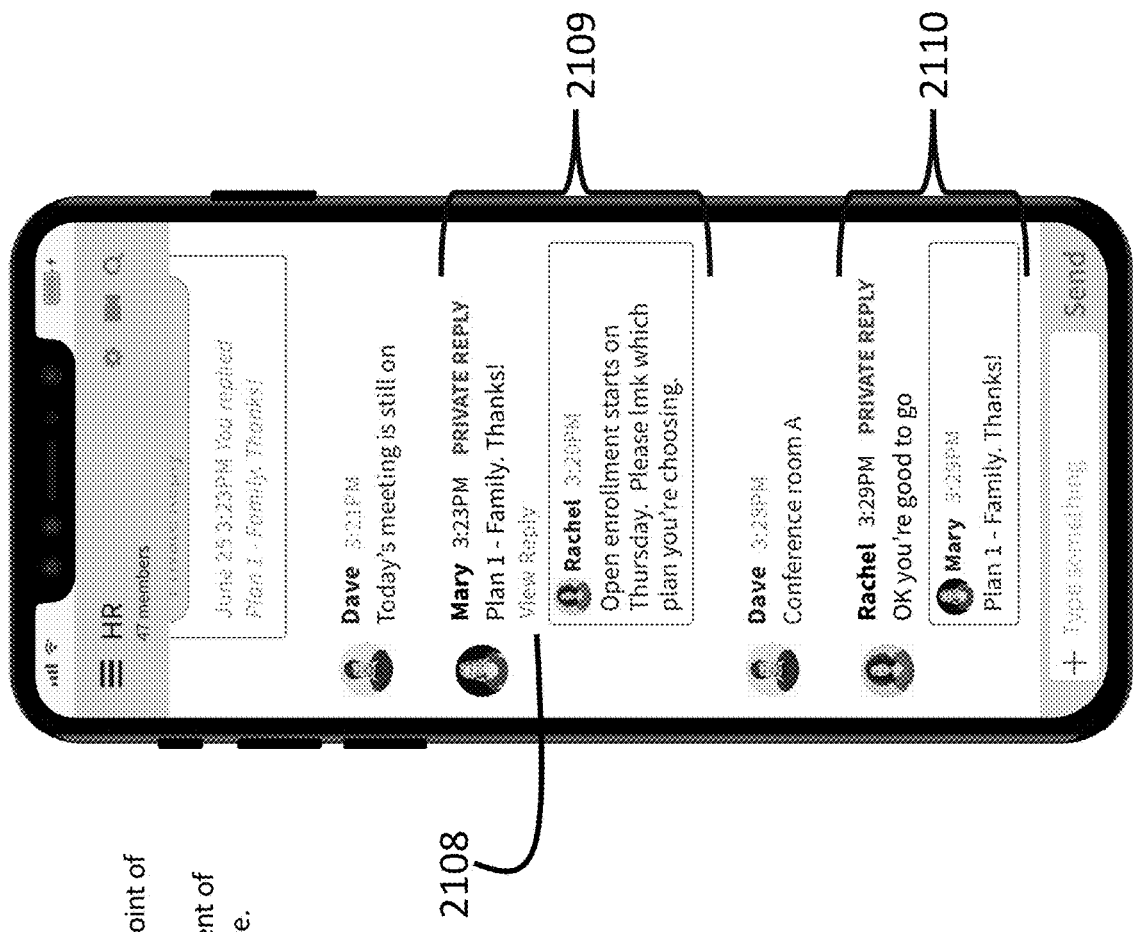
FIG. 19 is a screenshot of one or more exemplary embodiments of the present invention.

FIG. 19 shows an embodiment of a messaging system as seen from the point of view of Mary. In this example nested replies are permitted. In this example Mary replied privately to Rachel's spawning message and Rachel then responded further, "OK you're good to go", to Mary's private reply. In this example an indication (2108) is added to the indication of Mary's private reply (2109). In this embodiment, Rachel's further private message to Mary is also added to the channel message stream (2110). To view the private thread together and for example, without the potential distraction of intervening and/or unrelated messages (FIG. 20) Mary can tap on or otherwise select "View Reply" (2108). In some embodiments other methods of selection or indication of intent to view the private thread can be applied.

Figure 20:
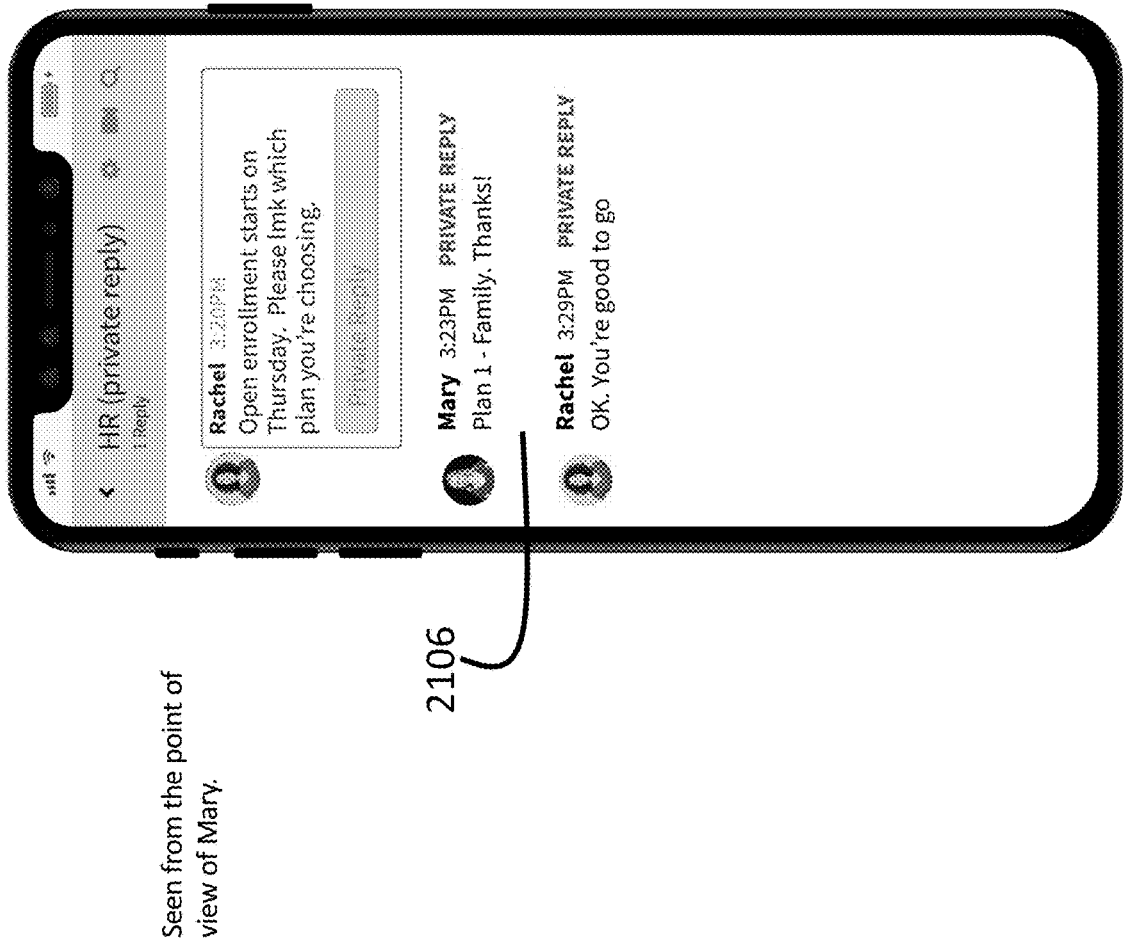
FIG. 20 is a screenshot of one or more exemplary embodiments of the present invention.

FIG. 20 shows an embodiment of a messaging system as seen from the point of view of Mary. This embodiment shows the private thread together and without the distraction of intervening and possibly unrelated messages.

FIGS. 21 through 26B show embodiments where a request for a private reply can exclude one or more channel members. These figures describe embodiments whereby a user can specify one or more group channel members to receive a private reply requested message. In these examples, only the specified group channel members will see the private reply requested message in their display of the group channel. In contrast, in some embodiments the user could select who to exclude as a private reply requested message recipient. These figures are limited to embodiments describing how users can initiate the targeted private reply recipient selection process and the sending of a private reply requested message to a selected subset of channel members (or superset if inclusive of members of additional and/or alternative channels). Once the intended private reply requested recipients have been specified, the process can, in some embodiments, continue in a fashion similar to the process described in FIGS. 16A-20.

Figure 21:
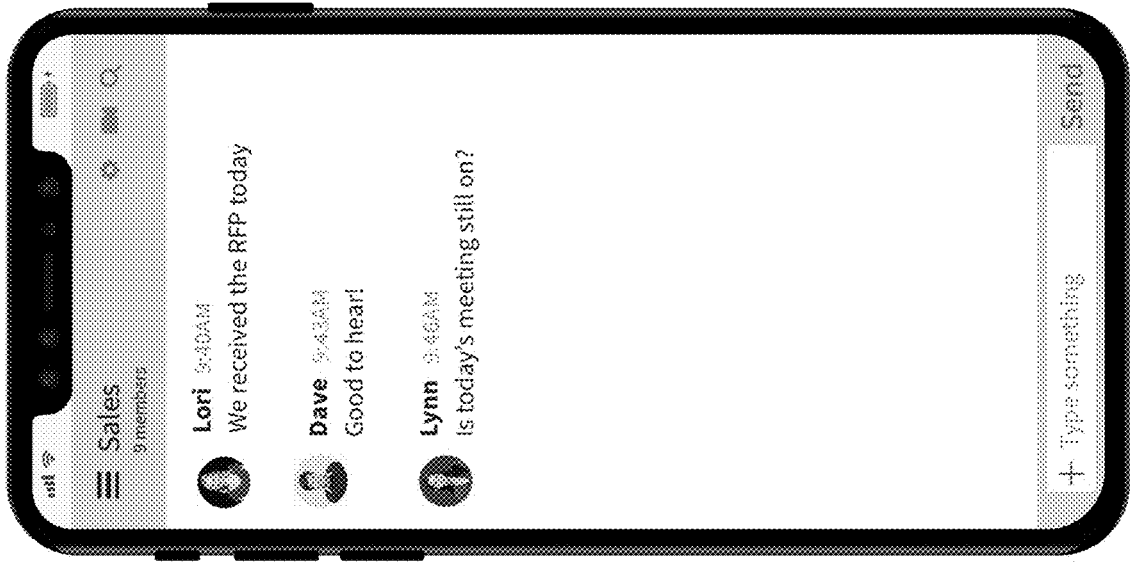
FIG. 21 is a screenshot of one or more exemplary embodiments of the present invention.

FIG. 21 shows an embodiment of a messaging system as seen from the point of view of Paul. Paul is a member of the Sales channel.

FIGS. 22A-23C show an embodiment that recognizes when more than one user is specified to receive a Request Private Replies message. In this embodiment, once the system recognizes that more than one channel member has been specified, a toggle selection switch is caused to be displayed offering the user the choice of having private replies be siloed (i.e., visible only to each respective responding specified user and the requester) or having all of these replies visible to all of the specified channel members.

Figure 22A:
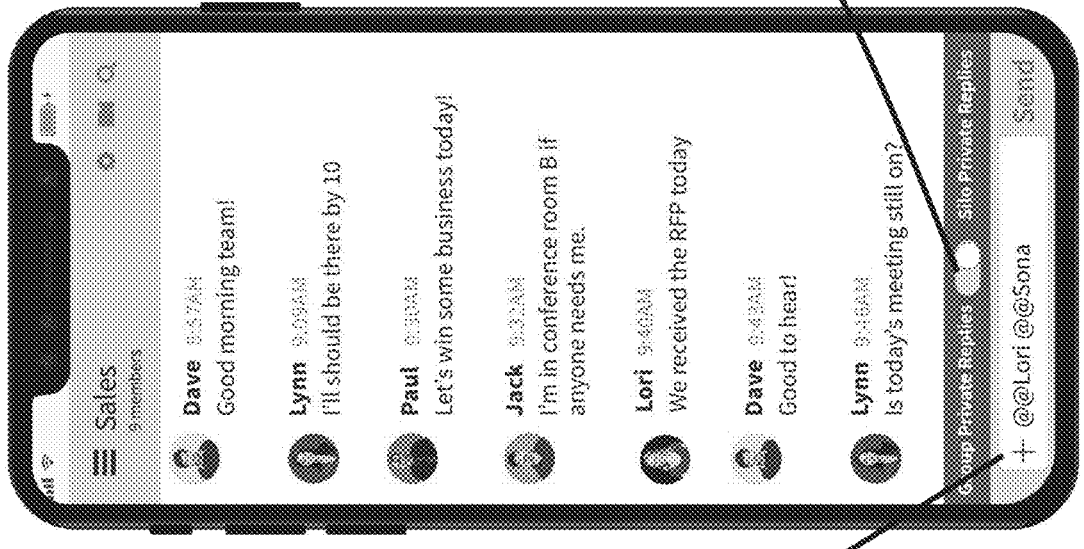
FIGS. 22A and 22B are screenshots of one or more exemplary embodiments of the present invention.

FIG. 22A shows an embodiment of a messaging system as seen from the point of view of Paul. There can be many ways to initiate a request for private replies. In this embodiment Paul initiates a request for a private reply by typing one or more characters that the system recognizes may be a request to initiate the creation of a request for private reply message. In this example the characters "@@" (2200) followed by the name (or other identifier) of the intended private reply requested recipient (2202). In some embodiments the system recommends or completes "names" once the user starts typing, potentially speeding up the process of entering the names of the intended recipients. For example, in an embodiment, the user types in "@@da" and based on the user's input, the system displays a list of user names that extend from the letters typed so far, such as Daniel, Danielle and David. In some embodiments the "name" is an identifier associated with an individual or can be a "name" associated with a group of users. For example in some embodiments the use of "@@channel" may indicate to the system that the sender wishes to send the private replies requested message to all channel members and/or @@managers may indicate to the system that the sender wishes to include all of the users in the channel that are managers.

In this embodiment the system displays a visual indication to confirm for the user that the message being crafted is a "Request Private Reply" text message (2204). In some embodiments the entry of, for example, a certain character, character string or verbal command could cause a further menu or form of selection to be displayed that suggests or offers the names or other identifiers of eligible channel recipients. In some embodiments cross channel posting (e.g., posting of the message in one or more channels) is permitted. In some embodiments the "@@" or other character or characters could indicate to the system that the message is to be sent solely to or in addition to one or more third parties via email. In this example a single @ signifies to the system that Paul wishes to @mention (at mention) a particular channel member. In other words, a single "@" (or analogous command) followed by the name (or other identifier) of the channel member along with a message will be posted and visible to all members of the channel. The "@" before a member name, alias or other identifier could serve to notify all channel members that the contents of the message is specifically targeted to or especially intended for the specified channel member or channel members. In some embodiments the system would send a special notification to the user/s specified. In this embodiment we take the concept of @ mentions a step further and allow the input of a unique character or sequence of characters (@@ in this example) to not only indicate a targeted recipient but to do so in a way that prevents others in the channel from seeing the message in their view of their own channel stream. In other words, only the intended channel member/s and the request private replies message sender see the private replies requested message. In some embodiments the private message can be sent to selected individuals without an accompanying request for a private reply. This is an improvement over single @mentions that are visible to all in the channel but intended for a targeted member or members. Many times, these messages clutter the channel and annoy the unintended channel participants. By allowing users to Double @mention users, channel clutter can be reduced, while facilitating a useful exchange between interested parties and/or while maintaining the flow and context of the conversation for all respective channel participants.

Figure 22B:
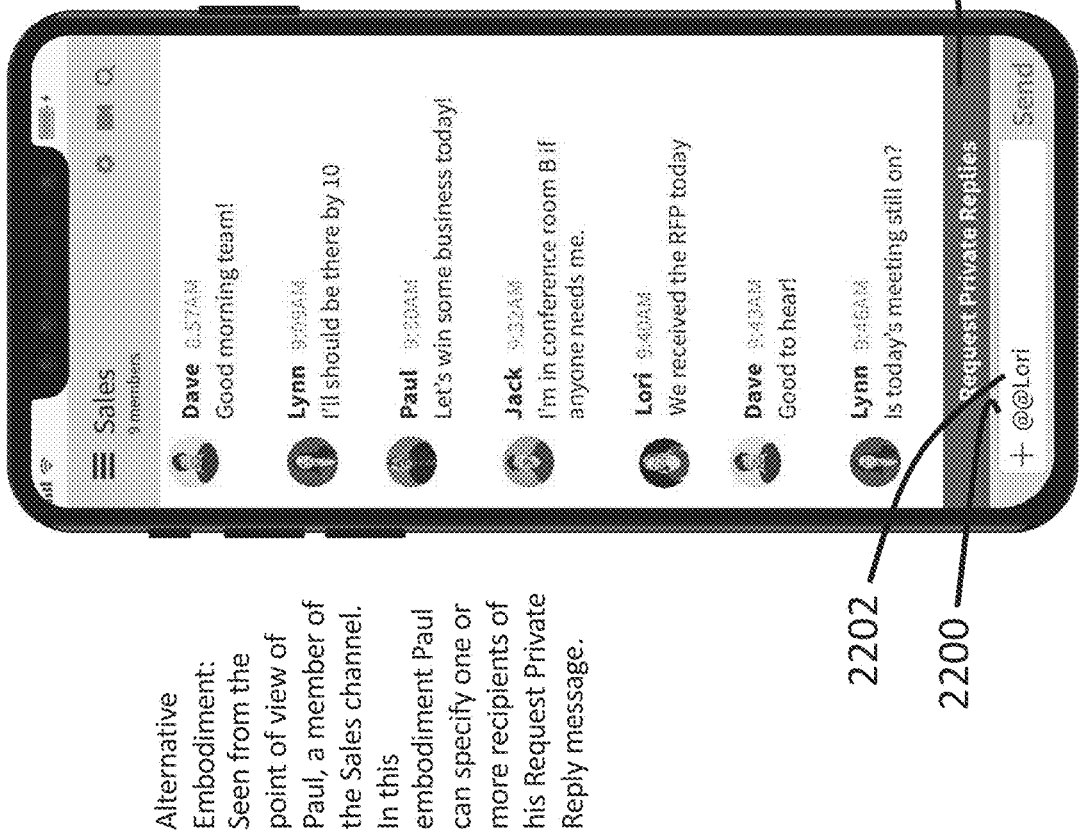

FIG. 22B shows an embodiment of a messaging system as seen from the point of view of Paul. In this embodiment Paul intends for the Private Reply Requested message to be sent to more than one channel member, but fewer than all of the channel members. In this example Paul intends to send a private reply requested message to channel members Lori and Sona (2205). In this embodiment a toggle switch is caused to be displayed when more than one channel member is specified to receive a Request Private Reply message. In other embodiments a toggle switch can be caused to be displayed when the first of one or more members is specified to receive a Request Private Reply message. In this embodiment "Siloed Private Replies" is the default setting (2206), meaning that replies will be visible to only the respondent and the Private Replies Requested message sender (Paul in this example).

In some embodiments the "name" is an identifier associated with an individual or can be a "name" associated with a group of users. For example, in some embodiments the user may wish to send a request private replies message to all channel users. In some embodiments, this can be accomplished by entering "@@channel" to indicate to the system that the sender wishes to send the private replies requested message to all channel members. In another example, the sender may be able to enter "@@managers" to indicate to the system that the sender wishes to include all of the users in the channel who are managers.

As an example, a plurality of messaging devices includes a first device operated by a first group user (Paul) and remaining devices operated by remaining group users (Lori, Sona). Paul, Lori, Sona (and possibly others) are a plurality of group users communicating with each other in a messaging channel (Sales). The first group user (Paul) enters a first group text message into a first device. Paul also identifies remaining group users that receive the private reply requested text message. In the example, Lori and Sona are identified group users. The first group text message is transmitted to the identified group users. When Lori and Sona reply with respective replies, the respective replies are displayed on Paul's device, and the respective replies are prevented from being displayed on remaining devices outside of Lori's and Sona's devices. In one embodiment as explained below, Lori and Sona can see each other's replies. In another embodiment, Lori and Sona cannot see each other's replies.

Figure 23A:
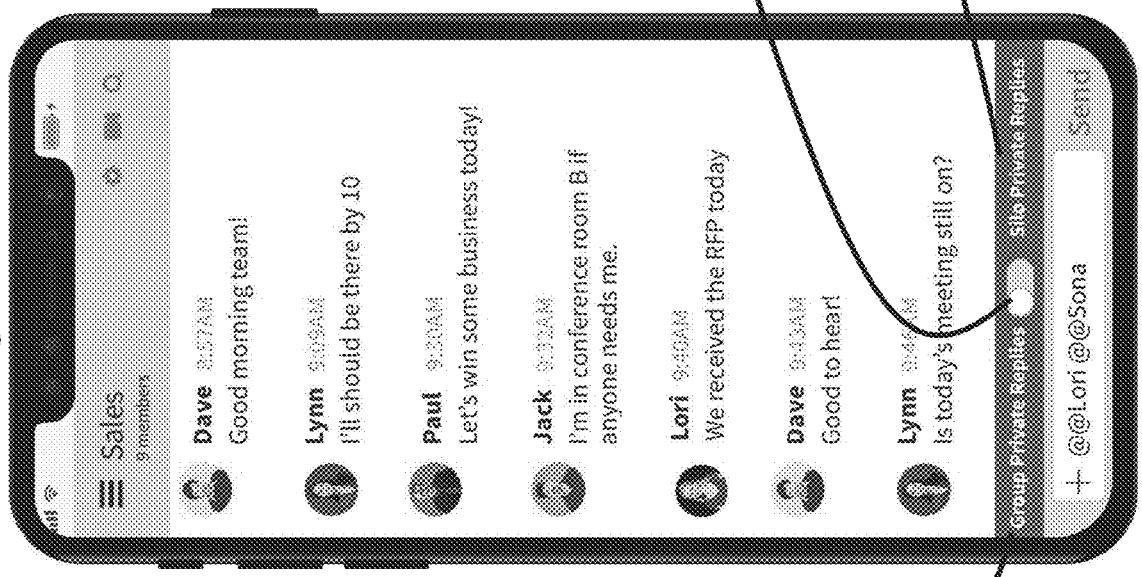
FIGS. 23A-23C are screenshots of one or more exemplary embodiments of the present invention.

FIG. 23A shows an embodiment of a messaging system as seen from the point of view of group channel member Paul. In this embodiment the system recognizes when more than one other channel member has been specified as a recipient of a Request Private Reply message. In this example, when two or more channel members are specified a toggle switch is caused to be displayed. In this example, the toggle switch defaults to Siloed private replies, meaning that Paul's message will be posted and made visible in these user's channel view and these users can each reply privately to Paul's message. In siloed mode (2209), their responses are visible only to each respondent him/herself and Paul. In other words, Lori and Sona's private responses will be visible to Paul and to each one of them respectively. Lori will not see Sona's private reply, nor will Sona be able to see Lori's private reply. In this example, Paul switched the toggle to "Group Private Replies" (2207). In "Group Private Replies" mode (2208), all of the replies are visible to the specified users. In other words, Lori can see Sona's reply and Sona can see Lori's replies. In Group Private Replies mode Paul and all specified parties can see each other's associated private replies. In some embodiments the "name" is an identifier associated with an individual or can be a "name" associated with a group of users. For example, in some embodiments the user may wish to send a request private replies message to all channel users. In some embodiments, this can be accomplished by entering "@@channel" to indicate to the system that the sender wishes to send the private replies requested message to all channel members. In another example, the sender may be able to enter "@@managers" to indicate to the system that the sender wishes to include all of the users in the channel who are managers.

Figure 23C:
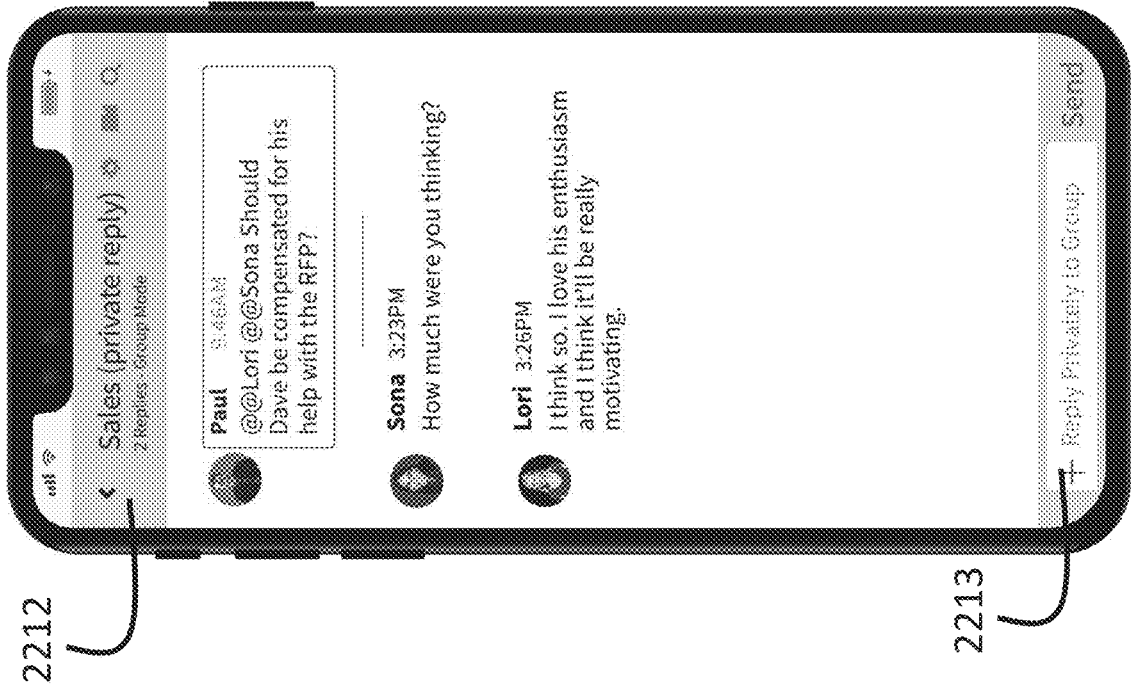
Figure 23B:
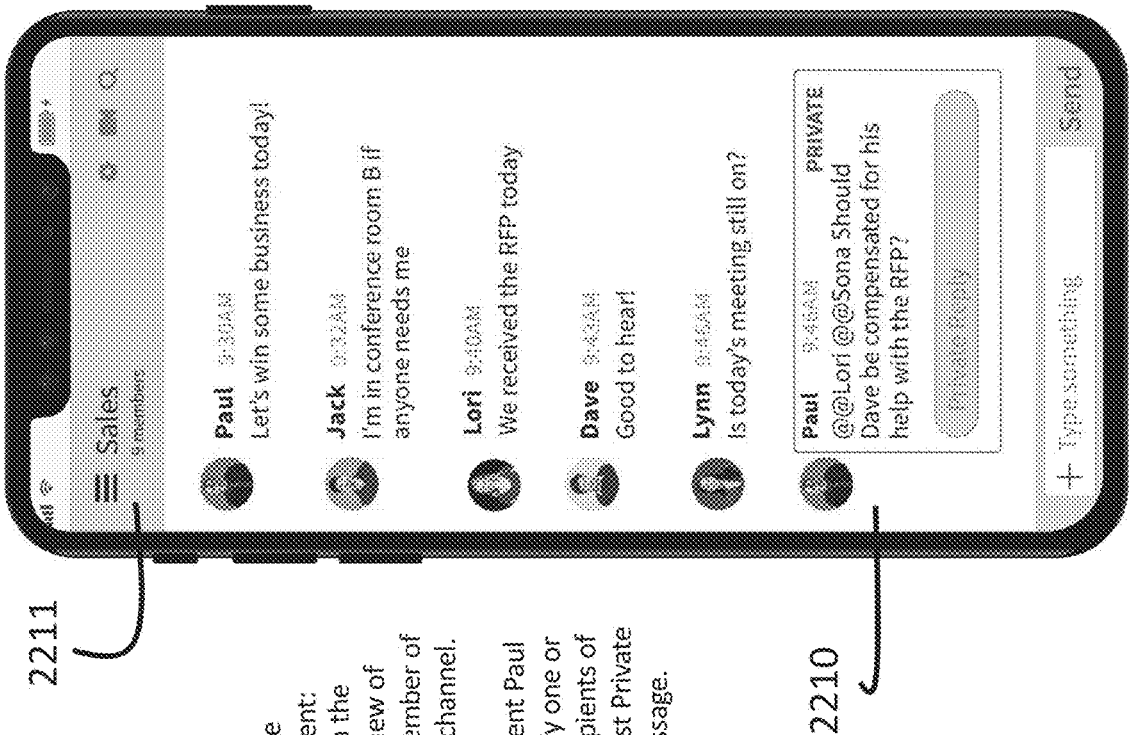

FIG. 23B shows an embodiment of a messaging system as seen from the point of view of group channel member Paul. In this embodiment Paul posted his Private Reply Requested message to the Sales channel (2211) at 9:46 AM. The message is only visible to Paul and the two users he specified; Lori and Sona FIG. 23C shows an embodiment of a messaging system as seen from the point of view of group channel member Paul. This FIG. 23C is caused to be displayed as a result of Paul having tapped on an area associated with his Private Replies Requested message (or on an area associated with one of the private replies he received from Sona or Lori in his display of the Sales channel. Doing so caused the further "Sales (private reply)" screen to be displayed. In some embodiments other methods can be implemented to display an aggregated collection of the private replies. In this embodiment, Paul views the private replies to his Private Replies Requested message. In this embodiment Paul's spawning Request for Replies message is pinned to the top of the screen and none, one or more than one private reply messages associated with his Request Private Replies message appear below it. In this embodiment, private reply messages can be scrolled up or down to reveal newer or older private replies. In this embodiment, Paul and the specified users can continue to post messages to the private sidebar thread (2213). These messages will appear in the sidebar and in some embodiments can also appear in the Sales channel, but visible only to the participants of the associated sidebar thread.

Thus, in the examples above, Paul has entered a private reply requested text message into his device and has identified who ("identified group users") will receive the message. The private reply requested text message is then transmitted to the identified (one or more) group users. For each of said identified group users that replies to the private reply requested text message in the messaging channel with a respective reply, each respective reply is displayed on Paul's device and is displayed privately, for example so that other people (some or all other people) who have access to the message channel cannot see the reply. The person who sent the reply is typically able to see his reply.

When several people reply to Paul's private reply requested text message, in one embodiment the people that reply can see each other's replies. In another embodiment, the people that reply cannot see each other's replies. In another embodiment, a switch allows Paul to select between a) the people that reply can see each other's reply; and b) the people that reply cannot see each other's reply.

In another exemplary embodiment, for each of said identified group users that replies to the private reply requested text message with a respective reply, the respective reply is entered into a respective Direct Message channel or respective private thread between the first group user and each of the identified group users that replies to the private reply requested text message. If entered into a Direct Message channel, further messages may be exchanged between the channel's respective members. There may be messages already in a Direct Message channel before the above described reply is entered into that channel.

FIG. 24A shows an embodiment of a messaging system as seen from the point of view of Paul. In this embodiment Paul has indicated through the use of the characters "@@" that he wishes to send a private reply requested message to Lori in the Sales group channel. In this embodiment, the specified-user private reply requested signifying characters "@@" appear at the beginning of the message in conjunction with "Lori"- to specify Lori; but in other embodiments the character(s) and names (or other identifier/s) of the specified recipients can be placed elsewhere in the message, and in the case of more than one specified private reply requested recipient, apart or together. For example, in some embodiments "@@" placed anywhere in the message, and identification of one or more users elsewhere in the message, can specify these identified users as the only recipients of the private reply requested message. There are many ways to indicate the intent to send a private reply requested message and many ways to indicate the intended recipient/s. This embodiment describes one such approach. In some embodiments the system recommends or completes a "name" once the user starts typing, potentially speeding up the process of entering the name of the intended recipient/s. For example, in an embodiment, the user types in "@@m" and based on the user's input, the system displays a list of user names that extend from the letters typed so far, such as Marc, Maria, Melissa and Morris.

FIG. 24B shows an embodiment of a messaging system as seen from the point of view of Lori. Lori is a Sales channel member and the targeted recipient of Paul's private reply requested message. Paul's private reply requested message is visible only to Paul and Lori. In this example the fact that the message is a private reply requested message is visually indicated through a distinguishing design associated with the message: a box surrounds a portion of the message along with the word "PRIVATE" (2216). In addition, a text entry box is included with the message (2215) to suggest to the recipient that entry of a message in the box will send a private reply. In this example a text entry box appears with the message but in other embodiments text entry (or other form of input such as voice) can occur elsewhere and/or differently. In this example, the combining of the text entry box with the posted message serves the purpose of, among other things, distinguishing the private reply requested message from other types of messages in the channel and providing a simple and functional approach to facilitating a private reply. Is this embodiment the text of Paul's message is exactly as he typed it and includes "@@Lori" (2214). In some embodiments the text displayed is different than what was entered, for example in some embodiments the "@@Lori" is omitted from the message as displayed in one or more user views of the channel. In other embodiments the text posted can be derived, calculated, inferred, augmented or in additional or other ways changed or different from what was entered by the sender of the private reply requested message.

Figure 24C:
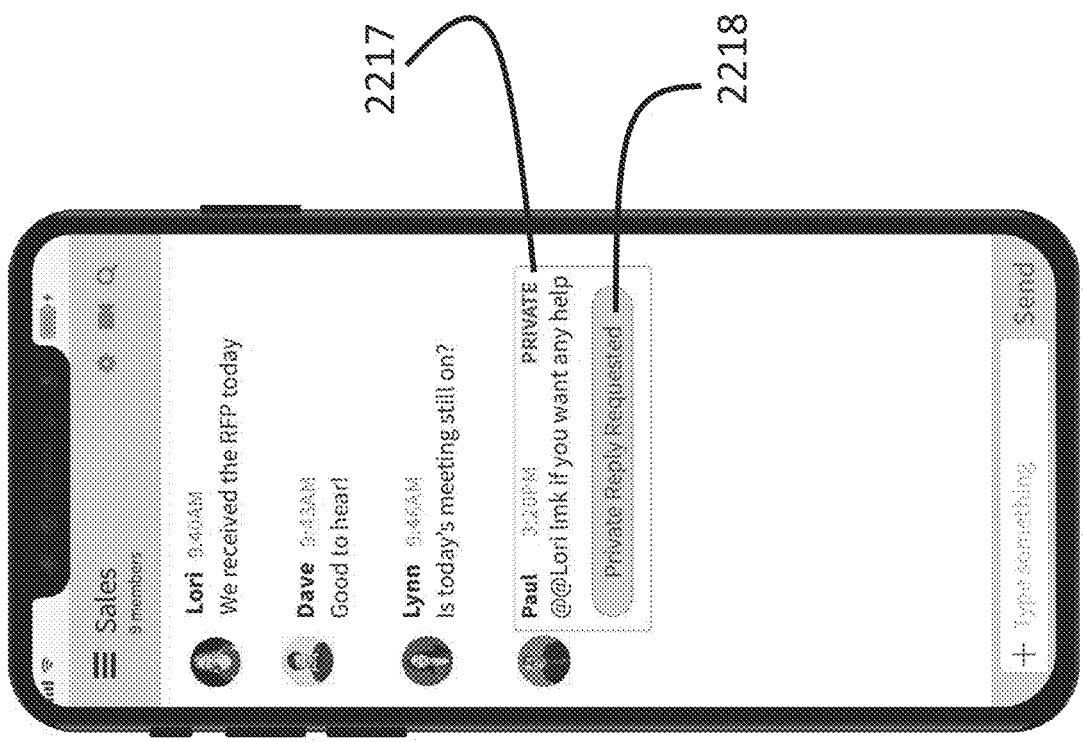
Figure 26A:
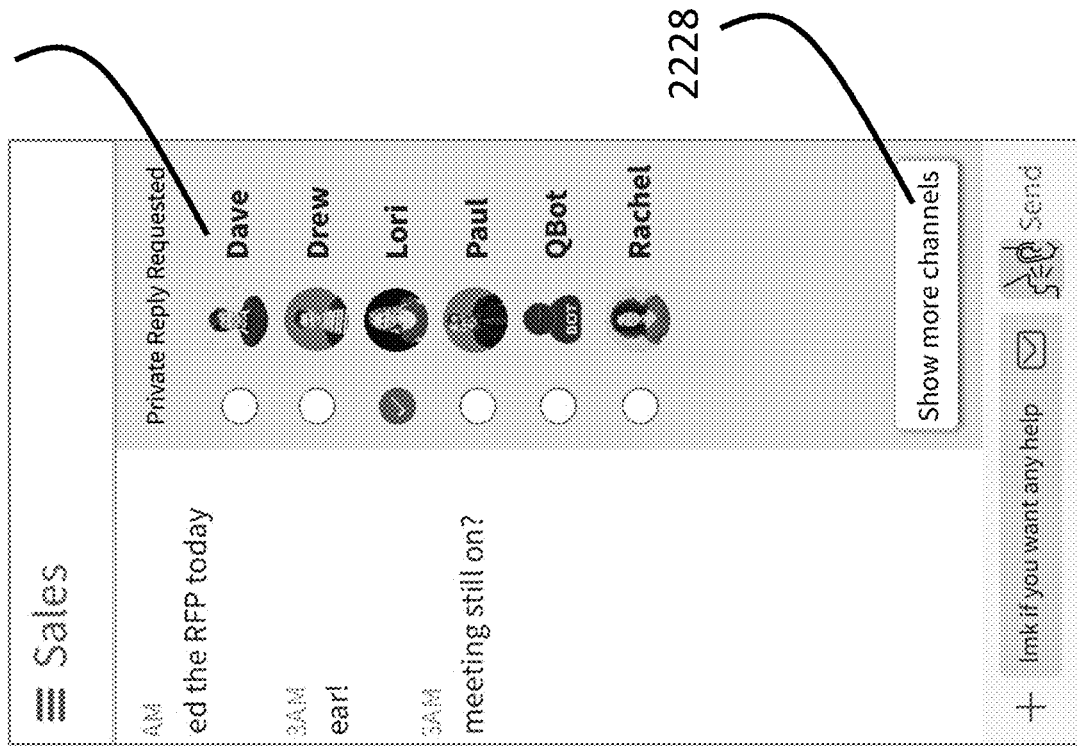
FIGS. 26A and 26B are screenshots of one or more exemplary embodiments of the present invention.
Figure 26B:
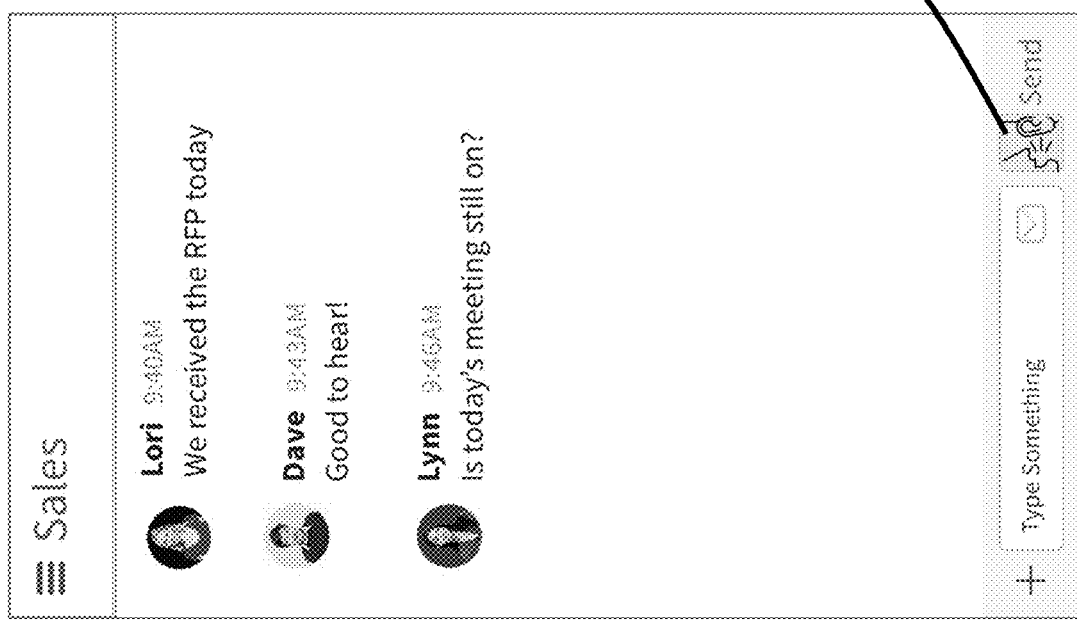

FIG. 24C shows an embodiment of a messaging system as seen from the point of view of Paul. In this embodiment Paul's private reply requested message is visible to only him and his intended recipient, Lori. In this example, Paul's (FIG. 24C #2217) and Lori's (FIG. 24B #2216) display of the private reply requested message are different as is, in this example, the functionality of the Request Private Replies message. In some embodiments the display and functionality of the Private Replies Requested message are identical or nearly identical. In some embodiments they are substantially or completely different. In some embodiments private reply messages can be toggled on or off by a, for example, system or channel administrator or by one or more of the system or channel members (e.g., mute private replies). In this example an indication that the message is a private reply requested message is displayed with an inactive text entry box and Paul is not permitted to enter a reply to his own private reply requested message (2218) but in other embodiments an active text entry box—or method of entering a private reply to his own private reply requested message would be permitted. There are use cases where sending private messages to yourself in a group chat channel could be useful (FIGS. 26A-26B)

FIGS. 25A-25E show an embodiment of a messaging system as seen from the point of view of Lori.

Figure 25B:
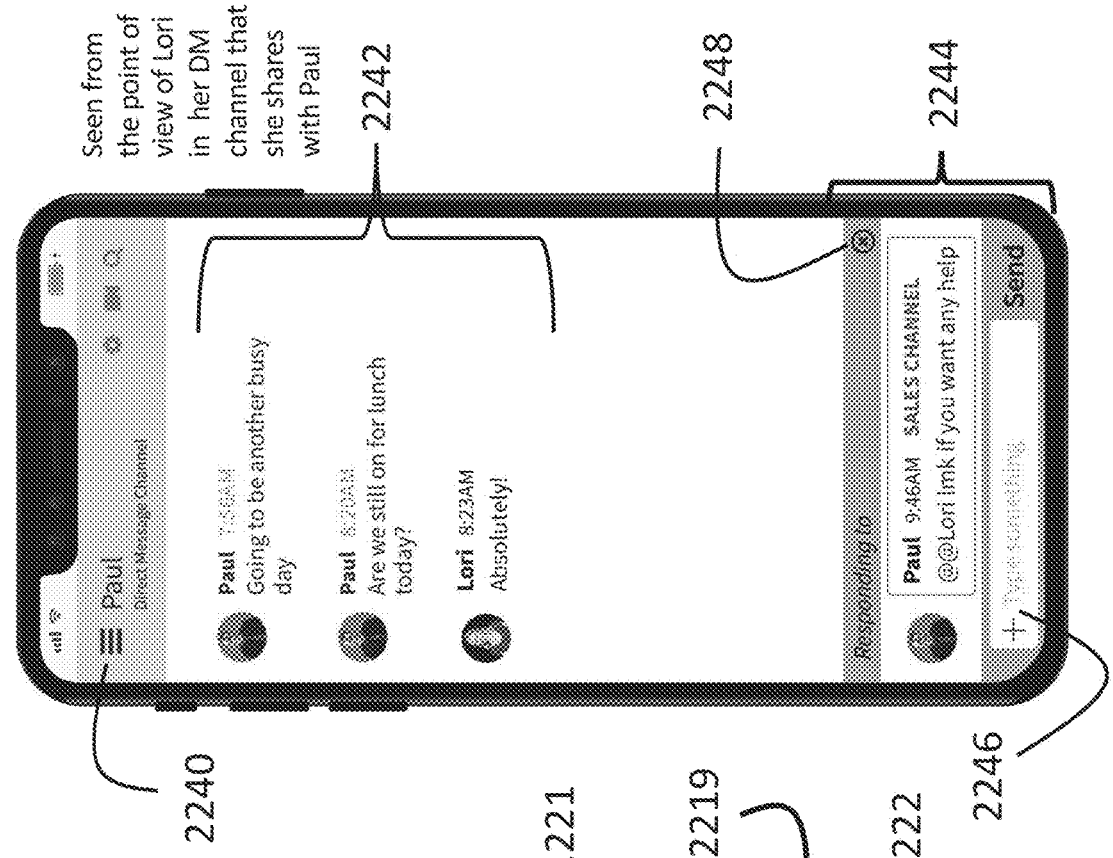
FIGS. 25A-25E are screenshots of one or more exemplary embodiments of the present invention.
Figure 25A:
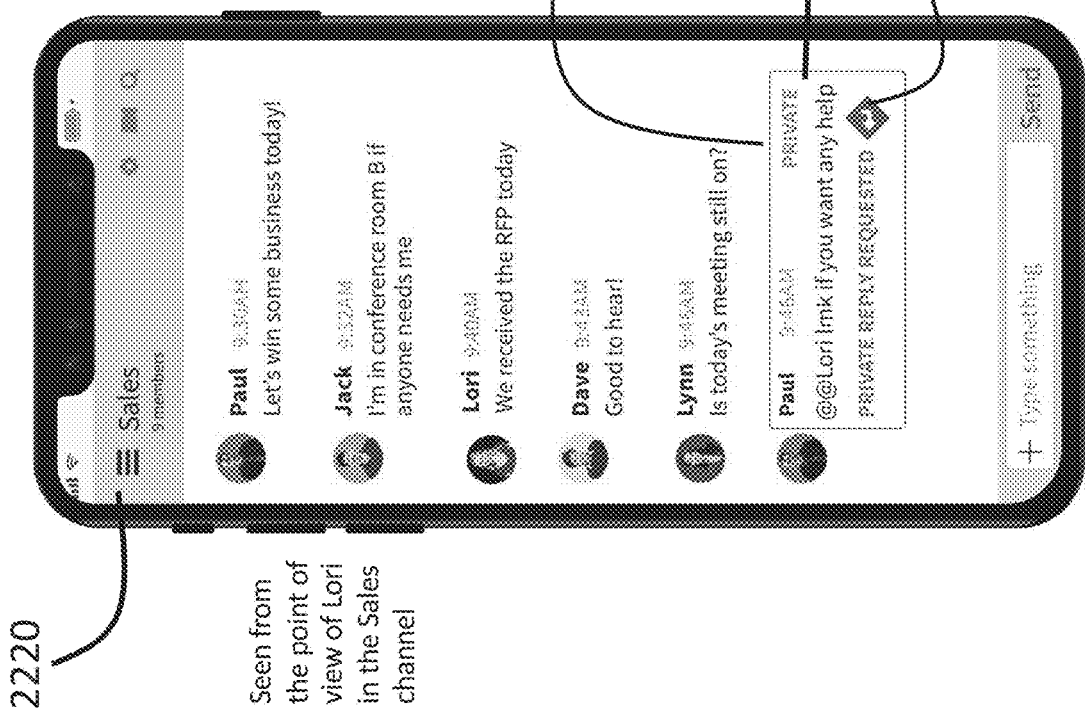

FIG. 25A shows an embodiment of a messaging system as seen from the point of view of Lori. In this embodiment Lori is the recipient of a private reply requested message (2219) sent by Paul in the Sales channel (2220). In this embodiment the Private Reply Requested message is visually distinguished from standard messages and includes an indication that the message is private (2221). In this embodiment an indication is displayed to Lori suggesting that she can reply privately through interaction with the reply privately icon (2222). In this example, tapping on the icon (2222) causes the channel to switch to Lori's private DM (direct message) channel that she shares with Paul (2240). In some embodiments other means of indicating selection and initiating a private reply entry are possible.

FIG. 25B shows an embodiment of a messaging system as seen from the point of view of Lori. In this example, Lori has switched to her and Paul's private DM channel (2240) as a result of her tapping on the Private Reply icon shown in FIG. 25A #2222). Lori and Paul's shared DM channel has an existing history of unrelated messages (i.e., unrelated to the spawning private reply requested message sent by Paul in the Sales channel) exchanged between Paul and Lori (2242). In this example, Paul's spawning private reply message is displayed and associated with a text entry bar (2246). In this example, Lori, can cancel her private reply by tapping on the "cancel" icon (2248). In this embodiment, tapping on the close icon (2248) will cancel her reply and return her to the Sales channel.

Figure 25C:
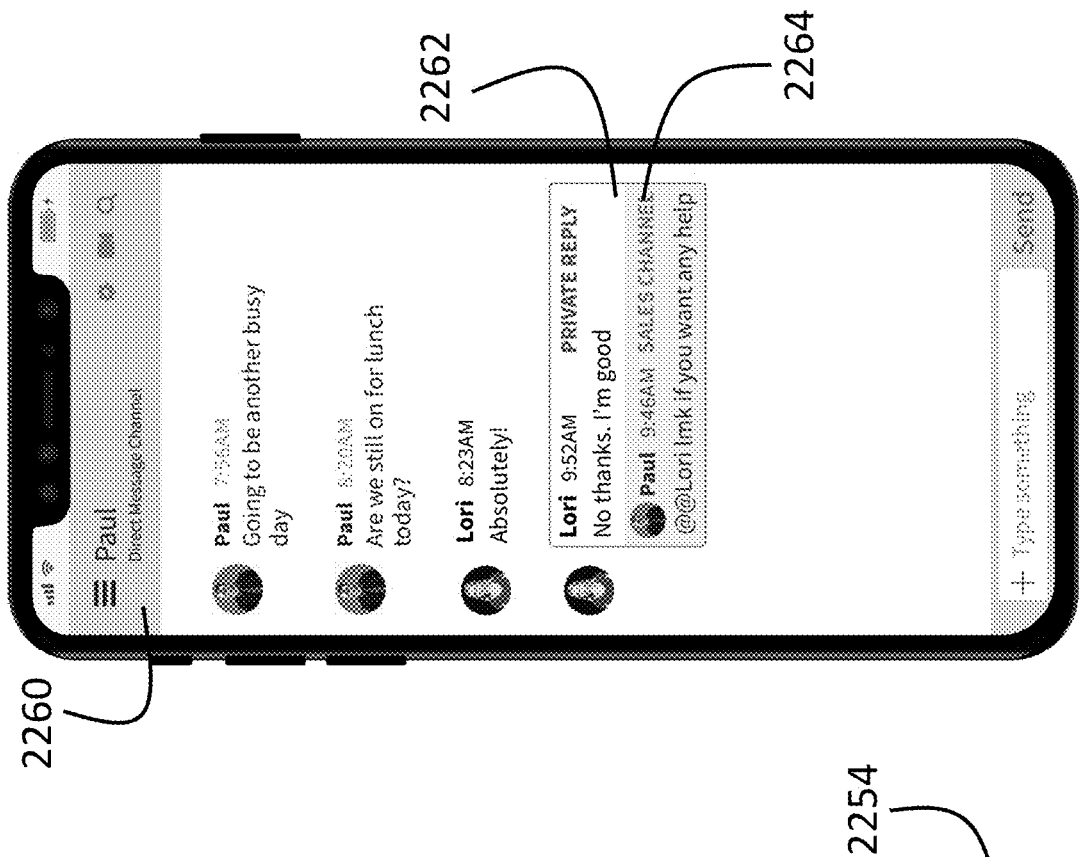

FIG. 25C shows an embodiment of a messaging system as seen from the point of view of Lori. In this example, Lori is still viewing the private DM channel that she shares with Paul (2250). In this example, Lori enters her private reply to Paul, "No thanks. I'm good" and taps "Send" (2254) to transmit the message.

Figure 25D:
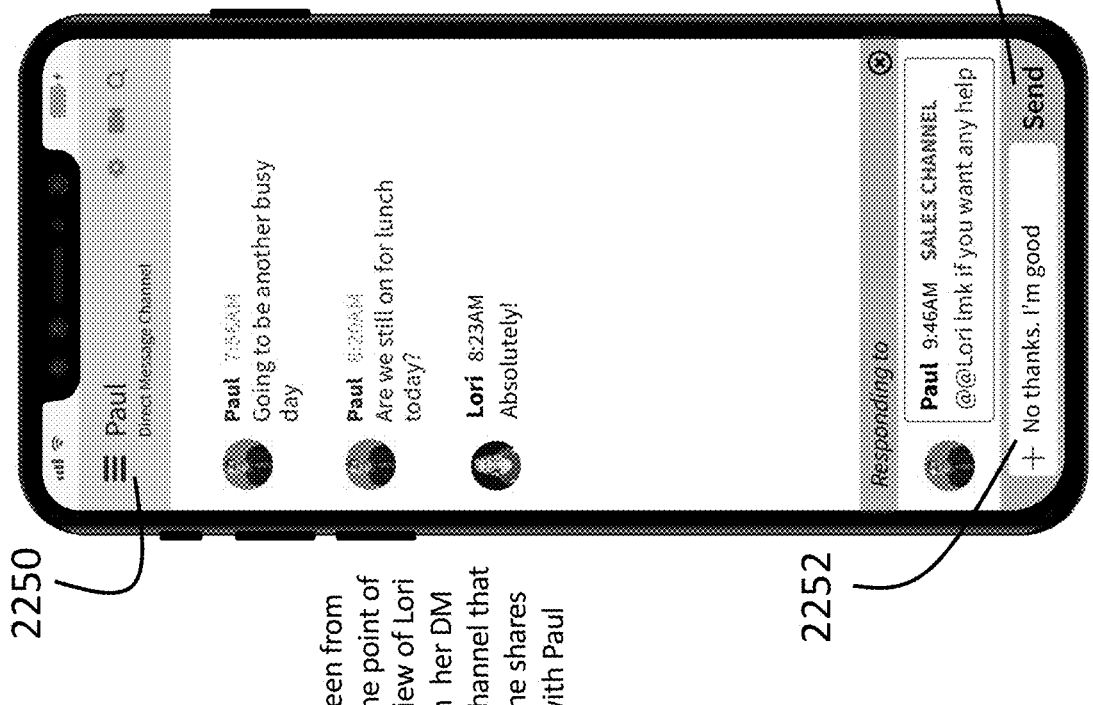

FIG. 25D shows an embodiment of a messaging system as seen from the point of view of Lori. In this example, Lori is still viewing the private DM channel that she shares with Paul (2260). In this example, Lori's private reply is posted to the DM channel. In this example, her private reply is visually distinguishable from standard messages and includes a copy of all or a portion of the message she is replying to (Paul's 9:46 AM message from the Sales channel (2262). In this example, Rachel can return to the Sales channel by tapping on an area associated with the message (2262) in this example she can tap on the text "SALES CHANNEL", which causes the display to update and for the Sales channel to be at least partially displayed.

Figure 25E:
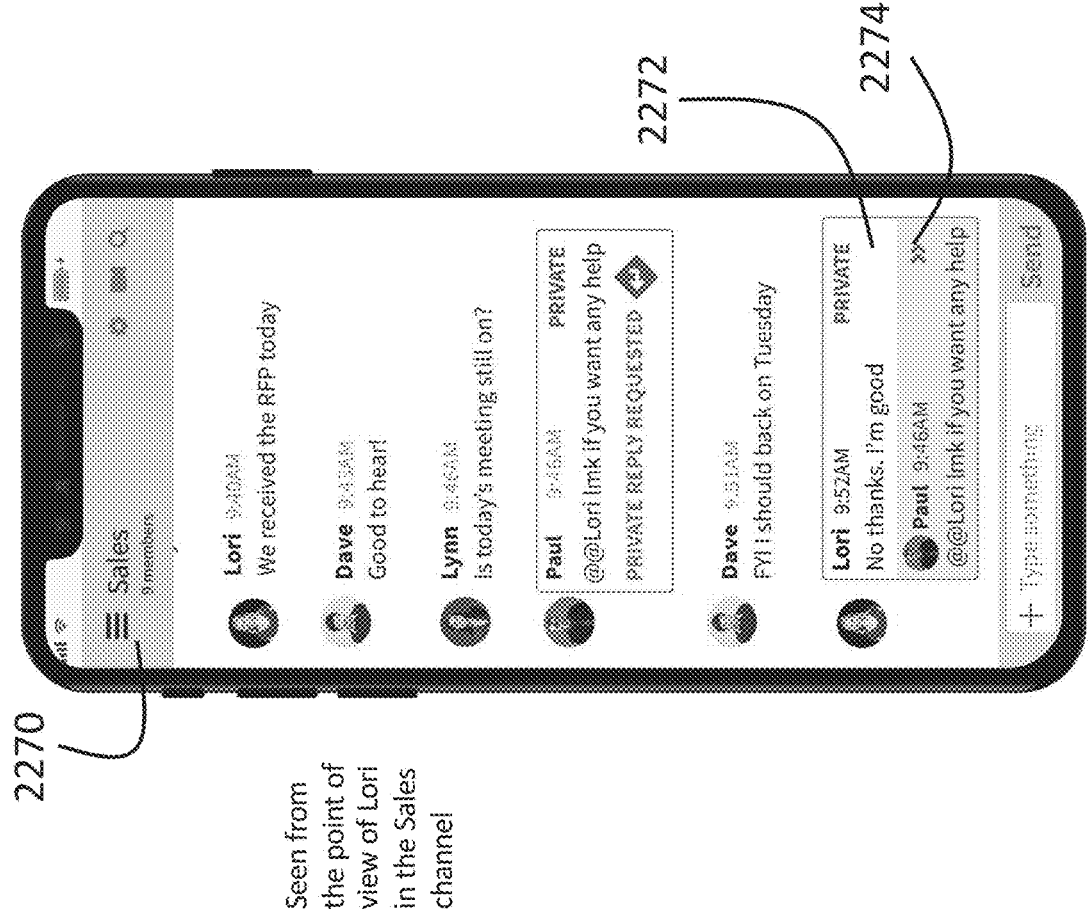

FIG. 25E shows an embodiment of a messaging system as seen from the point of view of Lori. In this embodiment Lori has returned to the Sales Channel (2270). In this embodiment, an indication of her private reply in the DM channel is displayed, in this case a copy of the message (2272) that Lori posted in her and Paul's shared DM channel is posted in the Sales Channel. In some embodiments another or no indication of her private reply in the DM channel is displayed. In this embodiment Lori can switch to the DM channel by tapping on the "show in DM channel" icon (2274).

FIGS. 26A and 26B show an embodiment of a messaging system as seen from the point of view of Paul. Paul is a member of the Sales channel. There can be many ways to initiate a request for private replies. In this embodiment Paul initiates a request for a private reply by tapping on (or otherwise selecting) the "whisper in someone's ear" icon (FIG. 26A #2224). In this example, tapping on this icon causes a channel member selection menu (FIG. 26B #2226) to be displayed from which Paul can select one or more intended private reply requested message recipients. In some embodiments private reply requested messages can be sent to additional or other recipients in additional/other channels (FIG. 26B #2228).

Figure 27B:
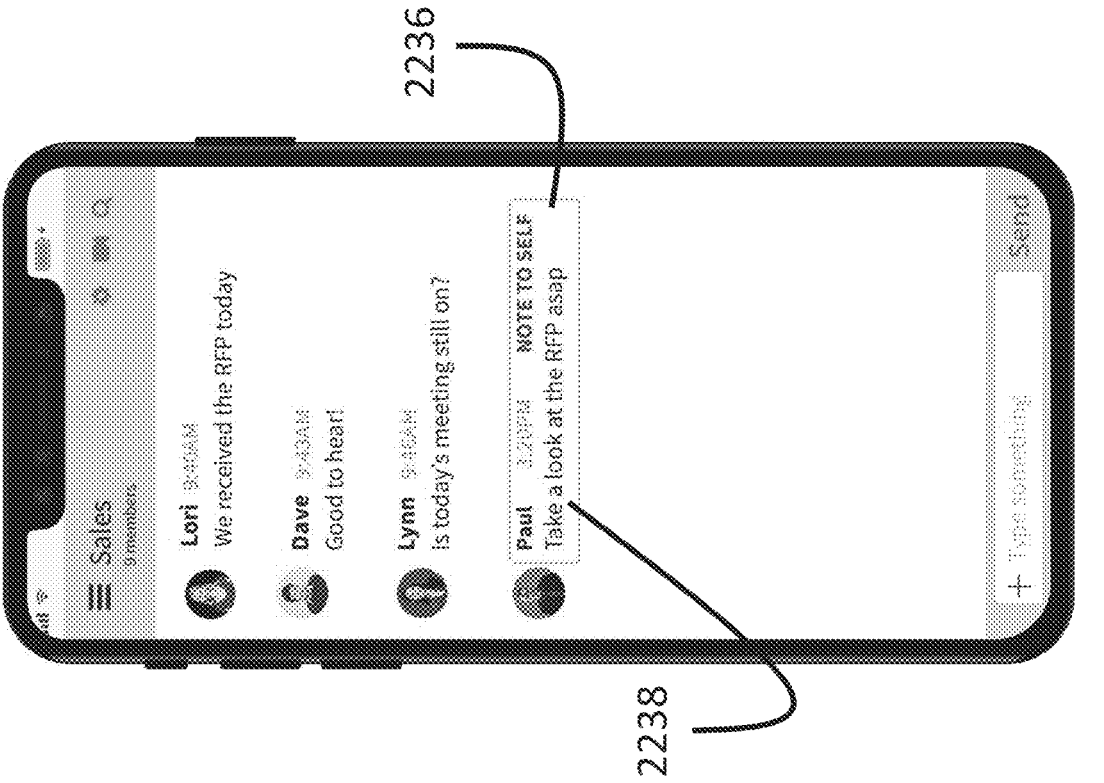
FIGS. 27A and 27B are screenshots of one or more exemplary embodiments of the present invention.
Figure 27A:
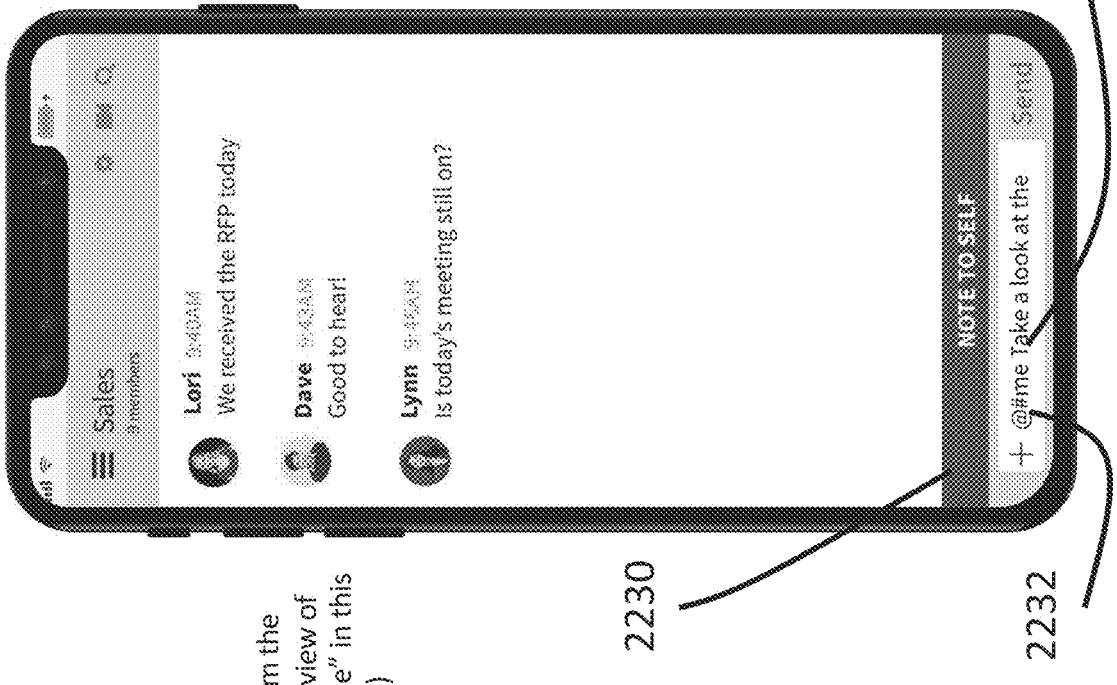

FIGS. 27A and 27B show an embodiment where a user can post a private "Note to Self" message in a group channel that is displayed only to themself in their respective channel message stream.

FIG. 27A In this embodiment Paul initiates a "note to self" by typing one or more characters that the system recognizes may be a request to initiate a message that will appear in the group channel but be visible only to Paul (i.e. a "Note to Self"). Periodic notes to oneself that are embedded into the flow of a group conversation but that are private to oneself can be useful. In this example the characters "@#" (2232) followed by the name or alias of the private note to self sender (2234). In this embodiment the system displays a visual indication to confirm for the user that the message being crafted is a "Request Private Reply" message (2230). For descriptive purposes #2232 and #2234 are described distinctively but in some embodiments the two components could be considered, for example, together and as a single component.

FIG. 27B shows an embodiment of a messaging system as seen from the point of view of Paul in the Sales group channel. In this example the fact that the message is a "Note to Self" is visually indicated through a distinguishing design associated with the message. In this example a box surrounds a portion of the message along with the words "NOTE TO SELF" (2236). In this embodiment Paul cannot reply to his own Note to Self, but in some embodiments Paul would be able to reply to his own message. Is this embodiment the text of Paul's message omits the "@#me" text (2238) that was typed by Paul in FIG. 27A #2232. In some embodiments the text displayed is different than what was typed, for example in some embodiments the "@#me" is included in the message. In other embodiments the text posted can be derived, calculated, inferred, augmented or in additional or other ways changed or different from what was entered by the sender of the "Note to Self" message.

Thus, Paul or someone else who has access to the messaging channel is a "self-noting user." The self-noting user can create a self-noting message. The self-noting message may be displayed in the messaging channel but with restricted access (i.e. ability to view). The restricted access may be that less than everyone who has access to the channel has access to the self-noting message. The restricted access may be that only the self-noting user has access to the self-noting message.

In some embodiments the self-noting user can specify the placement in the message stream of the self-noting message. For example, Paul may be able to enter a note and specify that it is to be placed at July 15 at 10:30 AM. Paul can specify a time in the past (in which case it is embedded in the stream among previous messages), in the future, or in the present. In this example, the self-note which could be visually distinguishable as compared to standard messages would be embedded into the message stream and displayed to the self-noting user at the specified placement date and time.

The aforementioned description has included the use of the word "device" and "devices" throughout. In addition, many of the figures are screenshots of a single smart-phone (a type of "device"). Furthermore, the word "device" or "devices" has been introduced by itself or modified with adjectives throughout the aforementioned description (e.g. "a device", "the device", "the devices", "the remaining devices", "Rachel's device"). When "device" is used throughout the specification, in a preferred embodiment, a single electronic apparatus (e.g. a single smartphone or a single laptop computer) is being described. In some embodiments, however, a user may be logged into an account (such as a messaging account) on multiple electronic apparatuses. For example, a user may be logged onto a single account on both a smartphone and on a laptop computer. When a user is logged onto multiple electronic apparatuses, message content is mirrored on both apparatuses. Furthermore, and in this manner, a user can see a message arrive on his account (in a channel) on one electronic apparatus (his smartphone) and he can then send a message (or send a message in reply to the earlier arrived message) on another electronic apparatus (in the channel in which the message was received). Again, this is possible because the two devices in this situation are mirroring the contents of the channel. Thus, for purposes of this application, when two (or more) apparatuses are mirroring each other, the two apparatuses are effectively "a device." Put another way, in such a situation, if display of a message is prevented to "a device," then display is prevented on the two apparatuses mirroring each other. Similarly, if a reply to a message is limited to two apparatuses that are mirroring each other, the reply is again limited to "a device."

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "associating", "updating", "providing", "integrating", "selecting", "executing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

While various exemplary embodiments have been described, it is understood that embodiments may be combined. Also, aspects of one embodiment may be combined with aspects of another embodiment.

The methods and illustrative examples described herein are not inherently related to any particular computer or other apparatus. Various general-purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method for operating a plurality of messaging devices that includes a first device operated by a first group user and remaining devices operated by remaining group users, wherein said first group user and said remaining group users are a plurality of group users communicating with each other in a messaging channel, said method comprising the steps of:

receiving entry of a first group text message, said first group text message received into said first device from said first group user;

transmitting said first group text message to said remaining group users so that said first group text message appears in said messaging channel on said first device and on said remaining devices operated by said remaining group users, respectively;

for each of said remaining group users that enters a respective second group text message into a respective one of said remaining devices, displaying each second group text message in said messaging channel on said first device and on said remaining devices;

receiving entry of a private reply requested text message, said private reply requested text message received by said first device from said first group user;

transmitting said private reply requested text message to said remaining group users so said private reply requested text message appears in said messaging channel on said first device and on said remaining devices;

for each of said remaining group users that replies to said private reply requested text message in said messaging channel with a respective private reply, displaying each respective private reply to said private reply requested text message on said first device while displaying fewer than each respective private reply on at least one of said remaining devices.

2. A method according to claim 1, wherein each respective private reply is prevented from being displayed on all of said remaining devices except for each of the remaining devices from which the respective private reply was received.

3. A method according to claim 1, wherein said private reply requested text message is one of a plurality of control messages that are received by said remaining group users, wherein said control messages control interaction between each of said control messages and said remaining group users in respectively different manners depending upon respective type of said control messages.

4. A method according to claim 3, wherein said private reply requested text message appears differently on said remaining devices than said first group text message appears on said remaining devices, wherein said private reply requested text message includes an embedded or associated text entry field for receiving said respective private reply.

5. A method according to claim 1, said method further comprising the steps of receiving selection of said respective private reply by said first group user, displaying an indication that said respective private reply has been selected, said indication associated with a text entry area for receiving a further message associated with said selection of said respective private reply, transmitting an indication of said selected respective private reply, displaying said selected respective private reply in said messaging channel, wherein said selected respective private reply is displayed in said messaging channel, with said further message if said further message was entered into said text entry area, and allowing interaction with said selected respective private reply and/or said further message in said messaging channel by either said first user or at least one of said remaining group users.

6. A method according to claim 1, wherein said private reply requested text message appears differently in said messaging channel than said first group text message to indicate that said private reply requested text message seeks said respective private reply from each of said remaining group users.

7. A method according to claim 1, wherein said private reply requested text message and each respective private reply are visually and/or logically linked when displayed on said first device and/or at least one of said remaining devices.

8. A method according to claim 1, wherein each respective private reply from each of said remaining group users that replies to said private reply requested text message are aggregated for display together on said first device.

9. A method according to claim 1, wherein for each one of said remaining group users that reply to said private reply requested text message with said respective private reply, said respective private reply is entered into a respective Direct Message channel between said first group user and said each one of the remaining group users that replies to said private reply requested text message with said respective private reply, wherein said respective Direct Message channel includes further respective messages exchanged between said first group user and each of said remaining group users that replies with each respective private reply to said private reply requested text message, respectively, before said first group user enters said private reply requested text message into said first device.

10. A method for operating a plurality of messaging devices that includes a first device operated by a first group user and remaining devices operated by remaining group users, wherein said first group user and said remaining group users are a plurality of group users communicating with each other in a messaging channel, said method comprising the steps of:

receiving entry of a first group text message, said first group text message received into said first device from said first group user;

transmitting said first group text message to said remaining group users so that said first group text message appears in said messaging channel on said first device and on said remaining devices operated by said remaining group users, respectively;

for each of said remaining group users that enters a respective second group text message into a respective one of said remaining devices, displaying each second group text message in said messaging channel on said first device and on said remaining devices;

receiving entry in said message channel of a private reply requested text message, said private reply requested text message entered into said first device by said first group user, wherein said first group user identifies which of said remaining group users receives said private reply requested text message, wherein one or more identified group users of said remaining group users are identified;

further transmitting said private reply requested text message to said one or more identified group users;

for each of said identified group users that replies to said private reply requested text message in said messaging channel with a respective private reply, displaying each respective private reply to said private reply requested text message on said first device while displaying fewer than each respective private reply on at least one of said remaining devices outside of said one or more identified group users.

11. A method for operating a plurality of messaging devices according to claim 10, wherein for each of said identified group users that replies to said private reply requested text message with said respective private reply, entering each respective private reply into a respective Direct Message channel or respective private thread between said first group user and each of said identified group users that replies to said private reply requested text message with said respective private reply, respectively, wherein each respective Direct Message channel includes further respective messages exchanged between said first group user and each of said identified group users that replies with each respective private reply to said private reply requested text message, respectively, before said first group user enters said private reply requested text message into said first device.

12. A method for operating a plurality of messaging devices according to claim 10, wherein said one or more identified group users is a plurality of identified group users, and said plurality of identified group users are permitted to receive and/or view each other's respective private reply.

13. A method for operating a plurality of messaging devices according to claim 10, wherein said one or more identified group users is a plurality of identified group users, and said plurality of identified group users are prevented from receiving each other's respective private reply.

14. A method for operating a plurality of messaging devices according to claim 10, wherein said one or more identified group users are identified by said first group user a) inserting respective identifiers associated with said one or more identified group users in an entry field visible to said first group user on said first device and by b) inserting the characters "@@" in said entry field.

15. A method for operating a plurality of messaging devices according to claim 10, wherein said first group user or one of said remaining group users is a self-noting user, and said method comprises the steps of:

creating a self-noting message by said self-noting user;

displaying said self-noting message in said messaging channel, but with access to said self-noting message by at least one of said first group user and said remaining group users that is not said self-noting user being prevented.

16. A messaging apparatus for operating a plurality of messaging devices that includes a first device operated by a first group user and remaining devices operated by remaining group users, wherein said first group user and said remaining group users are a plurality of group users communicating with each other in a messaging channel, said messaging apparatus comprising:

a computer readable medium having stored therein instructions for a referencing scheduler;

a processor configured to execute the referencing scheduler, the referencing scheduler operable to:

receive entry of a first group text message, said first group text message received into said first device from said first group user;

transmit said first group text message to said remaining group users so that said first group text message appears in said messaging channel on said first device and on said remaining devices operated by said remaining group users, respectively;

for each of said remaining group users that enters a respective second group text message into a respective one of said remaining devices, display each second group text message in said messaging channel on said first device and on said remaining devices;

receive entry of a private reply requested text message, said private reply requested text message received by said first device from said first group user;

transmit said private reply requested text message to said remaining group users so said private reply requested text message appears in said messaging channel on said first device and on said remaining devices;

for each of said remaining group users that replies to said private reply requested text message in said messaging channel with a respective private reply, display each respective private reply to said private reply requested text message on said first device while displaying fewer than each respective private reply on at least one of said remaining devices.

17. A messaging apparatus according to claim 16, wherein each respective private reply is prevented from being displayed on all of said remaining devices except for each of the remaining devices from which the respective private reply was received.

18. A messaging apparatus according to claim 16, wherein said private reply requested text message is one of a plurality of control messages that are received by said remaining group users, wherein said control messages control interaction between each of said control messages and said remaining group users in respectively different manners depending upon respective type of said control messages.

19. A messaging apparatus according to claim 18, wherein said private reply requested text message appears differently on said remaining devices than said first group text message appears on said remaining devices, wherein said private reply requested text message includes an embedded or associated text entry field for receiving said respective private reply.

20. A messaging apparatus according to claim 16, wherein the referencing scheduler is further operable to:

receive selection of said respective private reply by said first group user, display an indication that said respective private reply has been selected, said indication associated with a text entry area for receiving a further message associated with said selection of said respective private reply, transmit an indication of said selected respective private reply, display said selected respective private reply in said messaging channel, wherein said selected respective private reply is displayed in said messaging channel, with said further message if said further message was entered into said text entry area, and allow interaction with said selected respective private reply and/or said further message in said messaging channel by either said first user or at least one of said remaining group users.

21. A messaging apparatus according to claim 16, wherein said private reply requested text message appears differently in said messaging channel than said first group text message to indicate that said private reply requested text message seeks said respective private reply from each of said remaining group users.

22. A messaging apparatus according to claim 16, wherein said private reply requested text message and each respective private reply are visually and/or logically linked when displayed on said first device and/or at least one of said remaining devices.

23. A messaging apparatus according to claim 16, wherein each respective private reply from each of said remaining group users that replies to said private reply requested text message are aggregated for display together on said first device.

24. A messaging apparatus according to claim 16, wherein for each one of said remaining group users that reply to said private reply requested text message with said respective private reply, said respective private reply is entered into a respective Direct Message channel between said first group user and said each one of the remaining group users that replies to said private reply requested text message with said respective private reply, wherein said respective Direct Message channel includes further respective messages exchanged between said first group user and each of said remaining group users that replies with each respective private reply to said private reply requested text message before said first group user enters said private reply requested text message into said first device.

25. A messaging apparatus for operating a plurality of messaging devices that includes a first device operated by a first group user and remaining devices operated by remaining group users, wherein said first group user and said remaining group users are a plurality of group users communicating with each other in a messaging channel, said messaging apparatus comprising:

a computer readable medium having stored therein instructions for a referencing scheduler;

a processor configured to execute the referencing scheduler, the referencing scheduler operable to:

receive entry of a first group text message, said first group text message received into said first device from said first group user;

transmit said first group text message to said remaining group users so that said first group text message appears in said messaging channel on said first device and on said remaining devices operated by said remaining group users, respectively;

for each of said remaining group users that enters a respective second group text message into a respective one of said remaining devices, display each second group text message in said messaging channel on said first device and on said remaining devices;

receive entry in said message channel of a private reply requested text message, said private reply requested text message entered into said first device by said first group user, wherein said first group user identifies which of said remaining group users receives said private reply requested text message, wherein one or more identified group users of said remaining group users are identified;

further transmit said private reply requested text message to said one or more identified group users;

for each of said identified group users that replies to said private reply requested text message in said messaging channel with a respective private reply, display each respective reply to said private reply requested text message on said first device while preventing display of each respective private reply on at least one of said remaining devices outside of said one or more identified group users.

26. A messaging apparatus according to claim 25, wherein for each of said identified group users that replies to said private reply requested text message with said respective private reply, each respective private reply is entered into a respective Direct Message channel or respective private thread between said first group user and each of said identified group users that replies to said private reply requested text message with said respective private reply, respectively, wherein each respective Direct Message channel includes further respective messages exchanged between said first group user and each of said identified group users that replies to said private reply requested text message, respectively, before said first group user enters said private reply requested text message into said first device.

27. A messaging apparatus according to claim 25, wherein said one or more identified group users is a plurality of identified group users, and said plurality of identified group users are permitted to receive and/or view each other's respective private reply.

28. A messaging apparatus according to claim 25, wherein said one or more identified group users is a plurality of identified group users, and said plurality of identified group users are prevented from receiving each other's respective private reply.

29. A messaging apparatus according to claim 25, wherein said one or more identified group users are identified by said first group user by a) inserting respective identifiers associated with said one or more identified group users in an entry field visible to said first group user on said first device and by b) inserting the characters "@@" in said entry field.

30. A messaging apparatus according to claim 25, wherein said first group user or one of said remaining group users is a self-noting user, and wherein the referencing scheduler is further operable to:
   create a self-noting message by said self-noting user;
   display said self-noting message in said messaging channel, but with access to said self-noting message by at least one of said first group user and said remaining group users that is not said self-noting user being prevented.

* * * * *